(12) United States Patent
Lee et al.

(10) Patent No.: US 11,600,419 B2
(45) Date of Patent: Mar. 7, 2023

(54) MAGNETIC ASSEMBLY STRUCTURE

(71) Applicant: TAIWAN OASIS TECHNOLOGY CO., LTD., New Taipei (TW)

(72) Inventors: Wei-Long Lee, New Taipei (TW); Shih-Meng Liao, New Taipei (TW)

(73) Assignee: TAIWAN OASIS TECHNOLOGY CO., LTD., New Taipei (TW)

( * ) Notice: Subject to any disclaimer, the term of this patent is extended or adjusted under 35 U.S.C. 154(b) by 150 days.

(21) Appl. No.: 17/080,933

(22) Filed: Oct. 27, 2020

(65) Prior Publication Data

US 2021/0043348 A1 Feb. 11, 2021

Related U.S. Application Data

(63) Continuation-in-part of application No. 16/153,945, filed on Oct. 8, 2018, now Pat. No. 10,854,366.

(51) Int. Cl.
| | |
|---|---|
| *H01F 7/00* | (2006.01) |
| *H01F 7/02* | (2006.01) |
| *H01F 7/08* | (2006.01) |

(52) U.S. Cl.
CPC ............ *H01F 7/0263* (2013.01); *H01F 7/081* (2013.01)

(58) Field of Classification Search
CPC ........ H01F 7/0263; H01F 7/021; H01F 7/081; H01F 7/0242; H01F 7/0257; F16B 2012/466; F16B 12/125; F16B 12/46; F21V 21/096; H01R 13/62; H01R 13/6205

USPC ....................................................... 335/209
See application file for complete search history.

(56) References Cited

U.S. PATENT DOCUMENTS

| | | | |
|---|---|---|---|
| 2002/0175569 A1* | 11/2002 | Komiyama | ............... H01F 7/13 310/12.26 |
| 2014/0028423 A1* | 1/2014 | Matsumoto | ........... H01F 7/1607 335/282 |
| 2021/0241954 A1* | 8/2021 | Knust | ....................... H01F 7/11 |

FOREIGN PATENT DOCUMENTS

JP 4201936 * 1/1992 ......... E05B 47/0043

* cited by examiner

*Primary Examiner* — Shawki S Ismail
*Assistant Examiner* — Lisa N Homza
(74) *Attorney, Agent, or Firm* — Demian K. Jackson

(57) ABSTRACT

A magnetic assembly structure has a main body and an inserting component. A first engagement slot of the main body receives a first magnetic component, and a first receiving slot of the main body penetrates a main body surface to form a main body opening on the main body surface. The first engagement slot and the first receiving slot are communicated with each other. The inserting component is inserted into the first receiving slot via the main body opening, and the first magnetic component moves into the first magnetic component receiving slot of the inserting component. The magnetic assembly is assembled with a less force, has higher safety, and is hard to be disassembled without allowance or explanations.

14 Claims, 50 Drawing Sheets

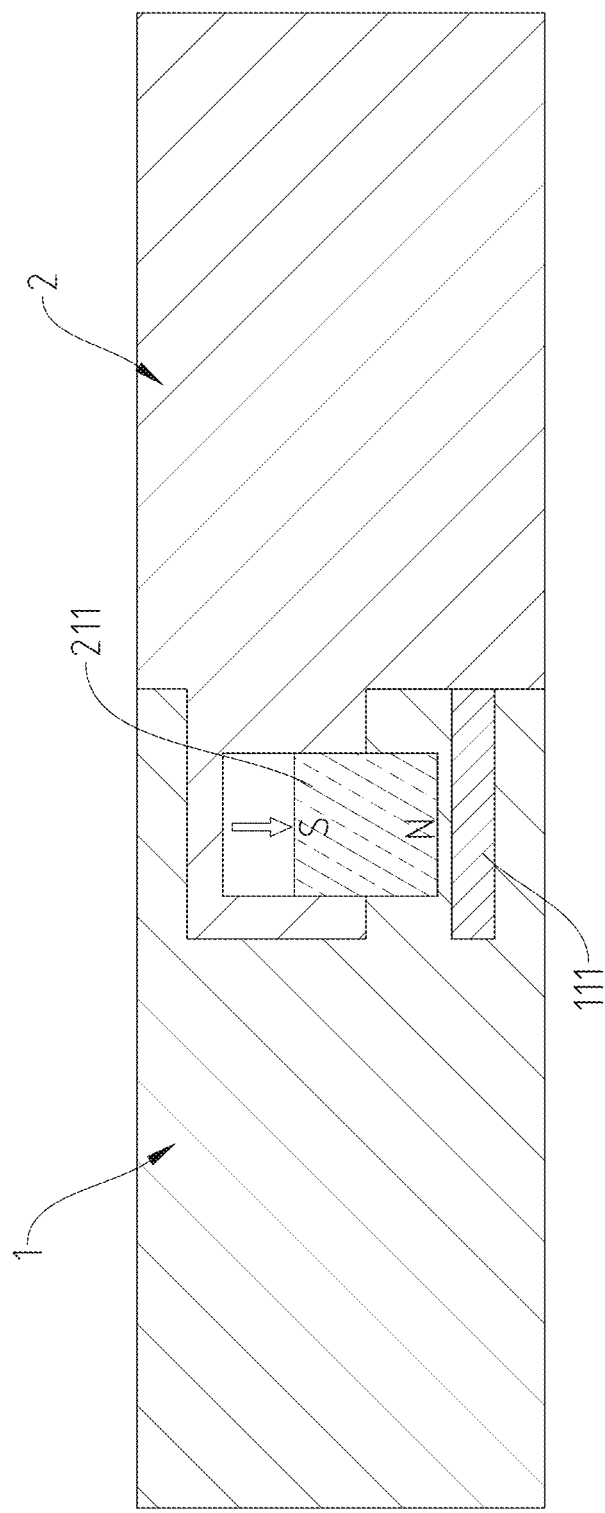

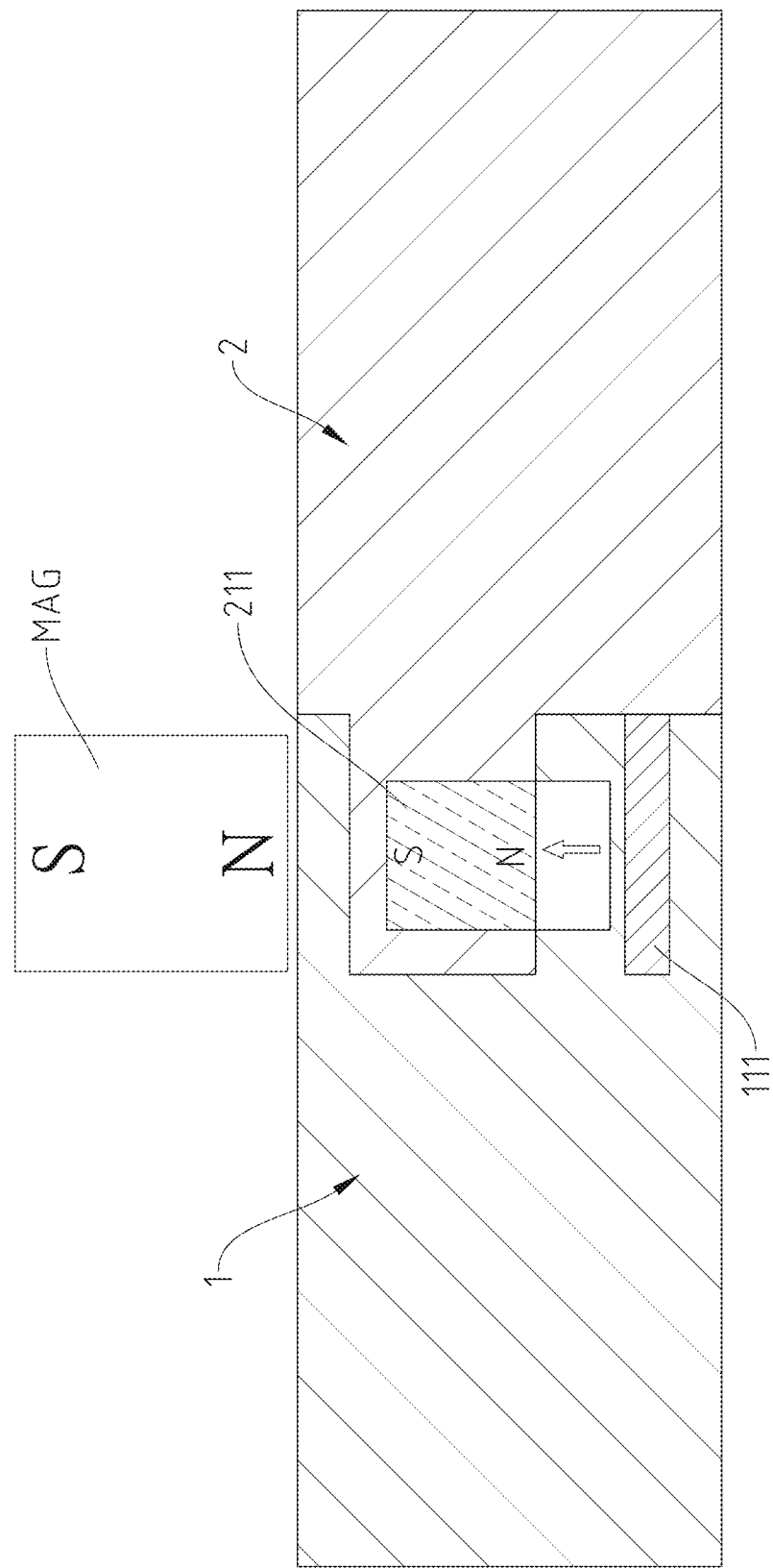

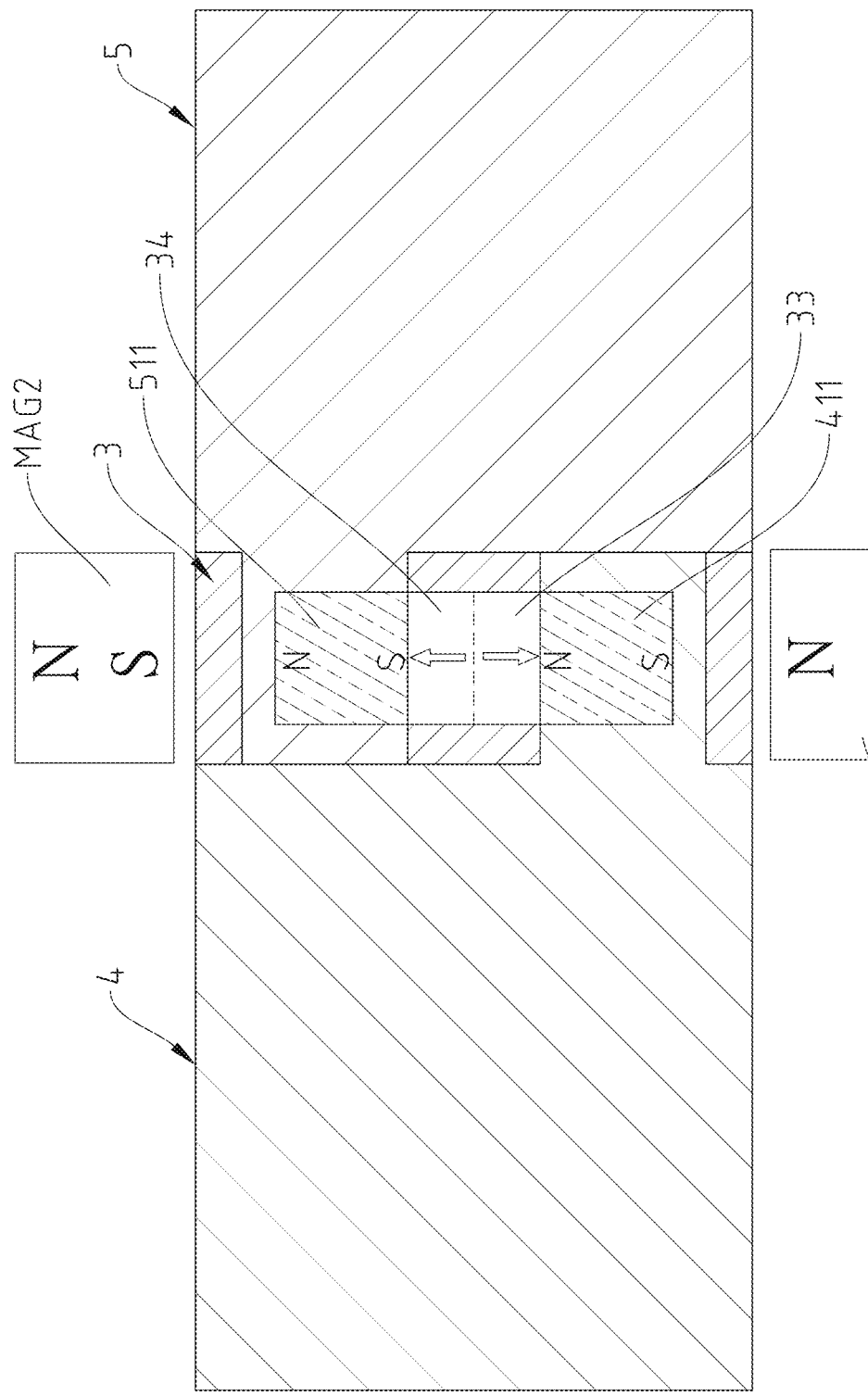

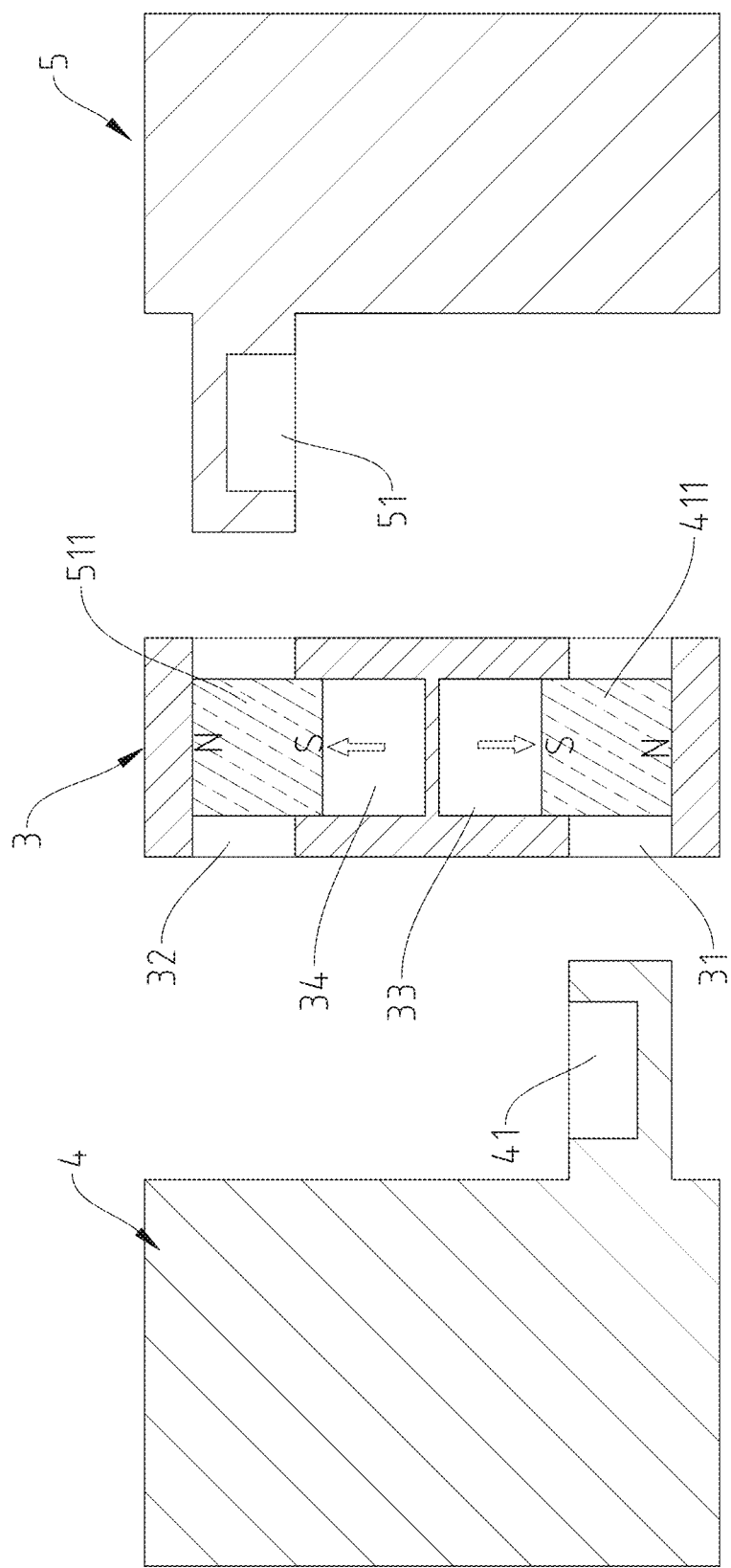

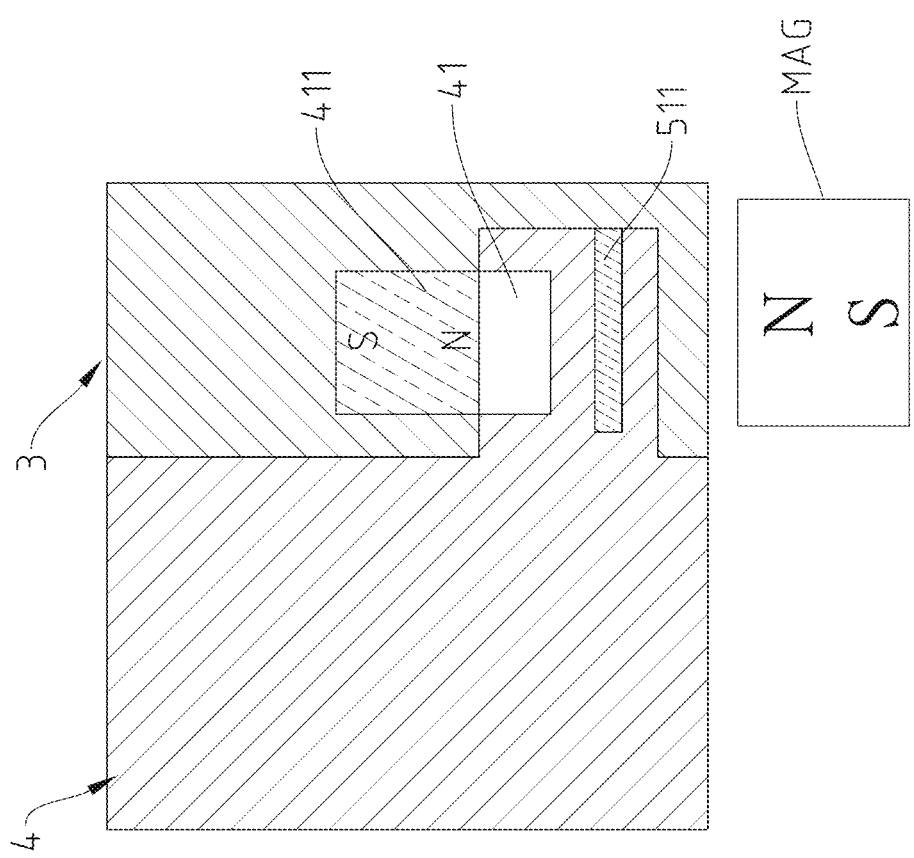

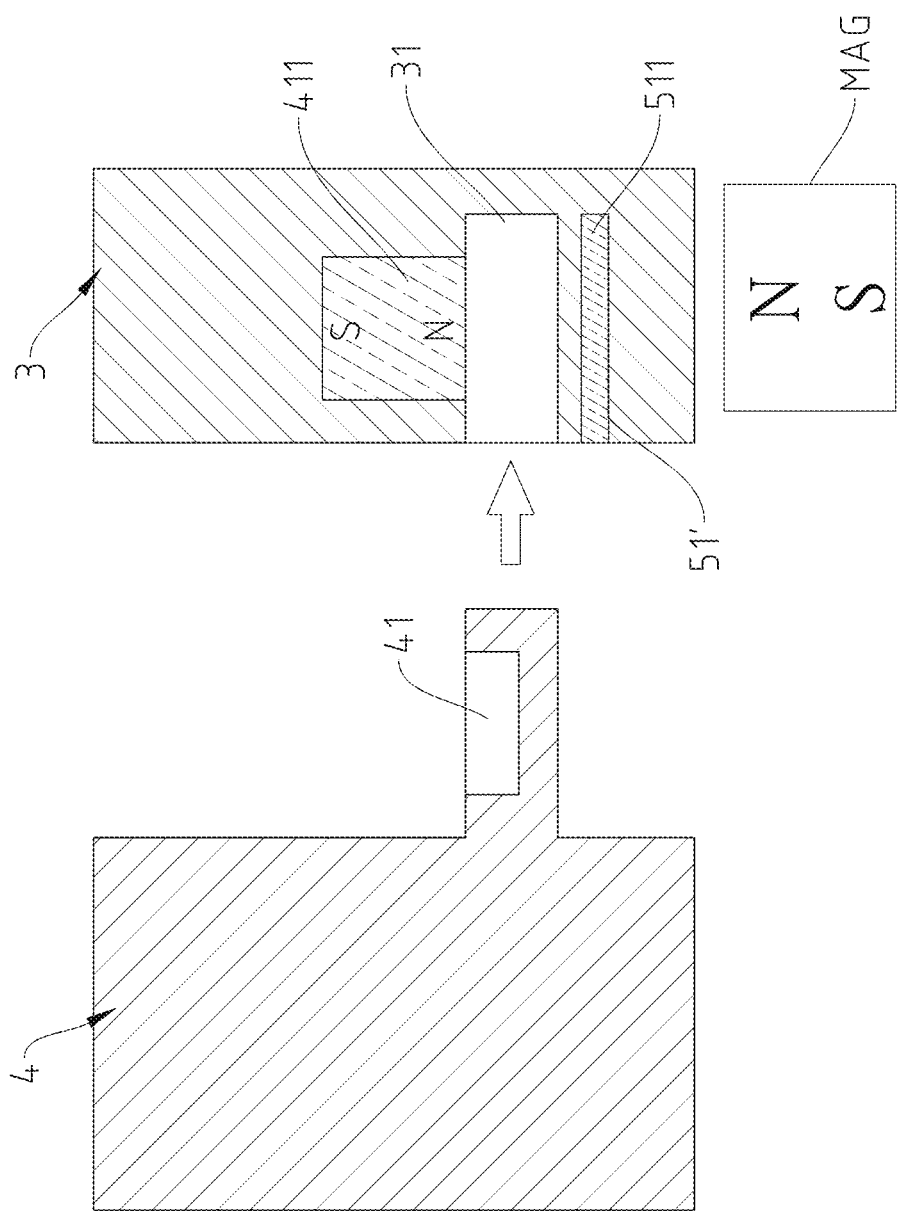

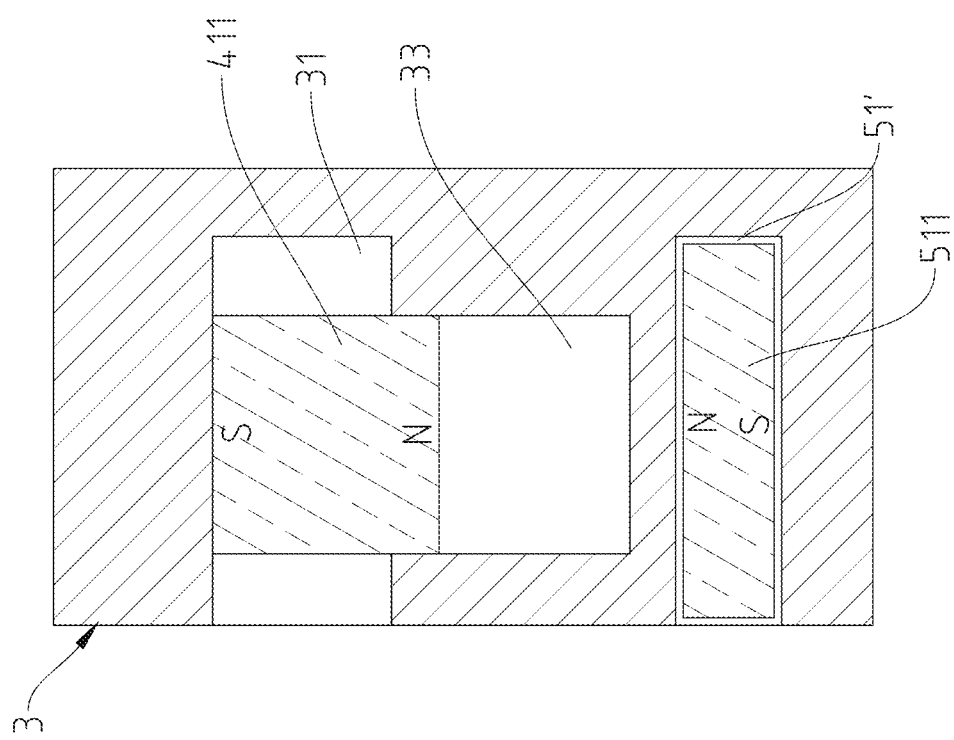

MAGNETIC ASSEMBLY STRUCTURE

CROSS REFERENCE

The present invention is Continued-In-Part Application of U.S. patent application Ser. No. 16/153,945 filed on 2018 Oct. 8, wherein all contents of the references which priorities are claimed by the present invention are included in the present invention, herein.

BACKGROUND

1. Technical Field

The present disclosure relates to a magnetic assembly structure, and in particular, to a magnetic assembly structure which utilizes an attracting or repulsive force of two magnetic components to make a main body and an inserting component automatically engaged to each other.

2. Description of Related Art

Generally, one manner to assemble two main bodies to form an object can be to fix the two main bodies by screwing or nailing. For example, an intermediate object can contact two rod parts, and a screw or nail penetrates the intermediate object to lock or fix the two rod parts. For example, one end of a rod part has a receiving room for receiving one end of another rod part, and a screw or nail penetrates the intermediate object to lock or fix the two rod parts. However, these manners may make the joint surface of the two main bodies protruded and non-flat, and thus a user using such object may be damaged when the user is hook by the protruded joint surface.

Additionally, another manner for fixing the two main body is to design a male thread and a female thread respectively on the two main bodies, and thus via the female and male threads, the two main bodies are assembled to form an object. For example, one end of an rod part has an opening, an inner wall of a receiving room of the opening has a female thread, another rod part has a protruding portion, and an outer wall of the protruding portion has a male thread, such that the two rod parts can be fixed to each other via the female and male threads. The manner can efficiently resist again a vertical disassembling operation, but cannot further resist against a rotational disassembling operation.

In the conventional manners, regardless of whether the nail, screw or thread is used to fix or lock the two main bodies, these conventional manners requires the user to provide her/his force, and cannot prevent the malicious person from disassembling the object without allowance or explanations. Even, the manner which utilizes the nail or screw to fix or lock the two main bodies makes the joint surface of the two main bodies non-flat, and it is easy to damage the user due to the non-flat surface. Therefore, the conventional manners have technical problems of consuming force for assembling, easily disassembling by the malicious person without allowance or explanations, and less safety.

Thus, how to utilize novel hardware structure design to implement the assembly object which can be assembled with a less force, increase safety and be hardly disassembled without allowance or explanations, is still an issue which the related industrial developer and researcher dedicate to overcome and solve.

SUMMARY

A main objective of the present disclosure is to provide a magnetic assembly structure which utilizes an attracting or repulsive force of two magnetic components to automatically engage a main body and an inserting component, wherein the magnetic assembly structure can simultaneously resist against the vertical and rotational disassembling operations, and the joint surface is flat to prevent the user from being hook by the joint surface to avoid any damage. Even, the assembling manner cannot be known from the appearance of the joint surface, and thus it can prevent the malicious person from disassembling magnetic assembly structure without allowance or explanations. Additionally, the magnetic assembly structure can be applied in the furniture, daily necessity and electronic equipment, and the present disclosure is not limited thereto, thus having a wide application scope.

According to an objective of the present disclosure, an embodiment of the present disclosure provides a magnetic assembly structure, comprising: a main body, having a first receiving slot, a first engagement slot, a first magnetic component and a first main body surface, wherein the first receiving slot penetrates first main body surface to form a first main body opening on the first main body surface, the first engagement slot is communicated with the first receiving slot, and the first engagement slot receives the first magnetic component; and a first inserting component, having a first magnetic component receiving slot; wherein the first inserting component is inserted into the first receiving slot via the first main body opening, and the first magnetic component moves into the first magnetic component receiving slot.

Regarding the above magnetic assembly structure, a portion of the first magnetic component moves into the first magnetic component receiving slot, and other portion of the first magnetic component stay in the first engagement slot.

Regarding the above magnetic assembly structure, the main body further has a second receiving slot, a second engagement slot, a second magnetic component and a second main body surface, wherein the second receiving slot penetrates second main body surface to form a second main body opening on the second main body surface, the second engagement slot is communicated with the second receiving slot, and the second engagement slot receives the second magnetic component; the first engagement slot and the second engagement slot are disposed between the first receiving slot and the second receiving slot, or alternatively, the first receiving slot and the second receiving slot are disposed between the first engagement slot and the second engagement slot; the magnetic assembly structure further comprises a second inserting component which has a second magnetic component receiving slot; the second inserting component is inserted into the second receiving slot via the second main body opening, and the second magnetic component moves into the second magnetic component receiving slot.

Regarding the above magnetic assembly structure, a portion of the first magnetic component and a portion of the second magnetic component respectively move into the first magnetic component receiving slot and the second magnetic component receiving slot, and other portion of the first magnetic component and other portion of the second magnetic component respectively stay in the first engagement slot and the second engagement slot.

Regarding the above magnetic assembly structure, the first engagement slot and the second engagement slot are disposed between the first receiving slot and the second receiving slot; via a magnetic repulsive force induced by the second magnetic component and first magnetic component, the portion of the first magnetic component and the portion of the second magnetic component respectively locate in the first engagement slot and the second engagement slot, and the other portion of the first magnetic component and the other portion of the second magnetic component respectively locate in the first magnetic component receiving slot and the second magnetic component receiving slot.

Regarding the above magnetic assembly structure, the first magnetic component and the second magnetic component are two magnet components and two opposite magnet poles of the first magnetic component and the second magnetic component are identical.

Regarding the above magnetic assembly structure, the first engagement slot and the second engagement slot are communicated with each other, such that the main body merely has one engagement slot.

Regarding the above magnetic assembly structure, the first receiving slot and the second receiving slot are disposed between the first engagement slot and the second engagement slot; via a magnetic attracting force induced by the second magnetic component and first magnetic component, the portion of the first magnetic component and the portion of the second magnetic component respectively locate in the first engagement slot and the second engagement slot, and the other portion of the first magnetic component and the other portion of the second magnetic component respectively locate in the first magnetic component receiving slot and the second magnetic component receiving slot.

Regarding the above magnetic assembly structure, the first magnetic component and the second magnetic component are two magnet components and two opposite magnet poles of the first magnetic component and the second magnetic component are different.

Regarding the above magnetic assembly structure, the first receiving slot and the second receiving slot are communicated with each other, such that the main body merely has one receiving slot.

Regarding the above magnetic assembly structure, the magnetic assembly structure further comprises a clamping structure, and the main body further has a via disposed corresponding to the first engagement slot, such that the clamping structure penetrates the via to clamp the first magnetic component.

Regarding the above magnetic assembly structure, the first inserting component further comprises a second magnetic component fixedly disposed on a side of the first magnetic component receiving slot, and the first magnetic component and the second magnetic component have a magnetic attracting or repulsive force induced therebetween.

Regarding the above magnetic assembly structure, the main body further comprises a second magnetic component and a second magnetic component receiving slot, the second magnetic component is fixedly disposed in the second magnetic component receiving slot, and the first magnetic component and the second magnetic component have a magnetic attracting or repulsive force induced therebetween.

Regarding the above magnetic assembly structure, the first receiving slot has a receiving slot bevel surface, and the first inserting component has a inserting component bevel surface corresponding to the receiving slot bevel surface.

Regarding the above magnetic assembly structure, when the inserting component bevel surface of the first inserting component entirely contacts the receiving slot bevel surface of the first receiving slot, a portion of the first magnetic component locates in the first magnetic component receiving slot.

To sum up, the magnetic assembly structure mainly utilizes the magnetic force of the magnetic components to assemble the main body and the inserting component, and thus the implemented assembly object is assembled with less force, increases the safety, and can prevent the disassembling without allowance or explanations.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 7B is a top view of an assembled magnetic assembly structure provided by a second embodiment of the present disclosure.

FIG. 8B is another top view of disassembling an assembled magnetic assembly structure provided by a second embodiment of the present disclosure.

FIG. 11D is a top view of disassembling an assembled magnetic assembly structure provided by a sixth embodiment of the present disclosure.

FIG. 12C is a top view of a magnetic assembly structure provided by a thirteenth embodiment of the present disclosure.

FIG. 15C is a top view of disassembling an assembled magnetic assembly structure provided by an eighteenth embodiment of the present disclosure.

FIG. 16B is a top view of assembling a magnetic assembly structure provided by a nineteenth embodiment of the present disclosure.

FIG. 16D is a top view of a main body of a magnetic assembly structure provided by a twentieth embodiment of the present disclosure.

DESCRIPTION OF THE EXEMPLARY EMBODIMENTS

To understand the technical features, content and advantages of the present disclosure and its efficacy, the present disclosure will be described in detail with reference to the accompanying drawings. The drawings are for illustrative and auxiliary purposes only and may not necessarily be the true scale and precise configuration of the present disclosure. Therefore, the scope of the present disclosure should not be limited to the scale and configuration of the attached drawings.

Figure 1:
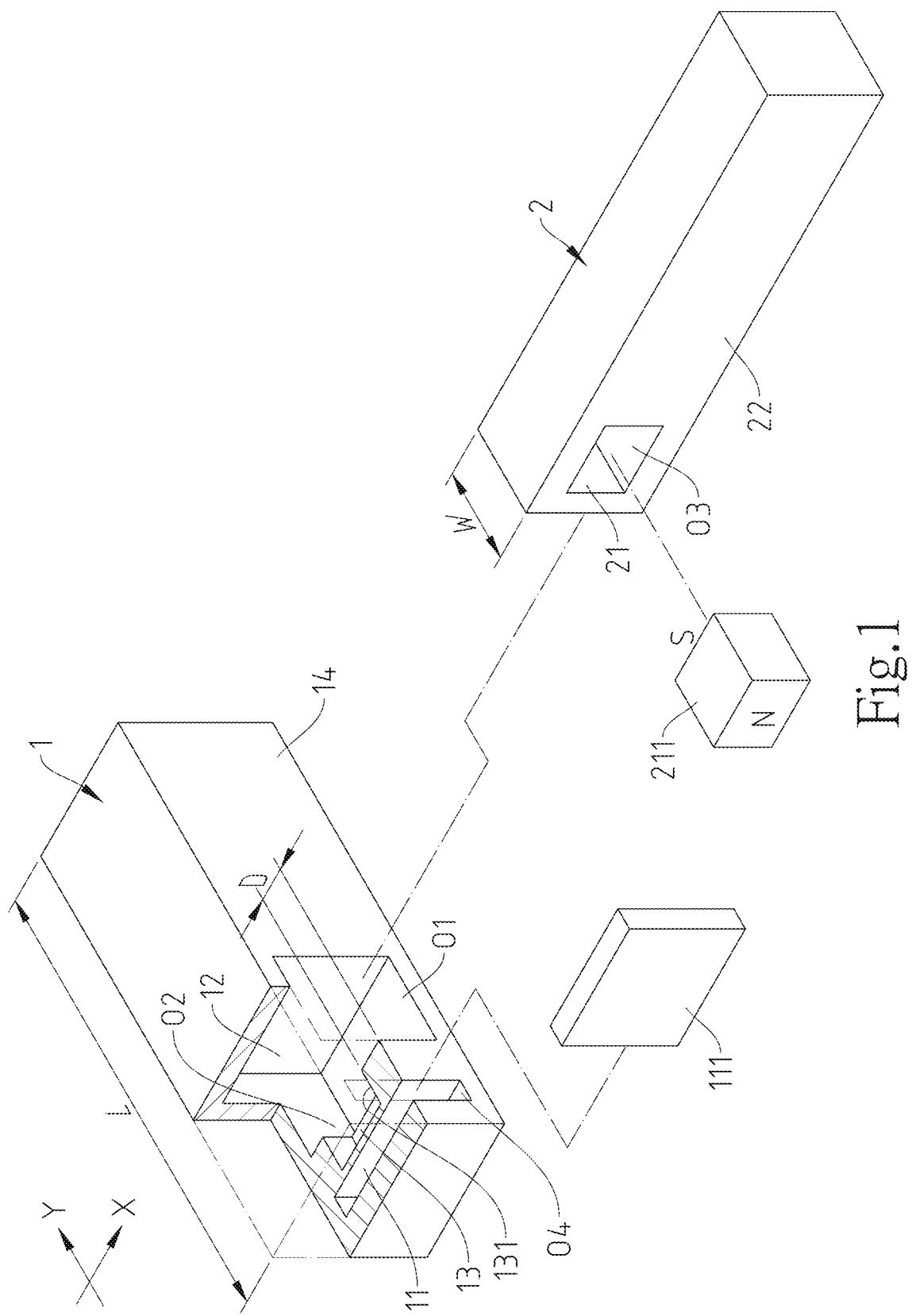
FIG. 1 is a three dimensional explosive diagram of a magnetic assembly structure provided by a first embodiment of the present disclosure.
Figure 2:
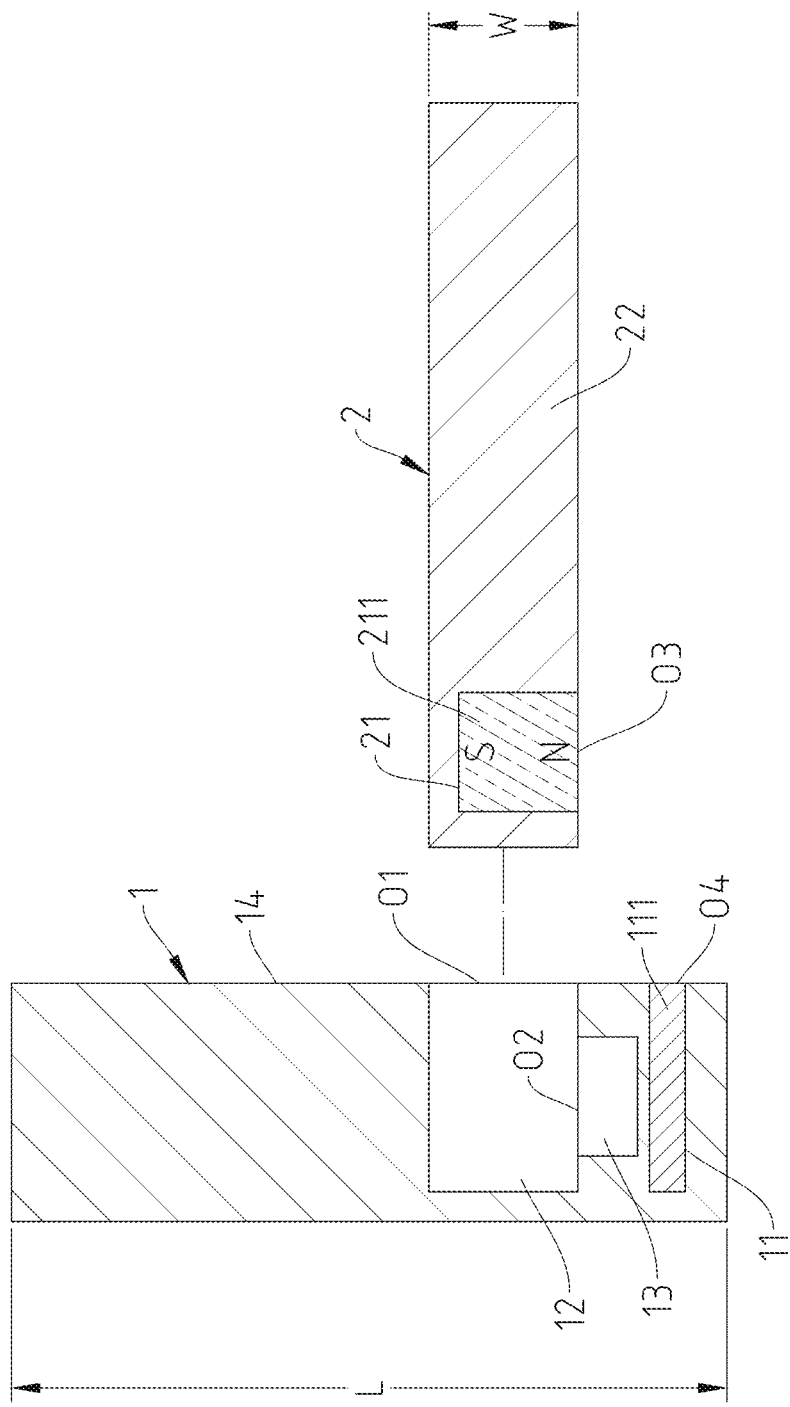
FIG. 2 is a top view of a magnetic assembly structure provided by a first embodiment of the present disclosure.
Figure 3:
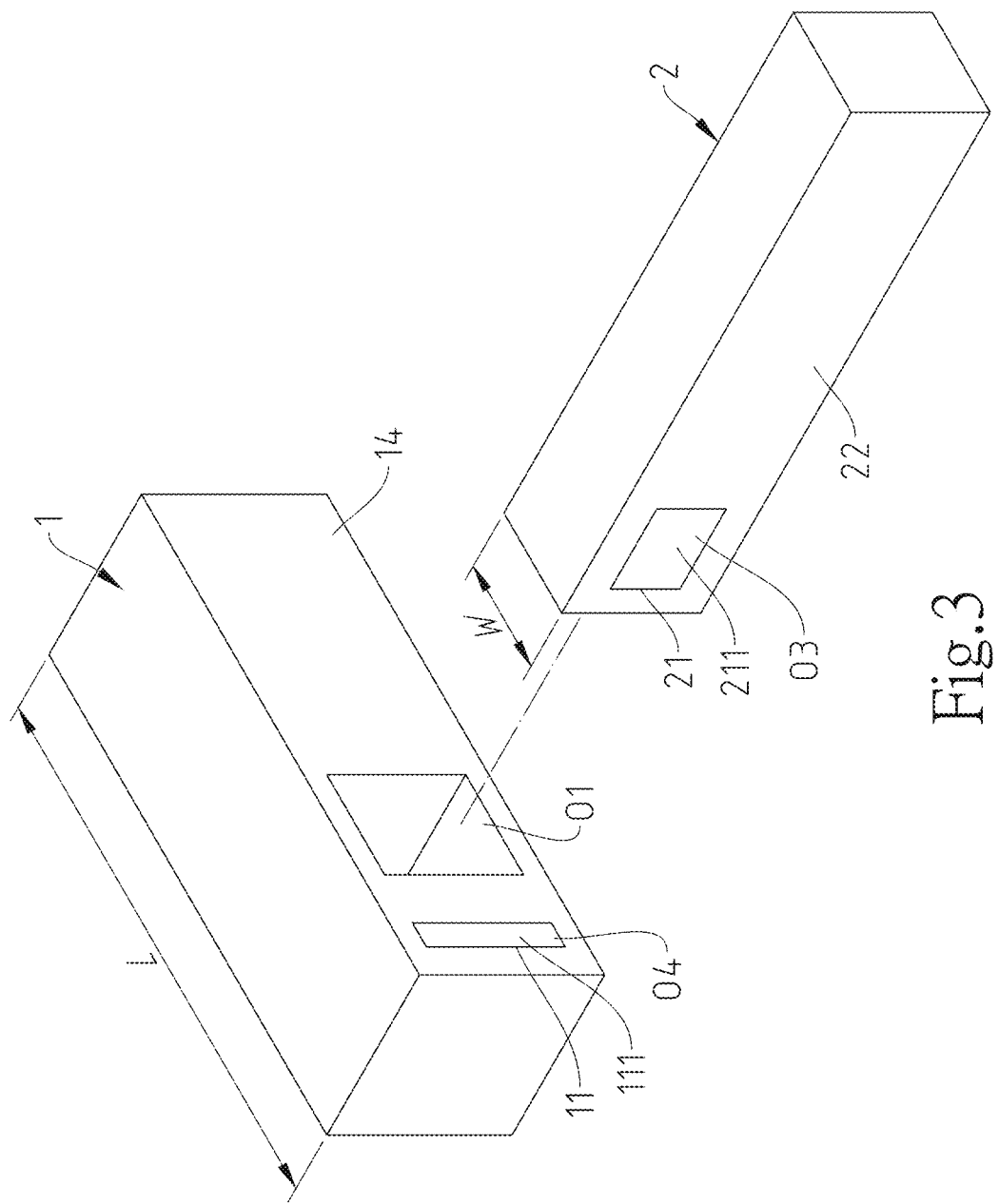
FIG. 3 is a three dimensional diagram of a disassembled magnetic assembly structure provided by a first embodiment of the present disclosure.

FIG. 1 through FIG. 5 are used to illustrate a whole structure and an assembling/disassembling manner of a magnetic assembly structure provided by a first embodiment of the present disclosure. As shown in FIG. 1 through FIG. 3, the magnetic assembly structure comprises a main body 1 and an inserting component 2. The main body 1 extends along a first direction X, an inserting component 2 extends along a second direction Y being vertical to the first direction X, and a thickness W of an inserting component 2 is less than a length L of the main body 1. The inserting component 2 can be inserted into the main body 1, the inserting component 2 and the main body 1 can be engaged to each other via a magnetic force, and thus the magnetic assembly structure can prevent a malicious person from using a vertical and horizontal disassembling operating to disassemble magnetic assembly structure without allowance or explanations. The above magnetic assembly structure can apply in the furniture, daily necessity and electronic equipment, and the present disclosure is not limited thereto, thus having a wide application scope. For example, the main body 1 can be the table main body and the inserting component 2 can be the table leg.

The main body 1 has a first receiving slot 11, a second receiving slot 12, an engagement slot 13 and a main body surface 14. The first receiving slot 11 penetrates the main body surface 14 to form a first receiving slot opening O4 on the main body surface 14, and the first magnetic component 111 can be disposed in the first receiving slot 11 via the first receiving slot opening O4. The first magnetic component 111 can be a magnetic conduction component, such as an iron sheet or other magnetic conduction sheet. The second receiving slot 12 penetrates the main body surface 14 to form the main body opening O1 on the main body surface 14. The engagement slot 13 is disposed between the first receiving slot 11 and the second receiving slot 12, and is communicated with the second receiving slot 12 via the communicating opening O2. In addition, the engagement slot 13 further has contacting surface 131 being away from the main body surface 14 with a distance D.

The inserting component 2 has a magnetic component receiving slot of the inserting component 21 and an inserting component surface 22, the magnetic component receiving slot of the inserting component 21 penetrates the inserting component surface 22 to form the inserting component opening O3 on the inserting component surface 22, and the second magnetic component 211 is disposed in the magnetic component receiving slot of the inserting component 21 via the inserting component opening O3. The second magnetic component 211 is a magnet component, a magnet pole of the second magnetic component 211, which faces the first magnetic component 111, is an N pole, and other magnet pole of the second magnetic component 211, which faces an inner wall of the magnetic component receiving slot of the inserting component 21, is an S pole. In addition, in other embodiment, a magnet pole of the second magnetic component 211, which faces the first magnetic component 111, is an S pole, and other magnet pole of the second magnetic component 211, which faces an inner wall of the magnetic component receiving slot of the inserting component 21, is an N pole.

Figure 4:
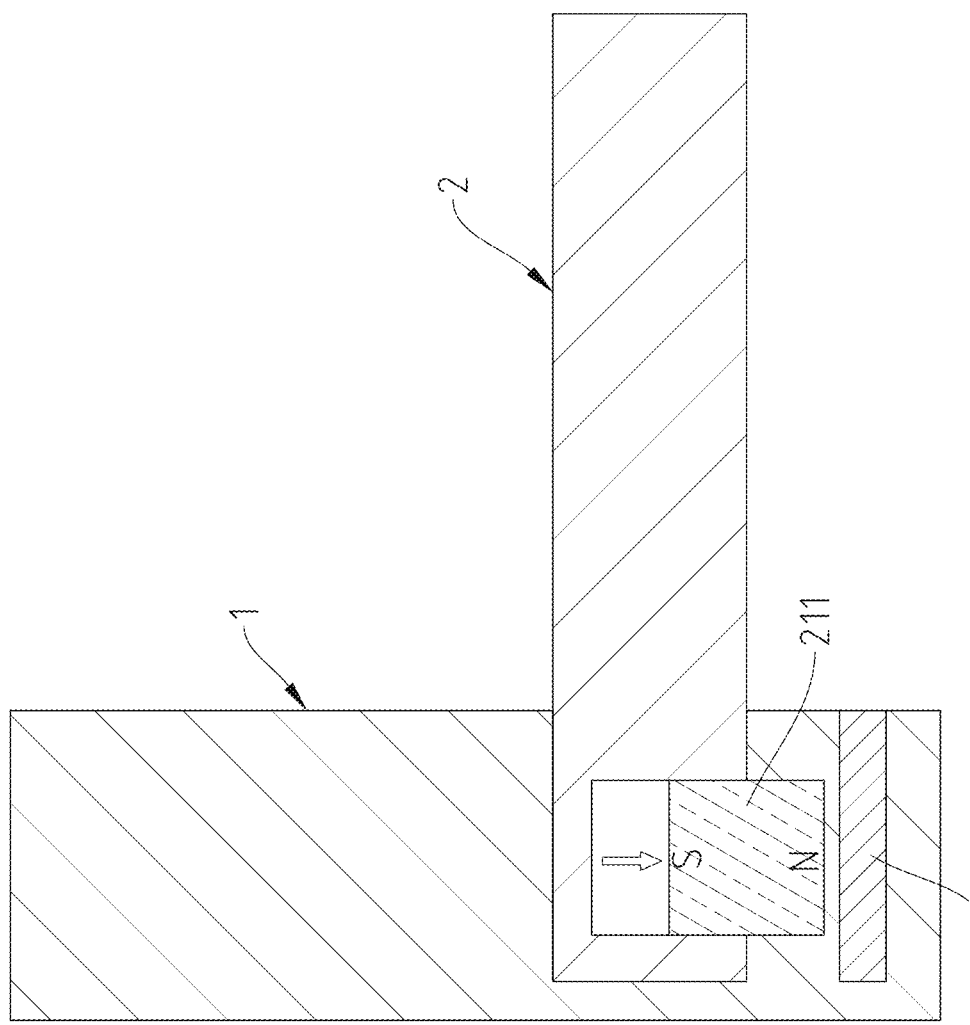
FIG. 4 is a top view of an assembled magnetic assembly structure provided by a first embodiment of the present disclosure.

As shown in FIG. 2 and FIG. 4 (refer to FIG. 4 mainly, and refer to FIG. 2 secondarily), when assembling, the user can insert the inserting component 2 into the second receiving slot 12 via the main body opening O1. To put it concretely, the section area of the main body opening O1 is larger than or equal to the section area of the inserting component 2, which faces the main body opening O1, such that the inserting component 2 can be inserted into the second receiving slot 12 via the main body opening O1.

After the user inserts the inserting component 2 into the second receiving slot 12 via the main body opening O1, via a magnetic attracting force induced by the first magnetic component 111 and the second magnetic component 211, the second magnetic component 211 sequentially passes the inserting component opening O3 and the communicating opening O2 to move into the engagement slot 13, wherein a portion of the second magnetic component 211 moves into the engagement slot 13, other portion of the second magnetic component 211 stays in the second receiving slot 12, and thus the second magnetic component 211 contacts the contacting surface 131, so as to prevent the inserting component 2 from sliding out from the second receiving slot 12. Specifically, the section area of the communicating opening O2 is larger than or equal to the section area of the inserting component opening O3, such that the second magnetic component 211 can move into the engagement slot 13. Since the second magnetic component 211 moves into the engagement slot 13 due to the magnetic force, the fixing and screwing manners are not required, and the magnetic assembly structure has an advantage of assembling with a less force.

Figure 5:
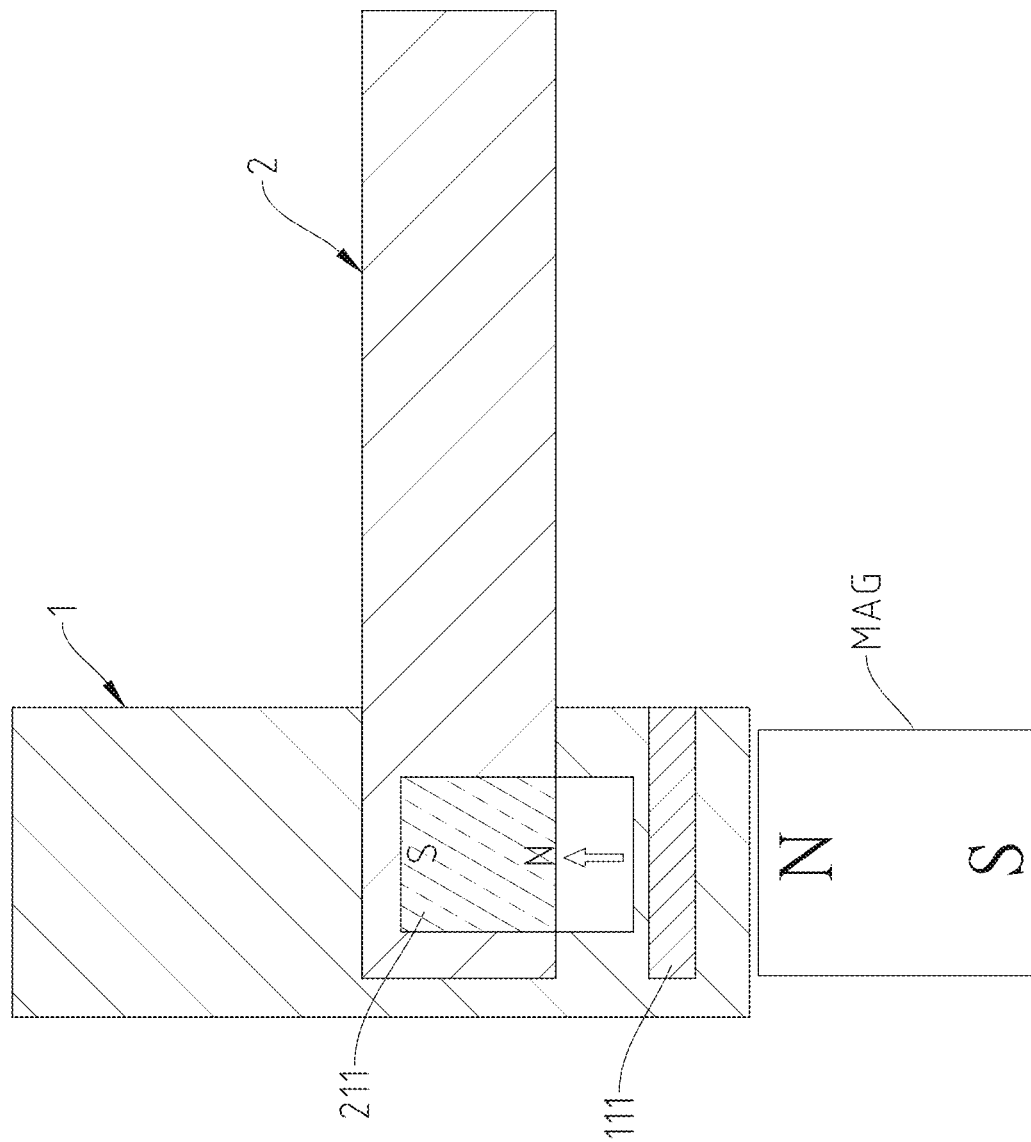
FIG. 5 is a top view of disassembling an assembled magnetic assembly structure provided by a first embodiment of the present disclosure.

As shown in FIG. 2 and FIG. 5 (refer to FIG. 5 mainly, and refer to FIG. 2 secondarily), when disassembling, a magnetic repulsive force of a provided external magnetic component MAG and the second magnetic component 211 (i.e. the N pole of the external magnetic component MAG faces the N pole of the second magnetic component 211) is utilized to make the portion of the second magnetic component 211, which is located in the engagement slot 13, move into the second receiving slot 12. Next, the user can take the inserting component 2 out from the second receiving slot 12 via the main body opening O1, so as to complete the disassembly.

Figure 6:
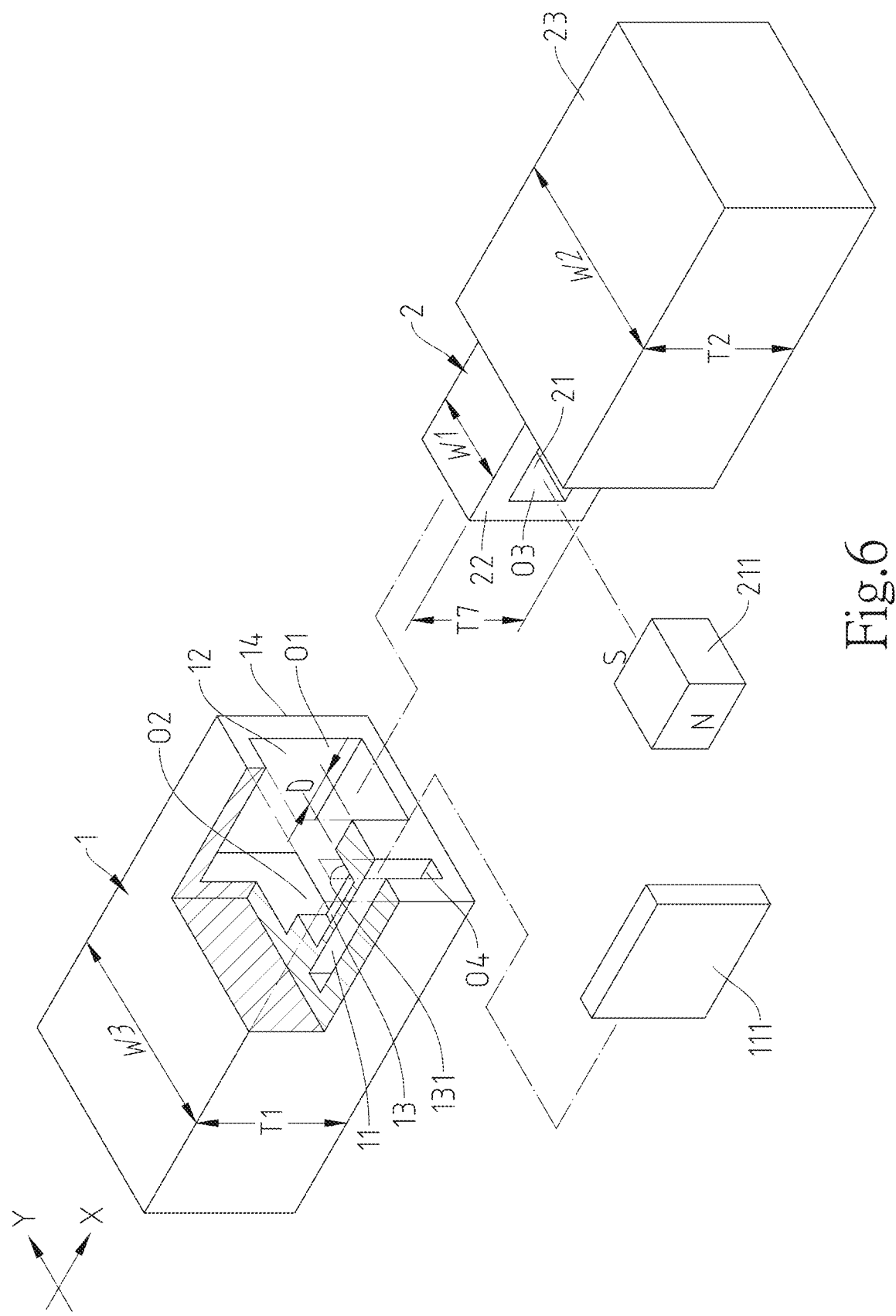
FIG. 6 is a three dimensional explosive diagram of a magnetic assembly structure provided by a second embodiment of the present disclosure.

FIG. 6 through FIG. 8B are used to illustrate a whole structure and an assembling/disassembling manner of a magnetic assembly structure provided by a second embodiment of the present disclosure. The differences between the second embodiment and the first embodiment are the relative dimensions and extending directions of the main body 1 and the inserting component 2 and that the back end of the inserting component 2 has a bulk portion 23. As shown in FIG. 6, the main body 1 and the inserting component 2 extend along the second direction Y, and the back end of the inserting component 2 is the bulk portion 23, wherein the width W1 and the thickness T7 of the front end of the inserting component 2 are respectively less than the width W2 and the thickness T2 of the back end of the inserting component 2, and the width W2 and the thickness T2 of the back end of the inserting component 2 are respectively equal to the width W3 and thickness T1 of the main body 1.

Figure 7A:
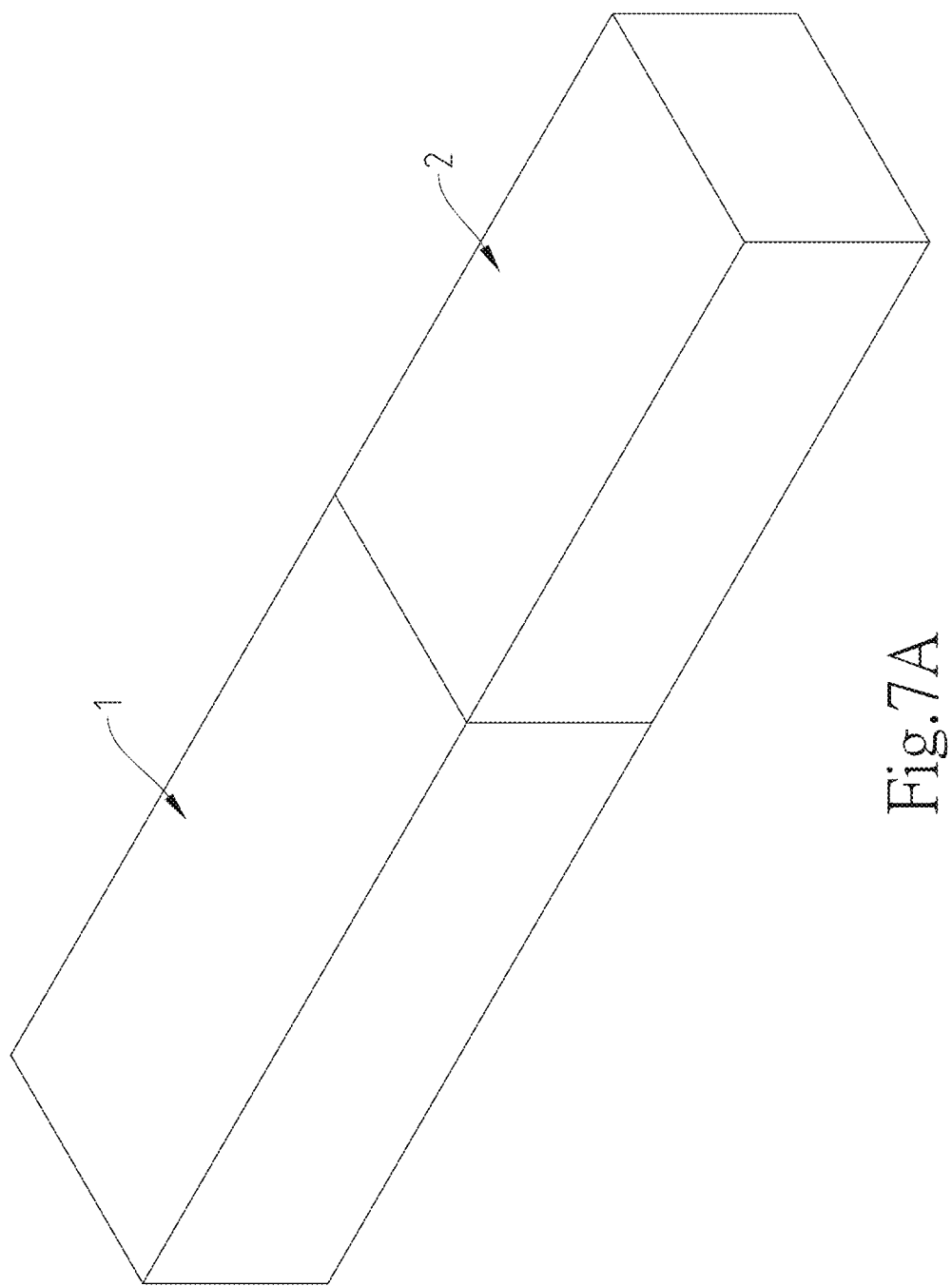
FIG. 7A is a three dimensional diagram of an assembled magnetic assembly structure provided by a second embodiment of the present disclosure.

In other words, the section area of the bulk portion 23 of the inserting component 2, which faces the second direction Y, is equal to the section area of the main body, which faces the second direction Y. Thus, as shown in FIG. 7, the assembled magnetic assembly structure is almost one part, the joint surface is almost flat, and merely a tiny thin line between the main body 1 and the inserting component 2 can be seen. In the second embodiment, the magnetic assembly structure can also be applied in the furniture, daily necessity and electronic equipment, and the present disclosure is not limited thereto, thus having a wide application scope. For example, the main body 1 can be the main table leg body, and the inserting component 2 can be the extension table leg part, so as to form a longer table leg. Since the assembled magnetic assembly structure has the almost flat joint surface, being not like the conventional assembly structure, the assembled magnetic assembly structure has no non-flat joint surfaces which may be hook by the user to cause the damage or danger, and the magnetic assembly structure in the second embodiment has the higher safety.

The assembling manner of the magnetic assembly structure in the second embodiment is the same as that of the magnetic assembly structure in the first embodiment. As shown in FIG. 6 and FIG. 7B (refer to FIG. 7B mainly, and refer to FIG. 6 secondarily), when assembling, the user can insert the inserting component 2 into the second receiving slot 12 via the main body opening O1. After the user inserts the inserting component 2 into the second receiving slot 12 via the main body opening O1, via a magnetic attracting force induced by the first magnetic component 111 and the second magnetic component 211, the second magnetic component 211 sequentially passes the inserting component opening O3 and the communicating opening O2 to move into the engagement slot 13.

Figure 8A:
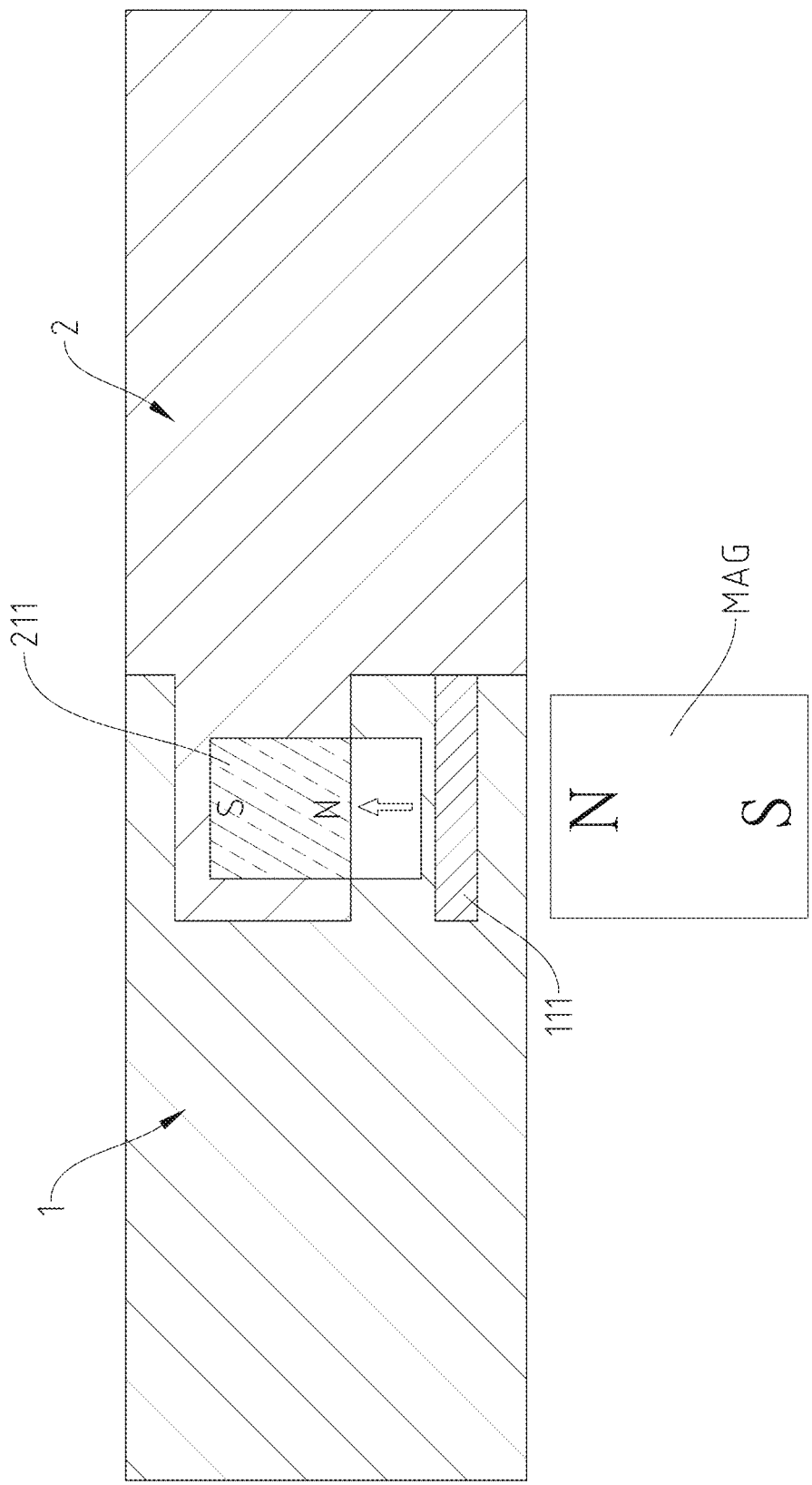
FIG. 8A is a top view of disassembling an assembled magnetic assembly structure provided by a second embodiment of the present disclosure.

The disassembling manner of the magnetic assembly structure in the second embodiment is the same as that of the magnetic assembly structure in the first embodiment. As shown in FIG. 8A and FIG. 6 (refer to FIG. 8A mainly, and refer to FIG. 6 secondarily), when disassembling, a magnetic repulsive force of a provided external magnetic component MAG and the second magnetic component 211 (i.e. the N pole of the external magnetic component MAG faces the N pole of the second magnetic component 211) is utilized to make the portion of the second magnetic component 211, which is located in the engagement slot 13, move into the second receiving slot 12. Next, the user can take the inserting component 2 out from the second receiving slot 12 via the main body opening O1, so as to complete the disassembly.

In addition, another disassembling manner of the magnetic assembly structure in the second embodiment is disclosed as follows. As shown in FIG. 6 and FIG. 8B (refer to FIG. 8B mainly, and refer to FIG. 6 secondarily), when disassembling, a magnetic attracting force of a provided external magnetic component MAG and the second magnetic component 211 (i.e. the N pole of the external magnetic component MAG faces the S pole of the second magnetic component 211) is utilized to make the portion of the second magnetic component 211, which is located in the engagement slot 13, move into the second receiving slot 12. Next, the user can take the inserting component 2 out from the second receiving slot 12 via the main body opening O1, so as to complete the disassembly.

Figure 9A:
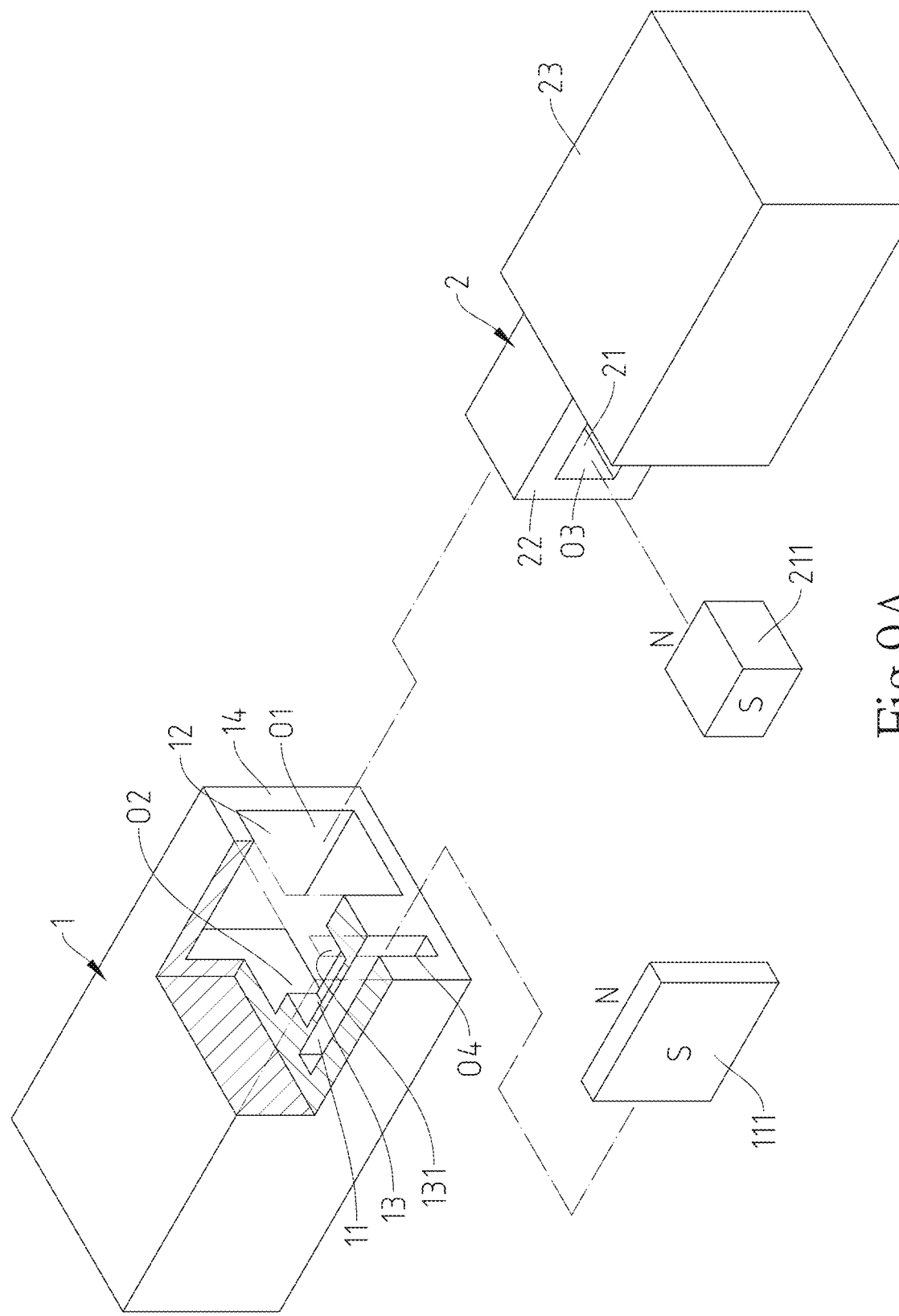
FIG. 9A is a three dimensional explosive diagram of a magnetic assembly structure provided by a third embodiment of the present disclosure.
Figure 9B:
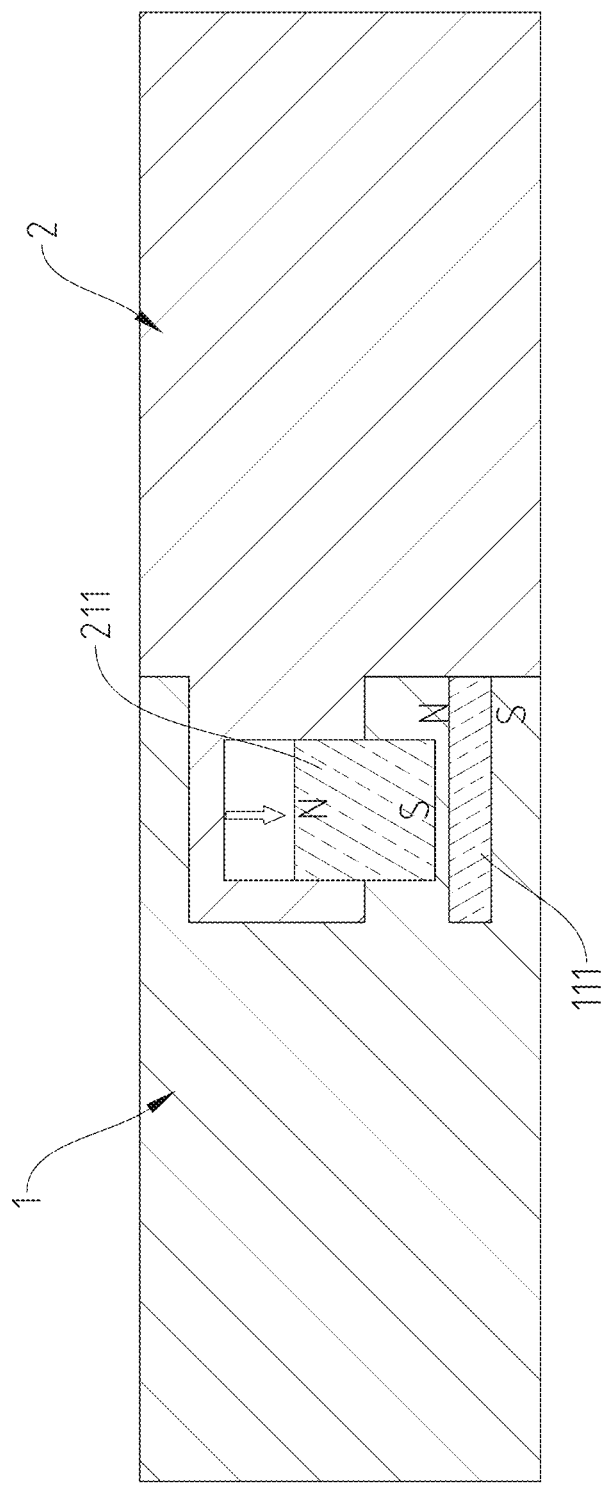
FIG. 9B is a top view of an assembled magnetic assembly structure provided by a third embodiment of the present disclosure.
Figure 9C:
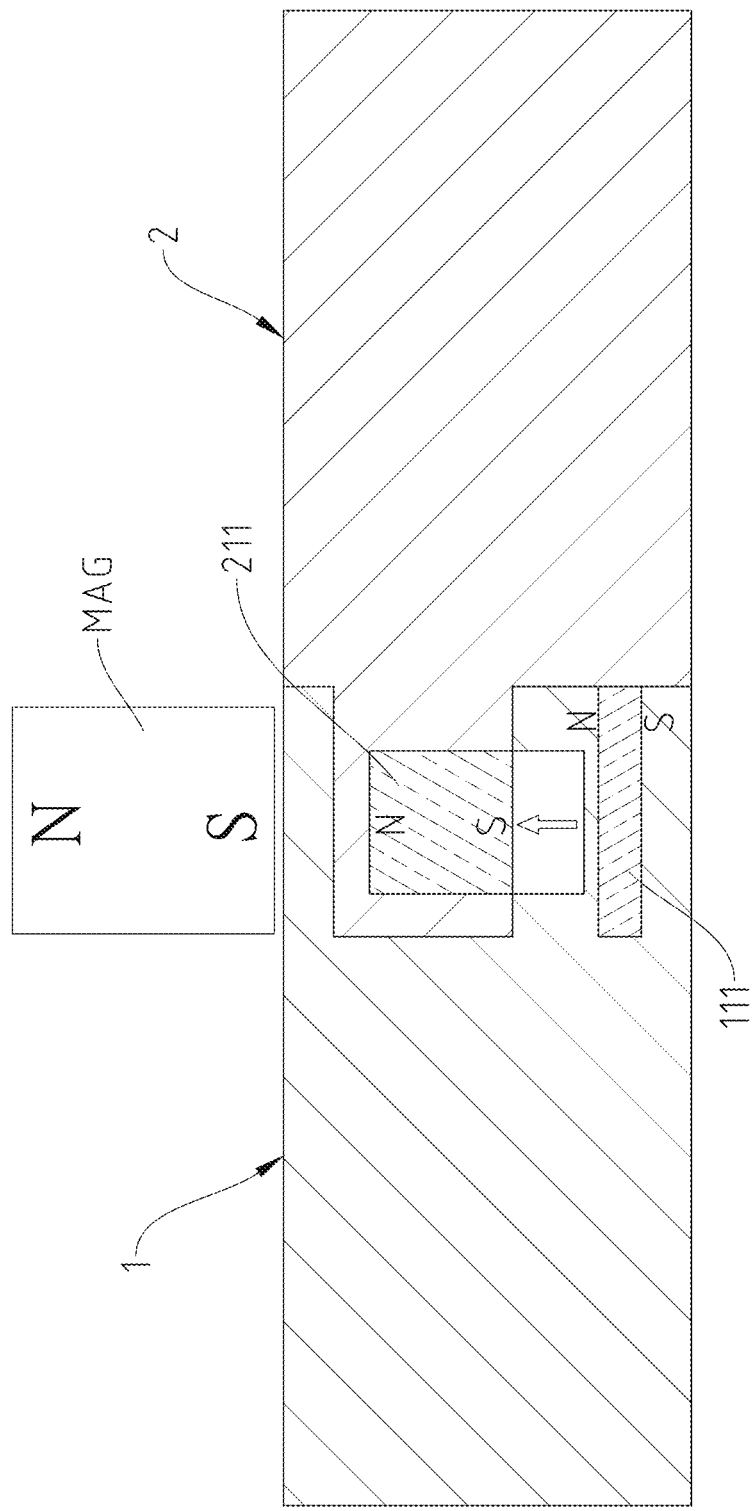
FIG. 9C is a top view of disassembling an assembled magnetic assembly structure provided by a third embodiment of the present disclosure.

FIG. 9A through FIG. 9C are used to illustrate a whole structure and an assembling/disassembling manner of a magnetic assembly structure provided by a third embodiment of the present disclosure. As shown in FIG. 9A through FIG. 9C, the differences between the third embodiment and the second embodiment are the types of the first magnetic components 111 in the two different embodiments. In the third embodiment, the first magnetic component 111 is a magnet component and the two opposite magnet poles of the first magnetic component 111 and second magnetic component 211 (i.e. the magnet poles of the first magnetic component 111 and second magnetic component 211, which face to each other) are different. For example, the N pole of the first magnetic component 111 faces the S pole of the second magnetic component 211. In addition, from the illustration of the third embodiment, the person with the ordinary skill in the art can replaces the first magnetic component 111 in the first embodiment by a magnet component.

The assembling manner of the magnetic assembly structure of the third embodiment is the same as that of the magnetic assembly structure in the second embodiment, and thus the redundant descriptions are omitted. The disassembling manner of the magnetic assembly structure of the third embodiment is illustrated as follows. As shown FIG. 9A and FIG. 9C (refer to FIG. 9C mainly, and refer to FIG. 9A secondarily), when disassembling, a magnetic attracting force of a provided external magnetic component MAG and the second magnetic component 211 (i.e. the S pole of the external magnetic component MAG faces the N pole of the second magnetic component 211) is utilized to make the portion of the second magnetic component 211, which is located in the engagement slot 13, move into the second receiving slot 12. Next, the user can take the inserting component 2 out from the second receiving slot 12 via the main body opening O1, so as to complete the disassembly.

Figure 10A:
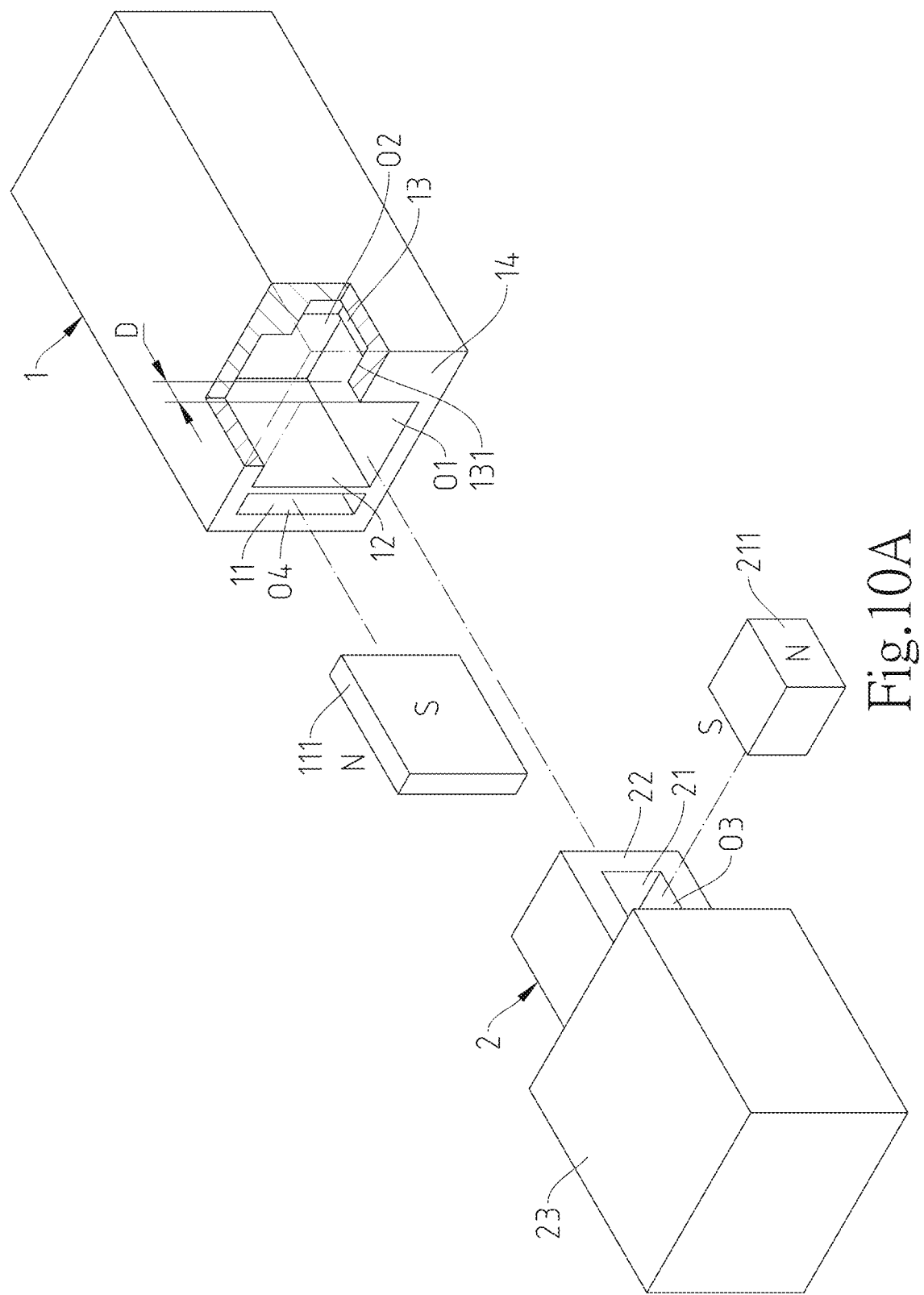
FIG. 10A is a three dimensional explosive diagram of a magnetic assembly structure provided by a fourth embodiment of the present disclosure.
Figure 10B:
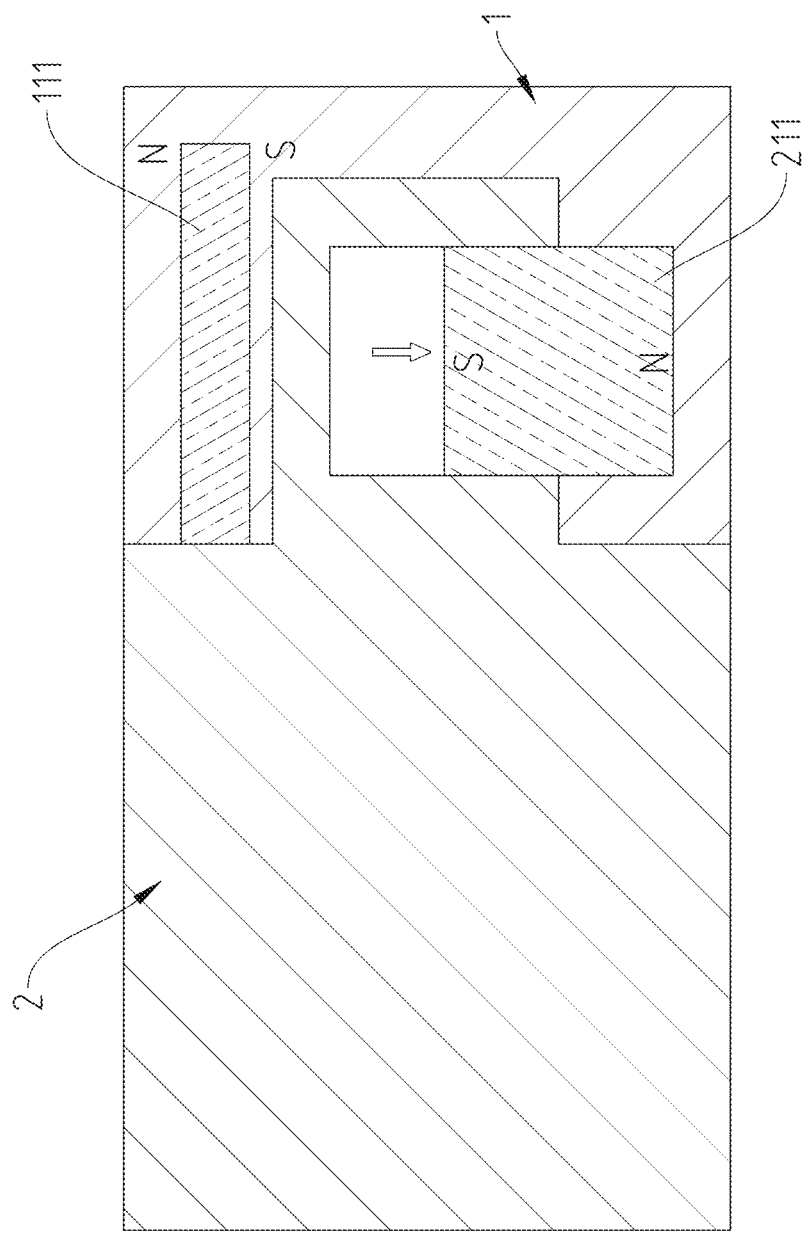
FIG. 10B is a top view of an assembled magnetic assembly structure provided by a fourth embodiment of the present disclosure.
Figure 10C:
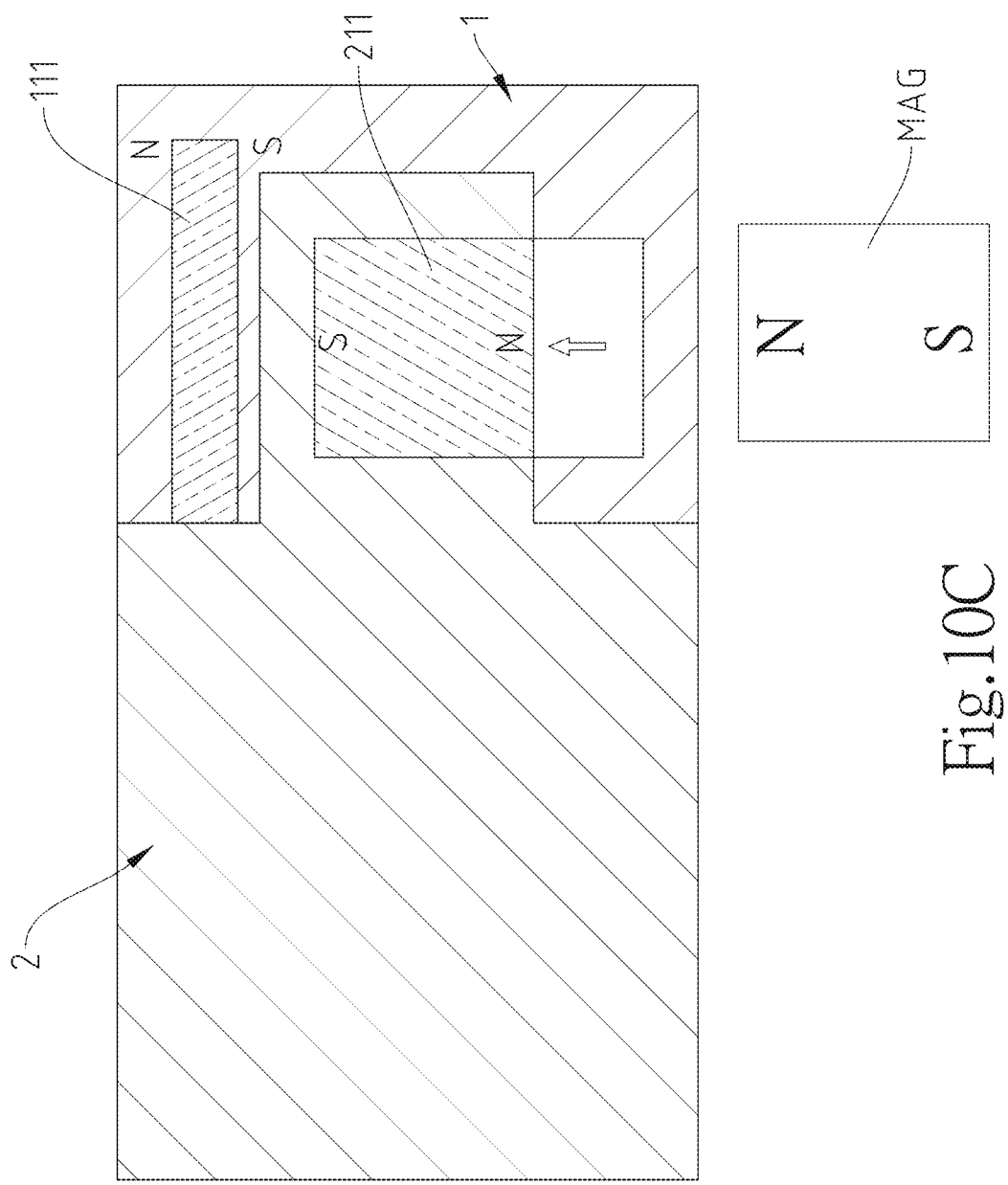
FIG. 10C is a top view of disassembling an assembled magnetic assembly structure provided by a fourth embodiment of the present disclosure.

FIG. 10A through FIG. 10C are used to illustrate a whole structure and an assembling/disassembling manner of a magnetic assembly structure provided by a fourth embodiment of the present disclosure. As shown in FIG. 10A through FIG. 10C, the differences between the fourth embodiment and the third embodiment are allocations of the engagement slots 13 in the two different embodiments. In the fourth embodiment, the second receiving slot 12 is disposed between the first receiving slot 11 and the engagement slot 13, and when assembling, the magnetic repulsive force of the second magnetic component 211 and the first magnetic component 111 makes the second magnetic component 211 move into the engagement slot 13 (as shown in FIG. 10B). The first magnetic component 111 and the second magnetic component 211 are two magnet components, and two opposite magnet poles of the first magnetic component 111 and the second magnetic component 211 are identical, for example, S poles. Additionally, when disassembling, a magnetic repulsive force of a provided external magnetic component MAG and the second magnetic component 211 is utilized to make the portion of the second magnetic component 211, which is located in the engagement slot 13, move into the second receiving slot 12 (see FIG. 10C). Next, the user can take the inserting component 2 out from the second receiving slot 12 via the main body opening O1, so as to complete the disassembly.

Figure 11A:
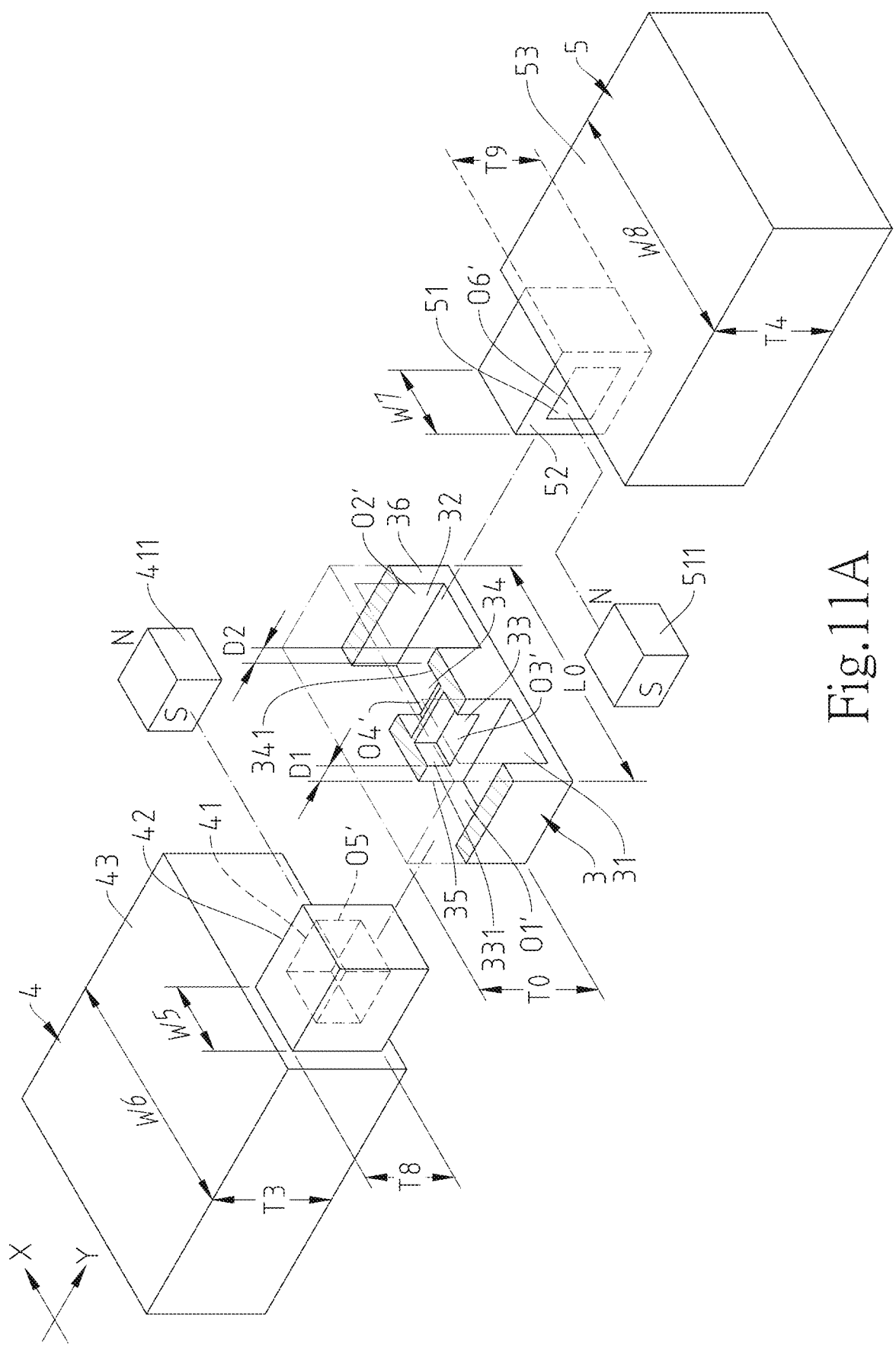
FIG. 11A is a three dimensional explosive diagram of a magnetic assembly structure provided by a fifth embodiment of the present disclosure.
Figure 11B:
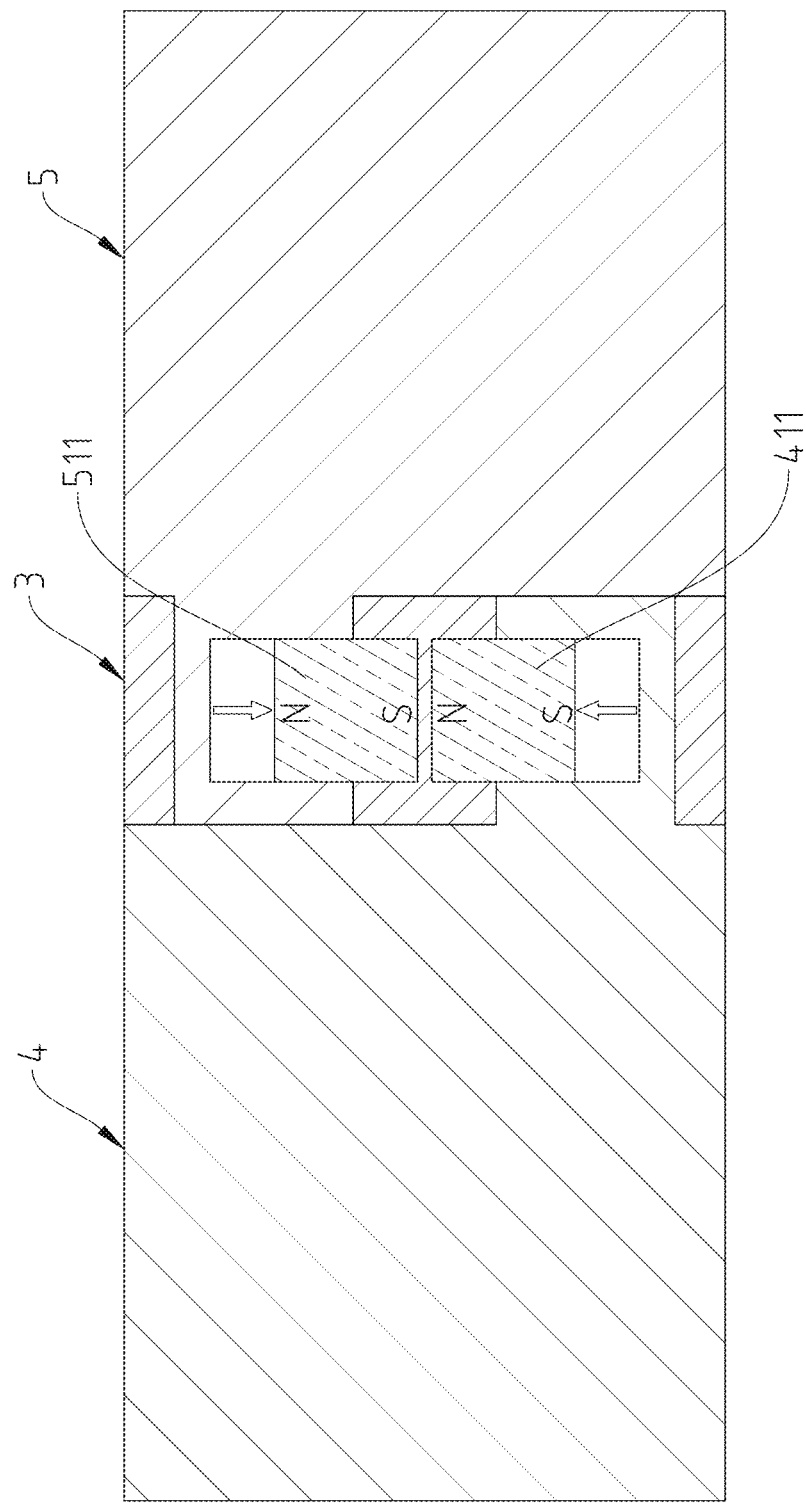
FIG. 11B is a top view of an assembled magnetic assembly structure provided by a fifth embodiment of the present disclosure.
Figure 11C:
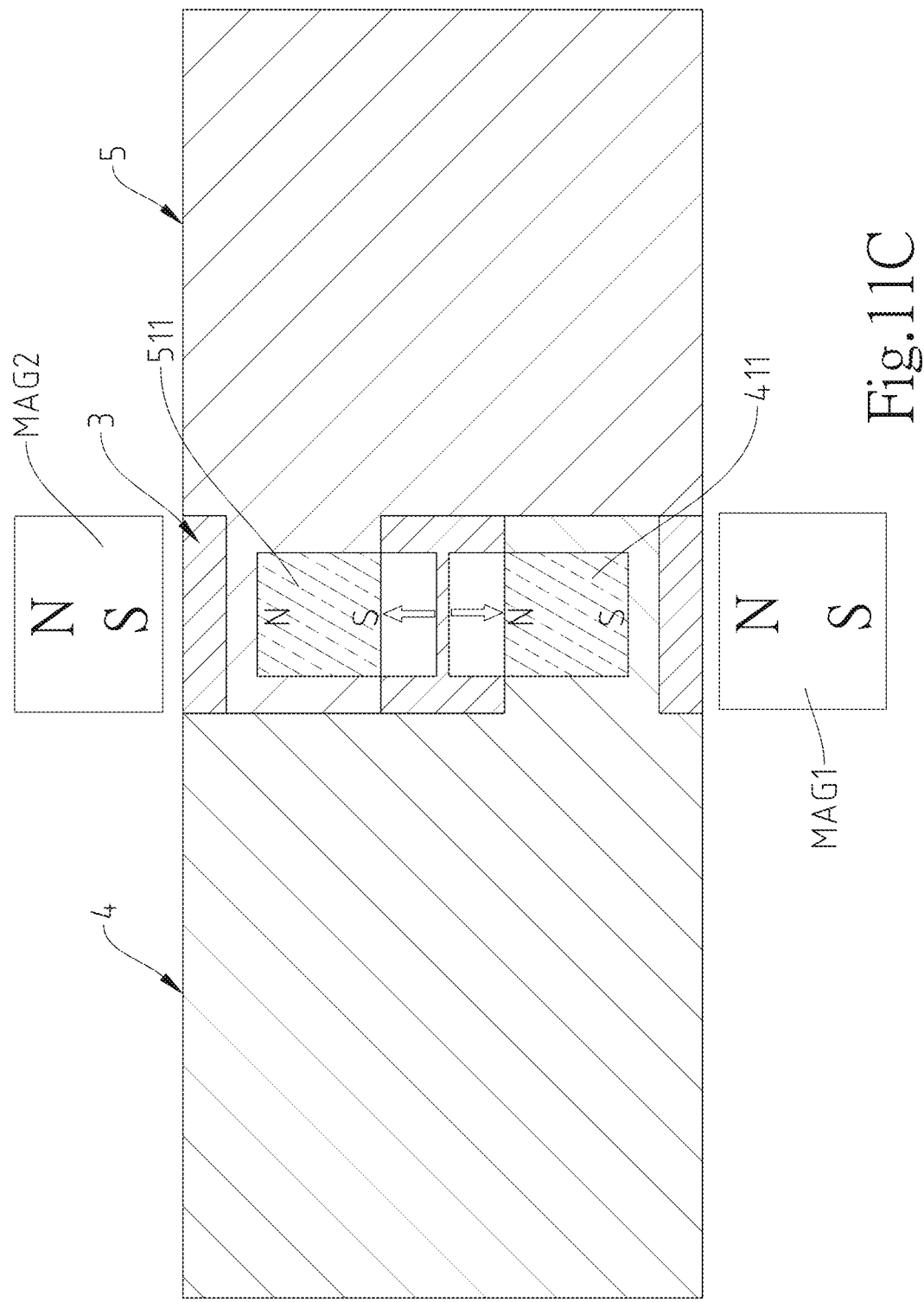
FIG. 11C is a top view of disassembling an assembled magnetic assembly structure provided by a fifth embodiment of the present disclosure.

FIG. 11A through FIG. 11C are used to illustrate a whole structure and an assembling/disassembling manner of a magnetic assembly structure provided by a fifth embodiment of the present disclosure. The differences between the magnetic assembly structure in the fifth embodiment and the magnetic assembly structure in the first through second embodiments are that the magnetic assembly structure comprises a plurality of inserting components, and the main body does not comprise the magnetic component. Referring to FIG. 11A, the magnetic assembly structure comprises a main body 3, a first inserting component 4 and a second inserting component 5. The main body 3 extends along a first direction X, the first inserting component 4 and the second inserting component 5 extend along the second direction Y being vertical to the first direction X. The two back ends of the first inserting component 4 and the second inserting component 5 are respectively the first bulk portion 43 and the second bulk portion 53. The widths W5, W7 and the thicknesses T8, T9 of the two front ends of the first inserting component 4 and the second inserting component 5 are respectively less than the widths W6, W8 and the thicknesses T3, T4 of the two back ends of the first inserting component 4 and the second inserting component 5, and the widths W6, W8 and the thicknesses T3, T4 of the two back ends of the first inserting component 4 and the second inserting component 5 are equal to the length L0 and the thickness T0 of the main body 3.

In other words, section areas of the first bulk portion 43 and the second bulk portion 53 of the first inserting component 4 and the second inserting component 5, which face the second direction Y, are equal to the section area of the main body, which faces the second direction Y. Thus, the assembled magnetic assembly structure is almost one part, the joint surface is almost flat, and merely tiny thin line between the main body 3, the first inserting component 4 and the second inserting component 5 can be seen. In the fifth embodiment, the magnetic assembly structure can also be applied in the furniture, daily necessity and electronic equipment, and the present disclosure is not limited thereto, thus having a wide application scope. For example, the main body 3 can be a table intermediate part, the first inserting component 4 can be the main table leg body, and the second inserting component 5 can be the extension table leg part, so as to form a longer table leg. Since the assembled magnetic assembly structure has the almost flat joint surface, being not like the conventional assembly structure, the assembled magnetic assembly structure has no non-flat joint surfaces which may be hook by the user to cause the damage or danger, and the magnetic assembly structure in the fifth embodiment has the higher safety.

The main body 3 has a first receiving slot 31, a second receiving slot 32, a first engagement slot 33, a second engagement slot 34, a first main body surface 35 and a second main body surface 36, wherein the first main body surface 35 is disposed corresponding to the second main body surface 36. The first receiving slot 31 penetrates the first main body surface 35 to form a first main body opening O1' on the first main body surface 35, and the second receiving slot 32 penetrates the second main body surface 36 to form a second main body opening O2' on the second main body surface 36. The first engagement slot 33 and the second engagement slot 34 are respectively communicated with the first receiving slot 31 and the second receiving slot 32 via the first communicating opening O3' and the second communicating opening O4', and respectively have a first contacting surface 331 and a second contacting surface 341, which are respectively away from the first main body surface 35 and the second main body surface 36 with a first distance D1 and a second distance D2. The first engagement slot 33 and the second engagement slot 34 are disposed between the first receiving slot 31 and the second receiving slot 32.

The first inserting component 4 has a first magnetic component receiving slot 41 and a first inserting component surface 42, the first magnetic component receiving slot 41 penetrates the first inserting component surface 42 to form a first inserting component opening O5' on the first inserting component surface 42, and the first magnetic component 411 is disposed in the first magnetic component receiving slot 41 via the first inserting component opening O5'. The second inserting component 5 has a second magnetic component receiving slot 51 and a second inserting component surface 52, the second magnetic component receiving slot 51 penetrates the second inserting component surface 52 to form a second inserting component opening O6' on the second inserting component surface 52, and the second magnetic component 511 is disposed in the second magnetic component receiving slot 51 via the second inserting component opening O6'. The first magnetic component 411 and the second magnetic component 511 are magnet components, and two opposite magnet poles of the first magnetic component 411 and the second magnetic component 511 are respectively an N pole and an S pole.

As shown FIG. 11A and FIG. 11B (refer to FIG. 11B mainly, and refer to FIG. 11A secondarily), when assembling, the first inserting component 4 and the second inserting component 5 are respectively into the first receiving slot 31 and the second receiving slot 32 via the first main body opening O1' and the second main body opening O2'. Specifically, the section area of the first main body opening O1' can be larger than or equal to the section area of first inserting component 4, which faces the first main body opening O1', such that the first inserting component 4 can be inserted into the first receiving slot 31 via the first main body opening O1'; the section area of the second main body opening O2' can be larger than or equal to the section area of second inserting component 5, which faces the second main body opening O2', such that the second inserting component 5 can be inserted into the second receiving slot 32 via the second main body opening O2'.

After the user inserts the first inserting component 4 and the second inserting component 5 into the first receiving slot 31 and the second receiving slot 32, via a magnetic attracting force induced by the first magnetic component 411 and the second magnetic component 511, the first magnetic component 411 sequentially passes the first inserting component opening O5' and the first communicating opening O3' to move into the first engagement slot 33, and via a magnetic attracting force induced by the first magnetic component 411 and the second magnetic component 511, the second magnetic component 511 sequentially passes the second inserting component opening O6' and the second communicating opening O4' to move into the second engagement slot 34, wherein portions of the first magnetic component 411 and the second magnetic component 511 respectively move into the first engagement slot 33 and the second engagement slot 34, and other portions of the first magnetic component 411 and the second magnetic component 511 respectively stay in the first receiving slot 31 and the second receiving slot 32. The first magnetic component 411 and the second magnetic component 511 respectively contact the first contacting surface 331 and the second contacting surface 341, so as to prevent the first inserting component 4 and the second inserting component 5 from respectively sliding out from the first receiving slot 31 and the second receiving slot 32. Specifically, the section area of the first communicating opening O3' can be larger than or equal to the section area of the first inserting component opening O5', such that the first magnetic component 411 can move into the first engagement slot 31; and the section are of the second communicating opening O4' can be larger than or equal to the section area of the second inserting component opening O6', such that the second magnetic component 511 can move into the second engagement slot 32. Since the first magnetic component 411 and the second magnetic component 511 move into the first engagement slot 33 and the second engagement slot 34 due to the magnetic force, the fixing and screwing manners are not required, and the magnetic assembly structure has an advantage of assembling with a less force.

As shown FIG. 11A and FIG. 11C (refer to FIG. 11C mainly, and refer to FIG. 11A secondarily), when disassembling, a magnetic attracting force of a provided first external magnetic component MAG1 and the first magnetic component 411 (i.e. the N pole of the first external magnetic component MAG1 faces the S pole of the first magnetic component 411) is utilized to make the portion of the first magnetic component 411, which is located in the first engagement slot 33, move to the first receiving slot 31, and a magnetic attracting force of a provided second external magnetic component MAG2 and the second magnetic component 511 (i.e. the S pole of the second external magnetic component MAG2 faces the N pole of the second magnetic component 511) is utilized to make the portion of the second magnetic component 511, which is located in the second engagement slot 34, move to the second receiving slot 32. Next, the first inserting component 4 and the second inserting component 5 are taken out from the first receiving slot 31 and the second receiving slot 32 via the first main body opening O1' and the second main body opening O2', so as to complete the disassembly.

Additionally, allocations of the first receiving slot 31, the second receiving slot 32, the first engagement slot 33 and the second engagement slot 34 in the fifth embodiment can be changed to be that the first receiving slot 31 and the second receiving slot 32 are disposed between the first engagement slot 33 and the second engagement slot 34, and meanwhile, the first magnetic component 411 and the second magnetic component 511 are two magnet components and two opposite magnet poles of the first magnetic component 411 and the second magnetic component 511 are identical, for example, N poles. Thus, when assembling, a magnetic repulsive force of the first magnetic component 411 and the second magnetic component 511 can make the first magnetic component 411 and the second magnetic component 511 respectively move into the first engagement slot 33 and the second engagement slot 34. When disassembling, magnetic repulsive forces provided by the first external magnetic component MAG1 and the second external magnetic component MAG2 are utilized to make the portions of the first magnetic component 411 and the second magnetic component 511, which are respectively located in the first engagement slot 33 and the second engagement slot 34, move to the first engagement slot 31 and the second receiving slot 32.

Refer to FIG. 11D, and FIG. 11D is a top view of disassembling an assembled magnetic assembly structure provided by a sixth embodiment of the present disclosure. The differences between the fifth and sixth embodiments are illustrated as follows. The first engagement slot 33 and the second engagement slot 34 in the fifth embodiment have a wall therebetween, but the first engagement slot 33 and the second engagement slot 34 have no walls therebetween and are communicated with each other. When assembling, via the magnetic attracting force induced between the first magnetic component 411 and the second magnetic component 511, the first magnetic component 411 and the second magnetic component 511 respectively enter the first engagement slot 33 and the second engagement slot 34. When disassembling, the first external magnetic component MAG1 and the second external magnetic component MAG2 are utilized to provide the magnetic attracting force to make a portion of the first magnetic component 411 in the first engagement slot 33 and a portion the second magnetic component 511 in the second engagement slot 34 respectively move to the first receiving slot 31 (or the first magnetic component receiving slot 41) and the second receiving slot 32 (or the second magnetic component receiving slot 51) from the first engagement slot 33 and the second engagement slot 34, and then the first inserting component 4 and the second inserting component 5 can be removed from the main body 3.

Figure 11E:
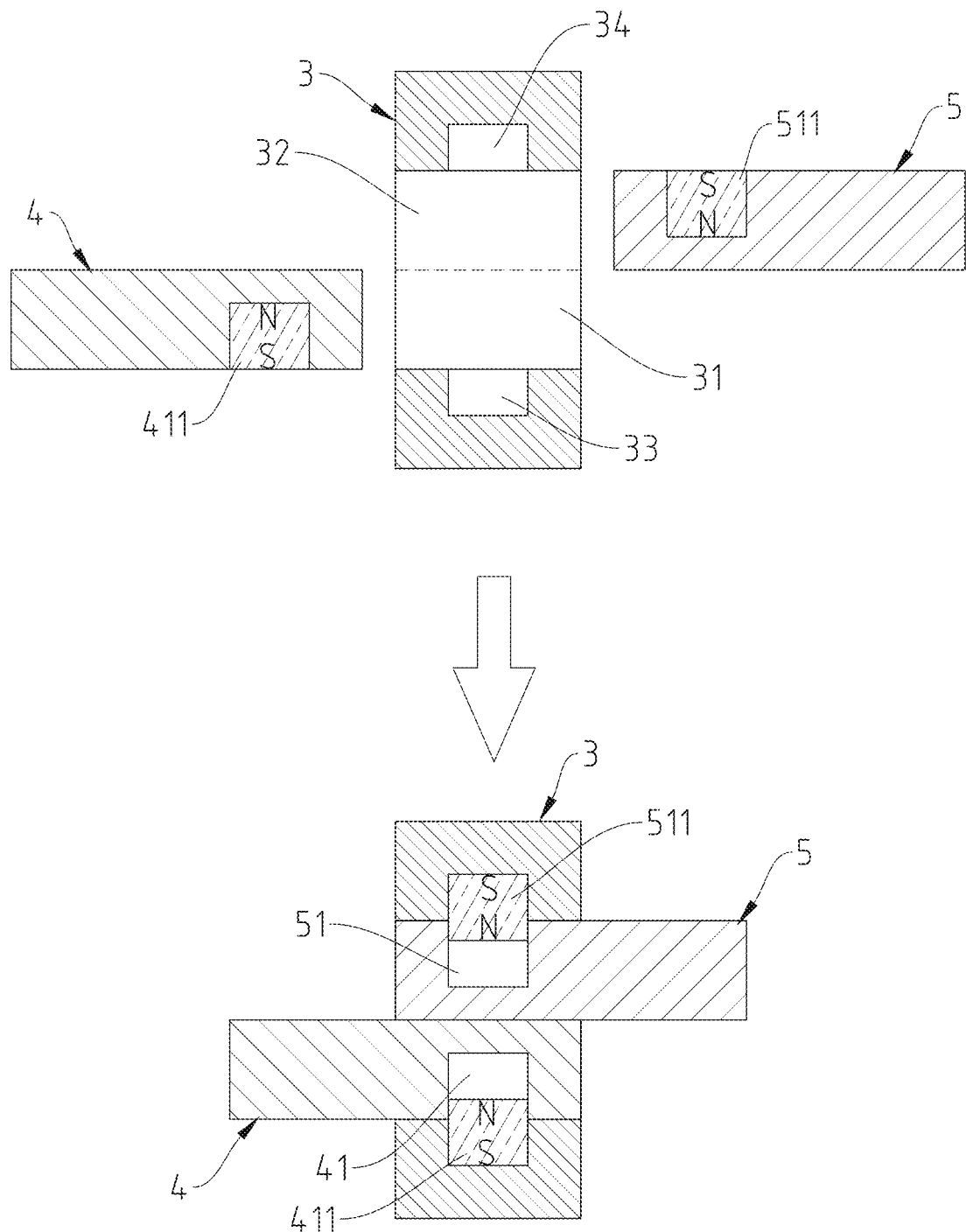
FIG. 11E is a top view of assembling a magnetic assembly structure provided by a seventh embodiment of the present disclosure.

Refer to FIG. 11E, and FIG. 11E is a top view of assembling a magnetic assembly structure provided by a seventh embodiment of the present disclosure. The differences between the fifth and seventh embodiments are illustrated as follows. In the seventh embodiments, the first receiving slot 31 and the second receiving slot 32 are communicated with each other, and the first engagement slot 33 and the second engagement slot 34 are disposed on two opposite sides of the first receiving slot 31 and the second receiving slot 32 being communicated with each other. When assembling, the first inserting component 4 and the second inserting component 5 respectively enter the first receiving slot 31 and the second receiving slot 32 and contact each other, and via the magnetic repulsive force induced between the first magnetic component 411 and the second magnetic component 511, the first magnetic component 411 and the second magnetic component 511 respectively enter the first engagement slot 33 and the second engagement slot 34. When disassembling, the first external magnetic component and the second external magnetic component are utilized to provide the magnetic repulsive force to make a portion of the first magnetic component 411 in the first engagement slot 33 and a portion the second magnetic component 511 in the second engagement slot 34 respectively move to the first receiving slot 31 (or the first magnetic component receiving slot 41) and the second receiving slot 32 (or the second magnetic component receiving slot 51) from the first engagement slot 33 and the second engagement slot 34, and then the first inserting component 4 and the second inserting component 5 can be removed from the main body 3.

Figure 11F:
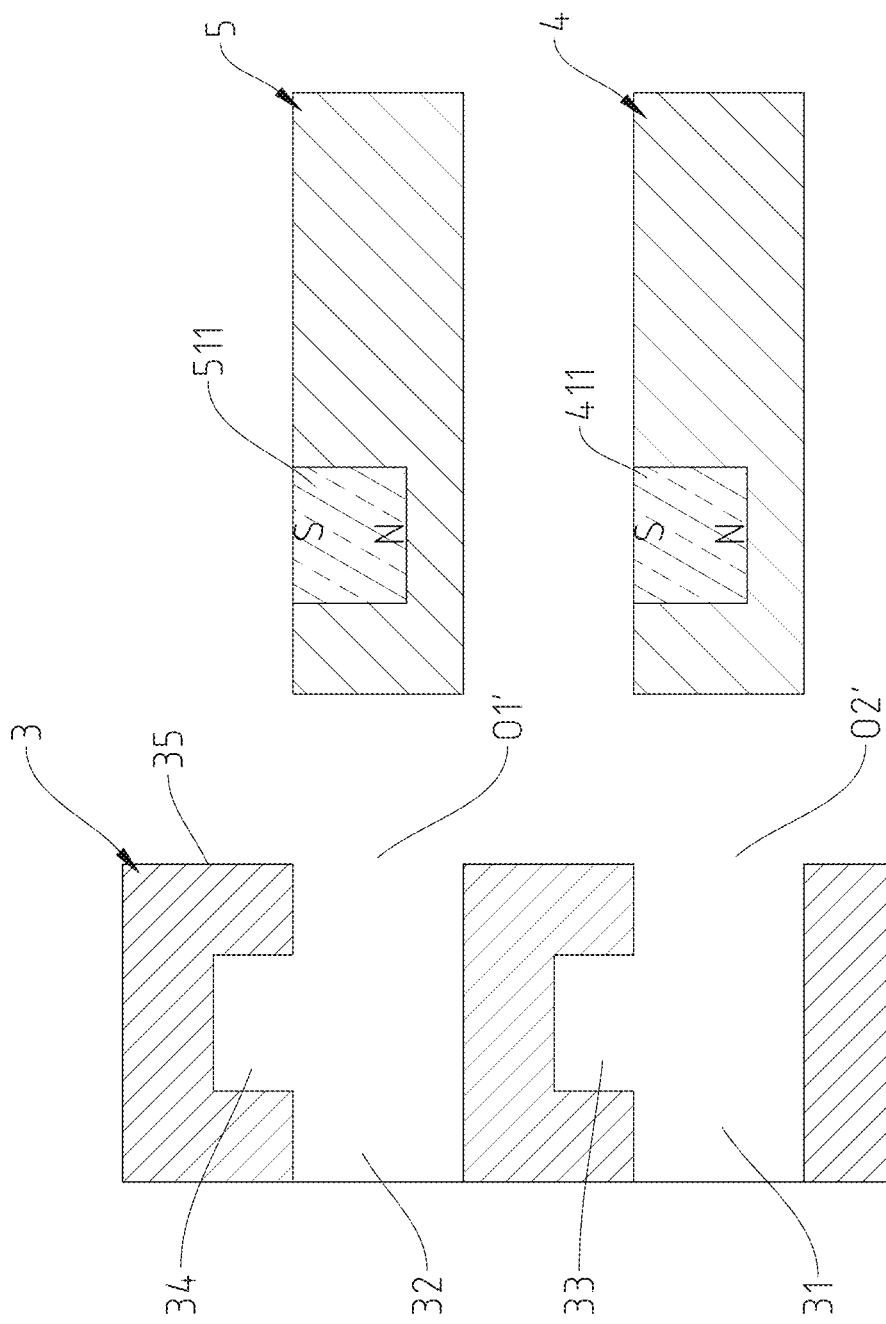
FIG. 11F is a top view of a magnetic assembly structure provided by an eighth embodiment of the present disclosure.

Refer to FIG. 11F, and FIG. 11F is a top view of a magnetic assembly structure provided by an eighth embodiment of the present disclosure. In the top view, from top to bottom, the main body sequentially has the first receiving slot 31, the first engagement slot 33, the second receiving slot 32 and the second engagement slot 34, and that is, the receiving slots and the engagement slots are offset arranged. The main body surface has a first main body opening O1' of the first receiving slot 31 and a second main body opening O2' of the second receiving slot 32. When assembling, the first inserting component 4 and the second inserting component 5 respectively enter the first receiving slot 31 and the second receiving slot 32, and the first external magnetic component and the second external magnetic component are utilized to respectively provide the magnetic repulsive and attracting forces to make the first magnetic component 411 and the second magnetic component 511 respectively enter the first engagement slot 33 and the second engagement slot 34. When disassembling, the first external magnetic component and the second external magnetic component are utilized to provide the magnetic attracting and repulsive forces to make a portion of the first magnetic component 411 in the first engagement slot 33 and a portion the second magnetic component 511 in the second engagement slot 34 respectively move to the first receiving slot 31 (or the first magnetic component receiving slot 41) and the second receiving slot 32 (or the second magnetic component receiving slot 51) from the first engagement slot 33 and the second engagement slot 34, and then the first inserting component 4 and the second inserting component 5 can be removed from the main body 3.

Figure 11G:
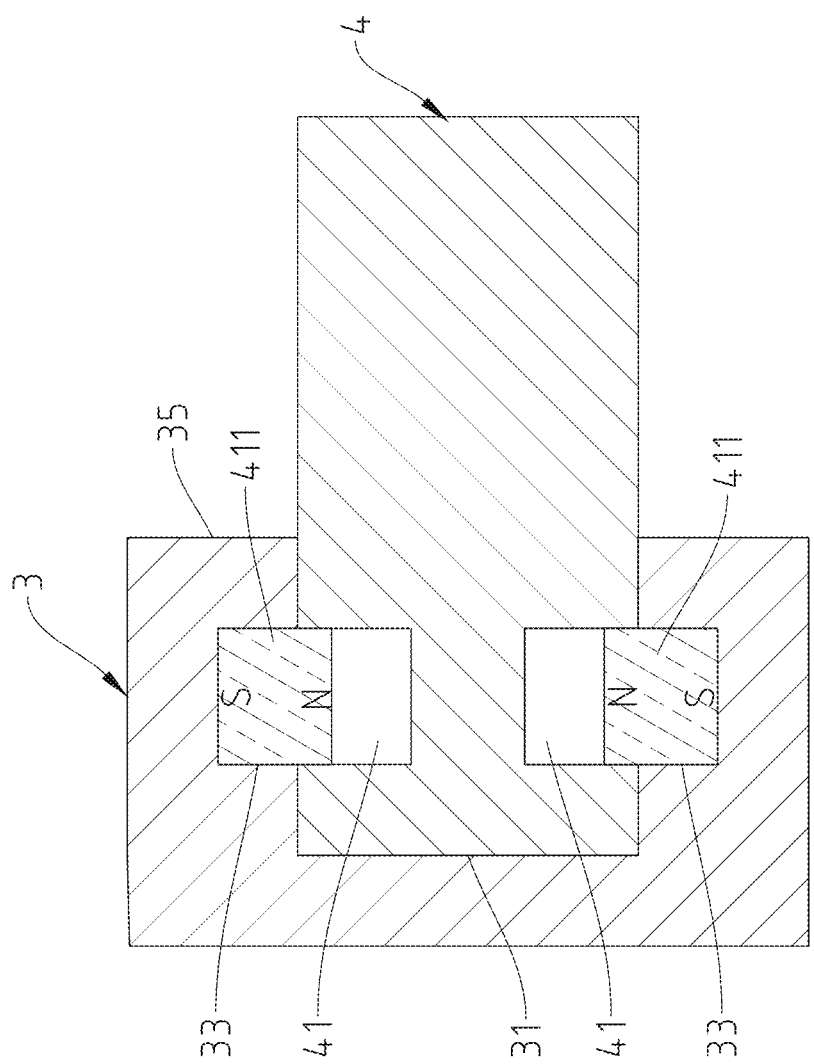
FIG. 11G is a top view of assembling a magnetic assembly structure provided by a ninth embodiment of the present disclosure.

Refer to FIG. 11G, and FIG. 11G is a top view of assembling a magnetic assembly structure provided by a ninth embodiment of the present disclosure. In the embodiment, the magnetic assembly structure merely has the first inserting component 4 and does not have the second inserting component 5. The first inserting component 4 has two first magnetic components 411 disposed on the two first magnetic component receiving slots 41, the main body 3 merely has the first receiving slot 31 and does not have the second receiving slot 32, and main body 3 has the two first engagement slots 33 communicated to the first receiving slot 31. When assembling, a hand is used to press the first magnetic components 411, then the first inserting component is moved into the first receiving slot 31, and next, via the magnetic repulsive force of the first magnetic components 411, the first magnetic components 411 enter the two first engagement slots 33. When disassembling, the first external magnetic component and the second external magnetic component are utilized to provide the magnetic repulsive force to make portions of the first magnetic components 411 in the first engagement slots 33 move to the first receiving slots 31 (or the first magnetic component receiving slots 41) from the first engagement slots 33, and then the first inserting component 4 can be removed from the main body 3.

Figure 11H:
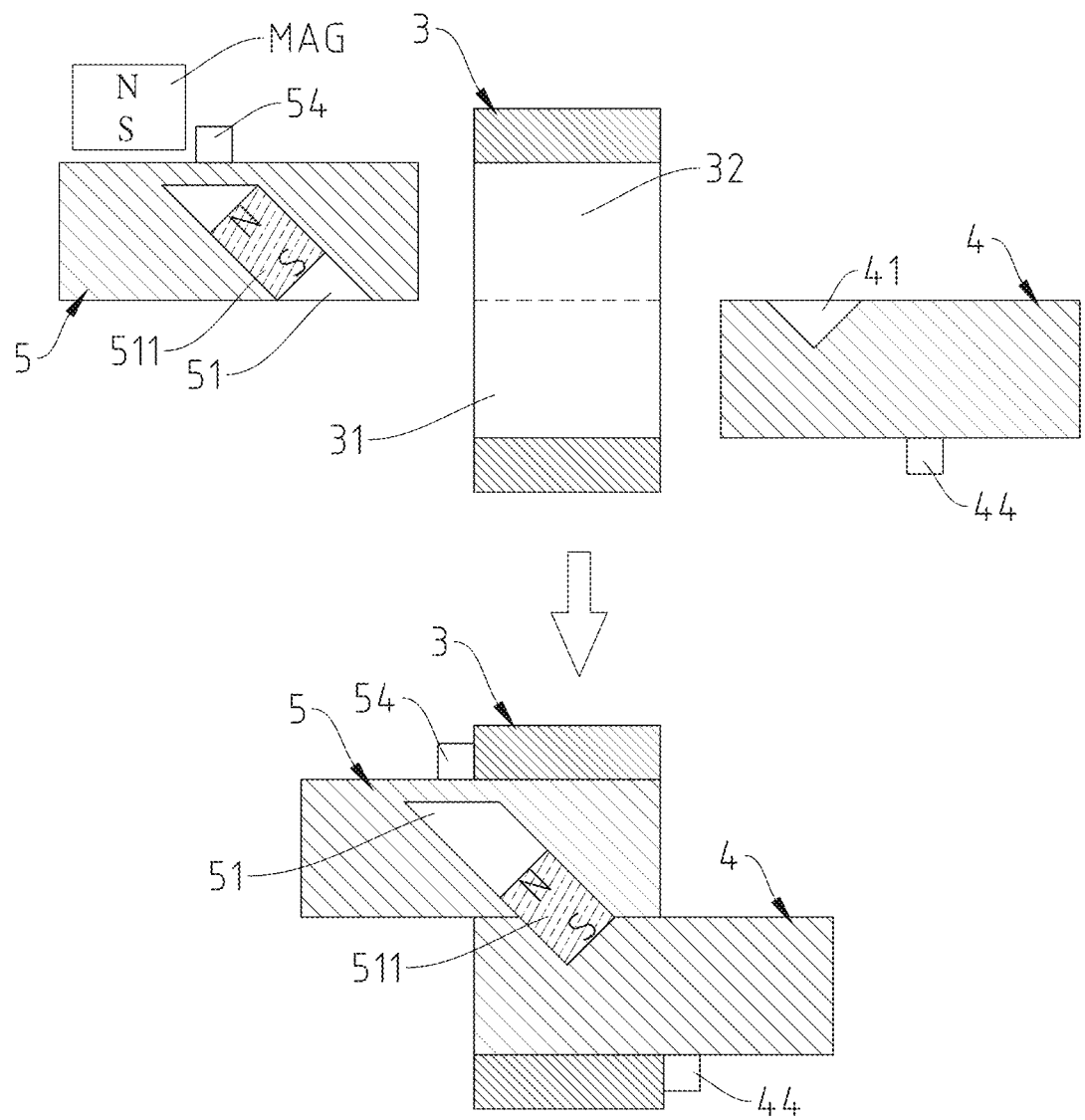
FIG. 11H is a side view of assembling a magnetic assembly structure provided by a tenth embodiment of the present disclosure.

Refer to FIG. 11H, and FIG. 11H is a side view of assembling a magnetic assembly structure provided by a tenth embodiment of the present disclosure. In the embodiment, the main body 3 merely has one receiving slot (formed by the first and second receiving slots 31, 32 being communicated with each other), and the main body 3 does not has any engagement slot. The first inserting component 4 has no first magnetic components, and the second inserting component 5 has the second magnetic component 511. The shapes of the first and second magnetic component receiving slots 41, 51 are bevel polygons, for example, the shapes of the first and second magnetic component receiving slots 41, 51 are respectively a triangle and a parallelogram. Further, the first and second inserting components 4, 5 respectively comprise a first limit block 44 and a second limit block 54. When assembling, the external magnetic component MAG is utilized to provide the magnetic attracting force to attract the second magnetic component 511 to make the first and second inserting components 4, 5 enter the first and second receiving slots 31, 32, thus, the first and second limit blocks 44, 54 contact the main body 3, and next, the external magnetic component MAG is removed to make a portion of the second magnetic component 511 enter the first magnetic component receiving slot 41 due to gravity. When disassembling, the external magnetic component MAG is utilized to provide the magnetic attracting force to attract the second magnetic component 511, a portion of the second magnetic component 511 in the first magnetic component receiving slot 41 moves to the second magnetic component receiving slot 51, and next, the first and second inserting components 4, 5 can be removed from the main body 3.

Figure 11I:
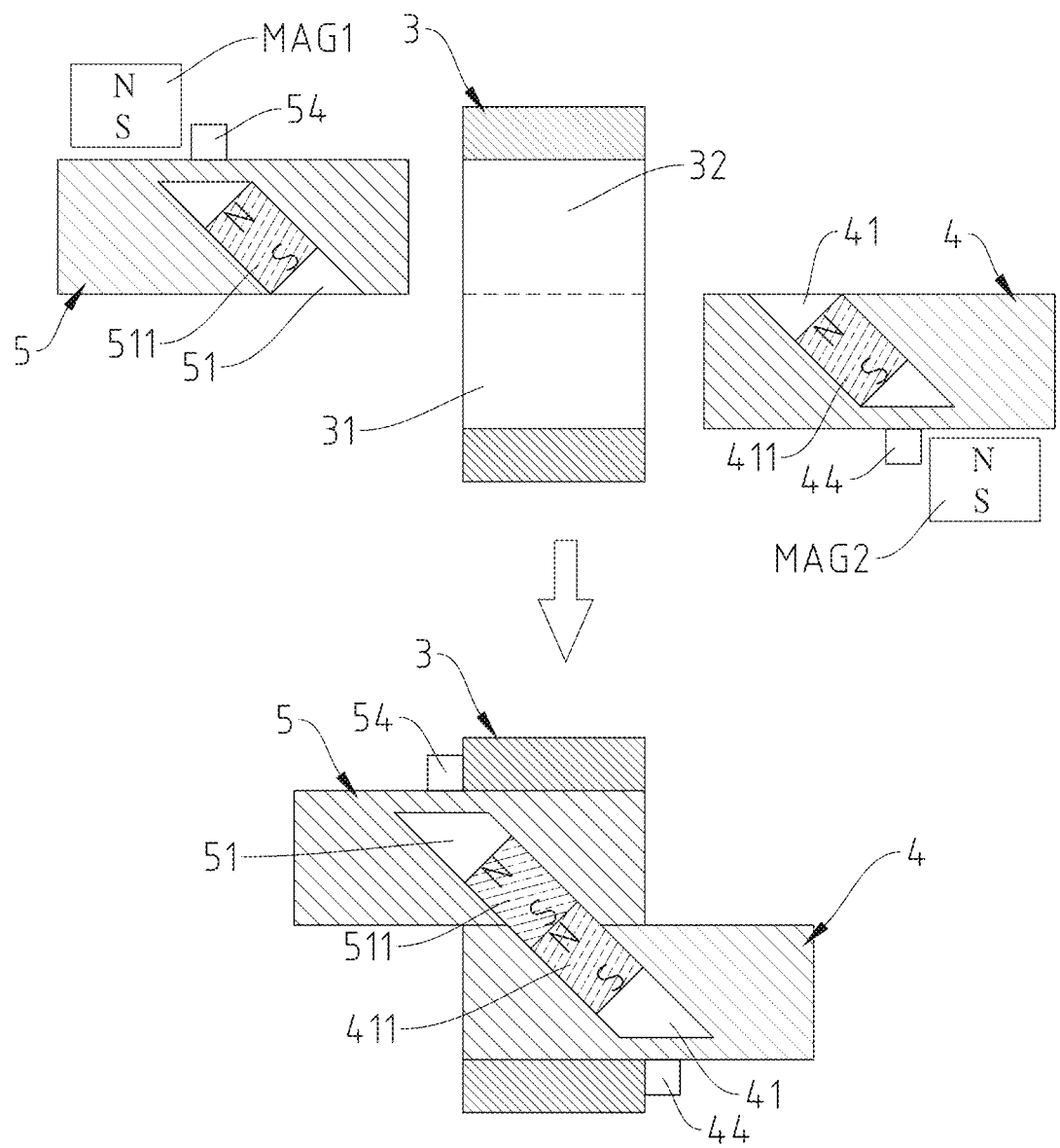
FIG. 11I is a side view of assembling a magnetic assembly structure provided by an eleventh embodiment of the present disclosure.

Refer to FIG. 11I, and FIG. 11I is a side view of assembling a magnetic assembly structure provided by an eleventh embodiment of the present disclosure. In the embodiment, the main body 3 merely has one receiving slot (formed by the first and second receiving slots 31, 32 being communicated with each other), and the main body 3 does not has any engagement slot. The first inserting component 4 has a first magnetic component 411, and the second inserting component 5 has the second magnetic component 511. The shapes of the first and second magnetic component receiving slots 41, 51 are bevel polygons, for example, the shapes of the first and second magnetic component receiving slots 41, 51 are parallelograms. Further, the first and second inserting components 4, 5 respectively comprise a first limit block 44 and a second limit block 54. When assembling, the first and second external magnetic components MAG1, MAG2 are utilized to provide the magnetic attracting force to attract the first and second magnetic components 411, 511 to make the first and second inserting components 4, 5 enter the first and second receiving slots 31, 32, thus, the first and second limit blocks 44, 54 contact the main body 3, and next, the first and second external magnetic components are removed to make a portion of the second magnetic component 511 respectively enter the first magnetic component receiving slot 41 due to gravity, or alternatively, via the magnetic attracting force of the first and second magnetic components 411, 511, a portion of the second magnetic component 511 enters the first magnetic component receiving slot 41 and/or a portion of the first magnetic component 411 enters the second magnetic component receiving slot 51. When disassembling, the first and second external magnetic components MAG1, MAG2 are utilized to provide the magnetic attracting force to make a portion of the second magnetic component 511 in the first magnetic component receiving slot 41 and/or a portion of the first magnetic component 411 in the second magnetic component receiving slot 51 move to the second magnetic component receiving slot 51 and/or the first magnetic component receiving slot 41, and next, the first and second inserting components 4, 5 can be removed from the main body 3.

Figure 12A:
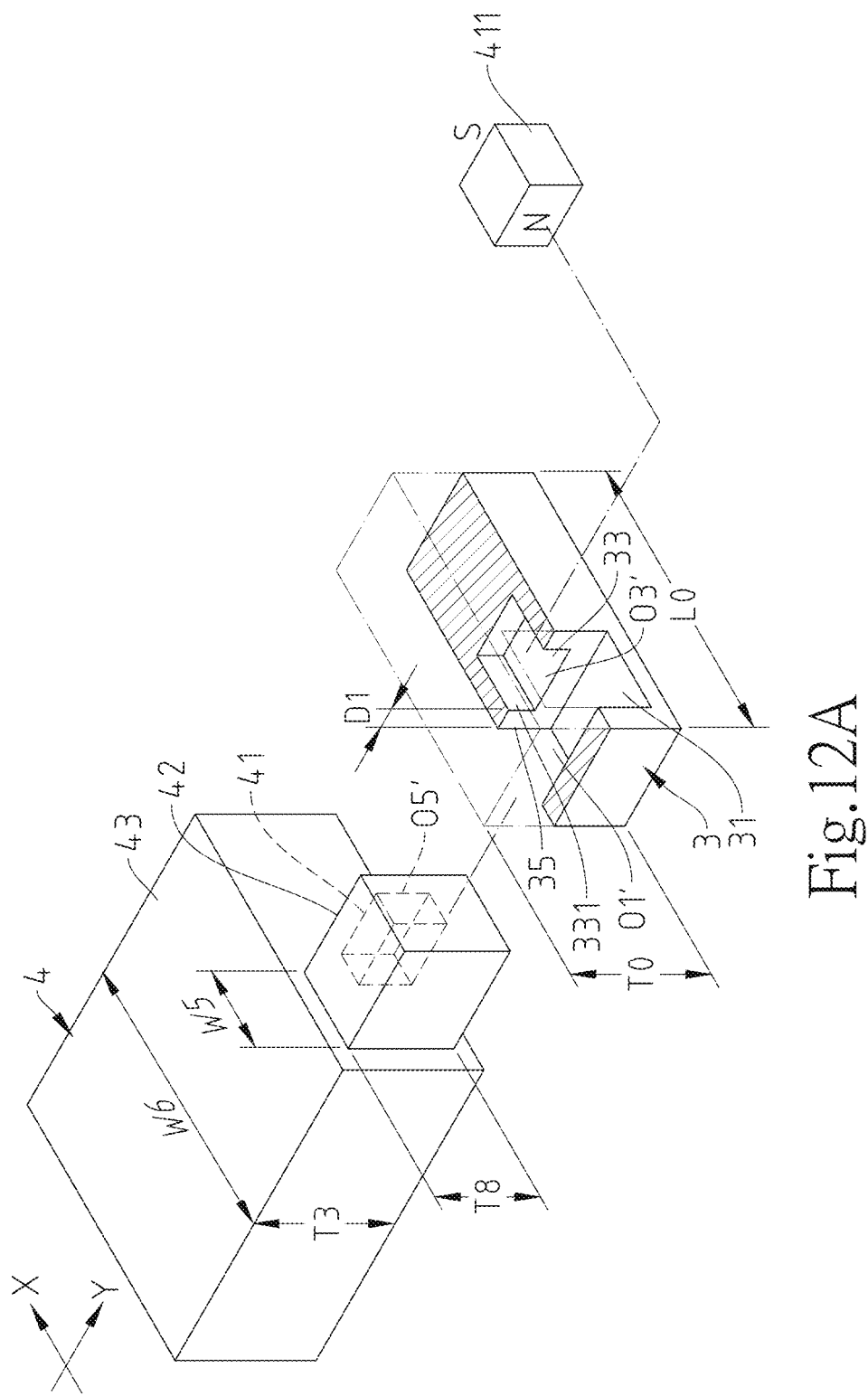
FIG. 12A is a three dimensional explosive diagram of a magnetic assembly structure provided by a twelfth embodiment of the present disclosure.
Figure 12B:
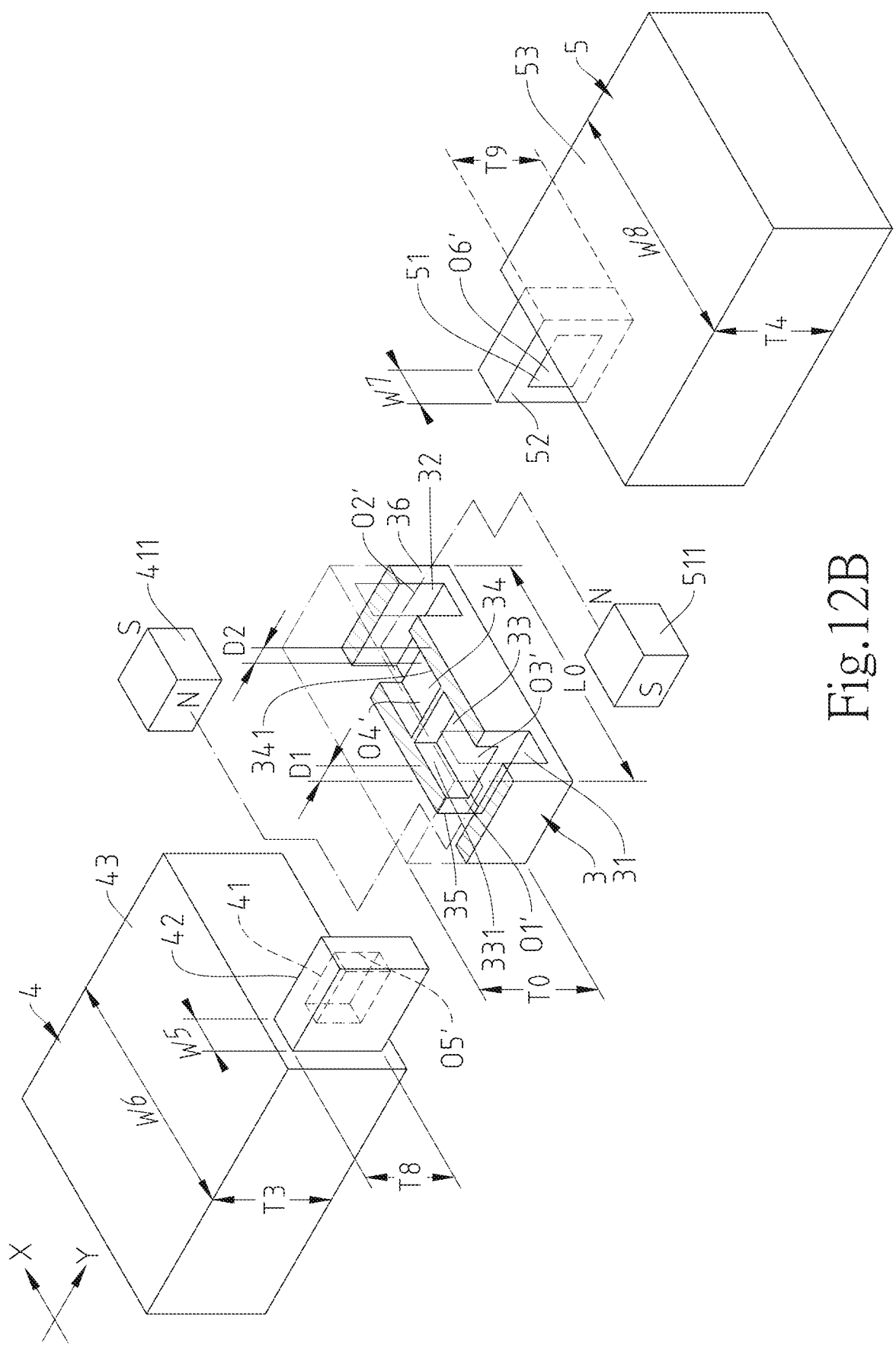
FIG. 12B is a three dimensional explosive diagram of a magnetic assembly structure provided by a thirteenth embodiment of the present disclosure.

Refer to FIG. 12A, and FIG. 12A is a three-dimensional explosive diagram of a magnetic assembly structure provided by a twelfth embodiment of the present disclosure. The magnetic assembly structure comprises the main body 3 and the first inserting component 4, and being different from the previous embodiments, the first magnetic component 411 in the previous embodiments is disposed in and received by the first magnetic component receiving slot 41, but the first magnetic component 411 in the embodiment is embodiments is disposed in and received by the first engagement slot 33. By using the magnetic attracting or repulsive force of the external magnetic component, when the first inserting component 4 inserts into the first receiving slot 31 via the first main body opening O1', a portion the first magnetic component 41 enters the first magnetic component receiving slot 41.

Figure 12D:
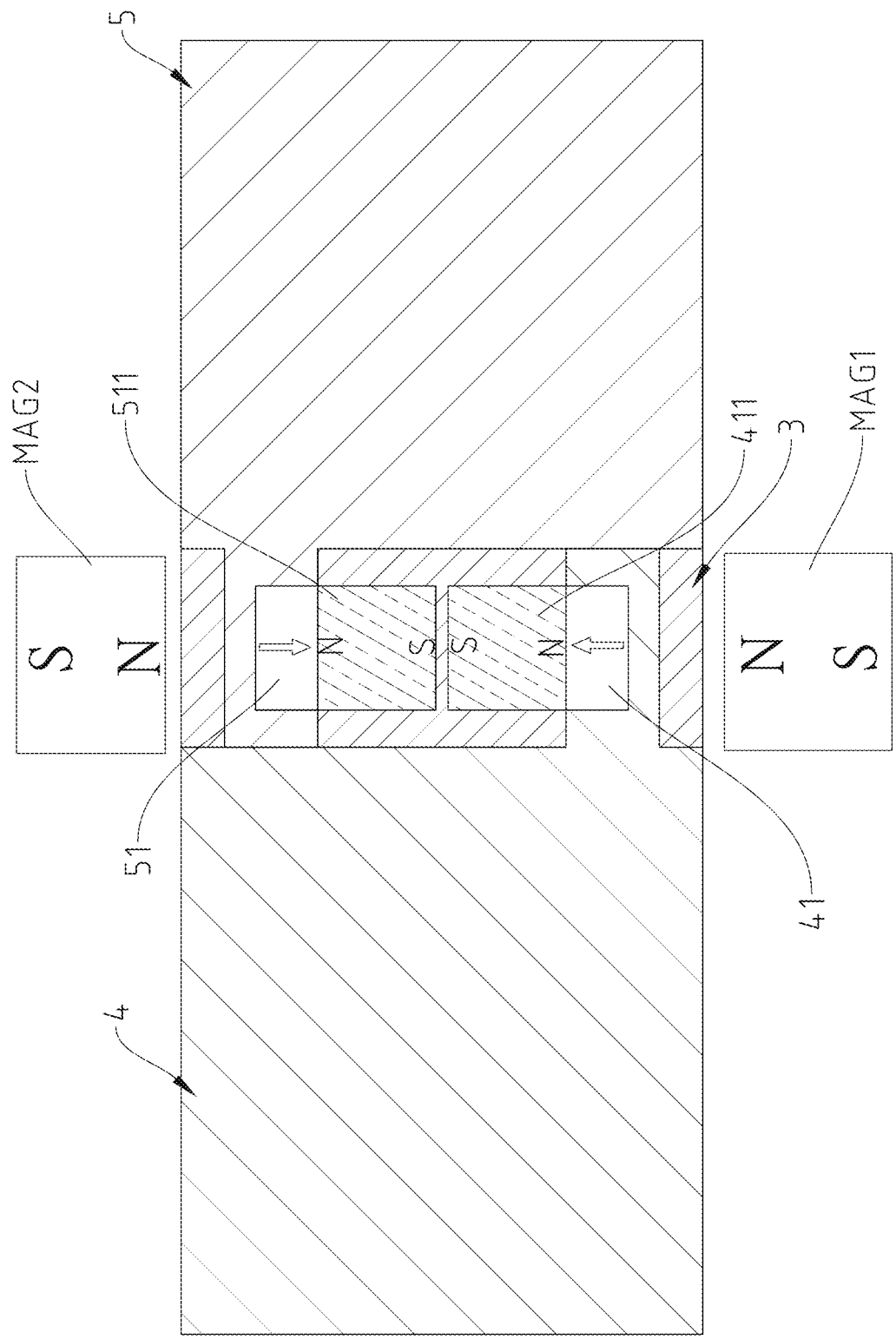
FIG. 12D is a top view of assembling a magnetic assembly structure provided by a thirteenth embodiment of the present disclosure.
Figure 12E:
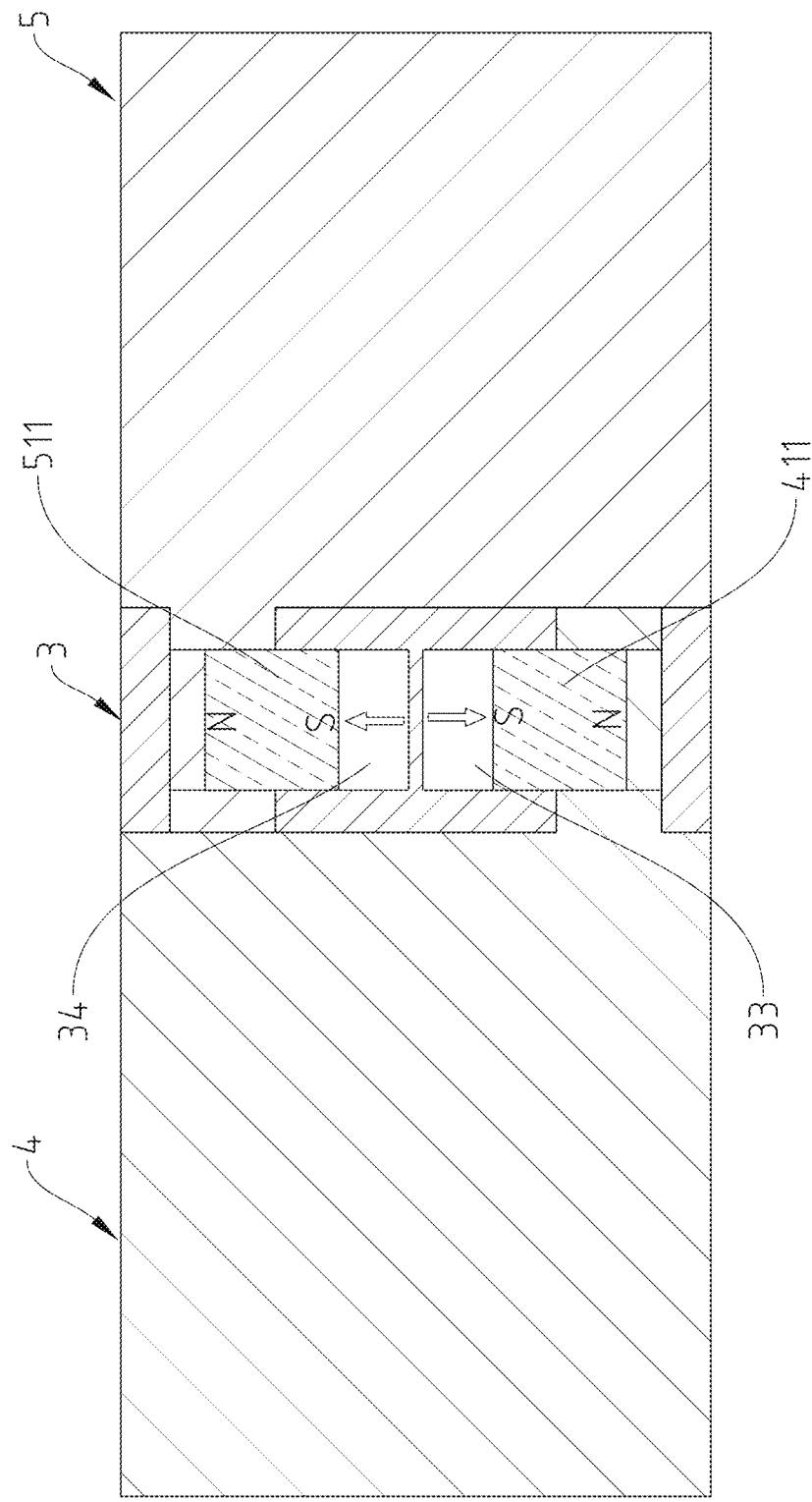
FIG. 12E is a top view of disassembling an assembled magnetic assembly structure provided by a thirteenth embodiment of the present disclosure.

Refer to FIG. 12B through FIG. 12E, FIG. 12B is a three dimensional explosive diagram of a magnetic assembly structure provided by a thirteenth embodiment of the present disclosure, FIG. 12C is a top view of a magnetic assembly structure provided by a thirteenth embodiment of the present disclosure, FIG. 12D is a top view of assembling a magnetic assembly structure provided by a thirteenth embodiment of the present disclosure, and FIG. 12E is a top view of disassembling an assembled magnetic assembly structure provided by a thirteenth embodiment of the present disclosure. Being different from the twelfth embodiment, the magnetic assembly structure in the thirteenth embodiment further comprises the second inserting component 5, and the main body 3 further has the second receiving slot 32 and the second engagement slot 34. The second magnetic component 511 is disposed in and received by the second engagement slot 34 of the main body 3.

In an initial state, as shown in FIG. 12C, since the magnetic repulsive force of the first magnetic component 411 and the second magnetic component 511 exists, a portion of the first magnetic component 411 locates in the first engagement slot 33, other portion of the first magnetic component 411 locates in the first receiving slot 31, a portion of the second magnetic component 511 locates in the second engagement slot 34, other portion of the second magnetic component 511 locates in the second receiving slot 32. When assembling, as shown in FIG. 12D, the first external magnetic component MAG1 and the second external magnetic component MAG2 are utilized to provide the magnetic repulsive force to make the first magnetic component 411 and the second magnetic component 511 move to the first engagement slot 33 and the second engagement slot 34 entirely, the first and second inserting components 4, 5 then respectively insert to the first and second receiving slots 31, 32, and next the first external magnetic component MAG1 and the second external magnetic component MAG2 are removed, such that, as shown in FIG. 12E, a portion of the first magnetic component 411 locates in the first engagement slot 33, other portion of the first magnetic component 411 locates in the first magnetic component receiving slot 41 (or the receiving slot 31), a portion of the second magnetic component 511 locates in the second engagement slot 34, other portion of the second magnetic component 511 locates in the second magnetic component receiving slot 51 (or the second receiving slot 32). When disassembling, the first external magnetic component MAG1 and the second external magnetic component MAG2 are utilized to provide the magnetic repulsive force to make the first magnetic component 411 and the second magnetic component 511 move to the first engagement slot 33 and the second engagement slot 34 entirely, and next, the first and second inserting components 4, 5 can be removed from the main body 3.

Figure 12F:
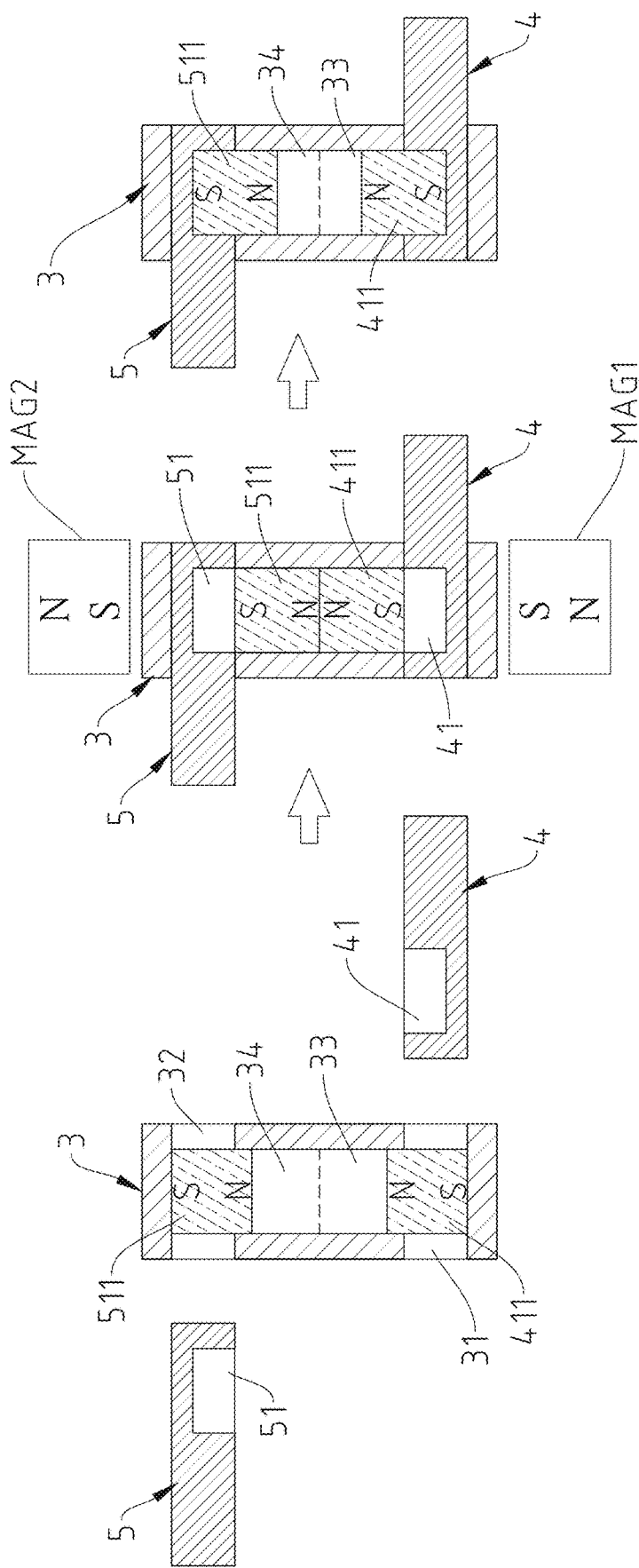
FIG. 12F is a top view of assembling a magnetic assembly structure provided by a fourteenth embodiment of the present disclosure.

Refer to FIG. 12F, and FIG. 12F is a top view of assembling a magnetic assembly structure provided by a fourteenth embodiment of the present disclosure. Being different from the thirteenth embodiment, in the fourteenth embodiment, the first engagement slot 33 and the second engagement slot 34 are communicated with each other to form merely one engagement slot. The assembling and disassembling manners in the fourteenth embodiment are the same as those in thirteenth embodiment, thus omitting the descriptions.

Figure 12G:
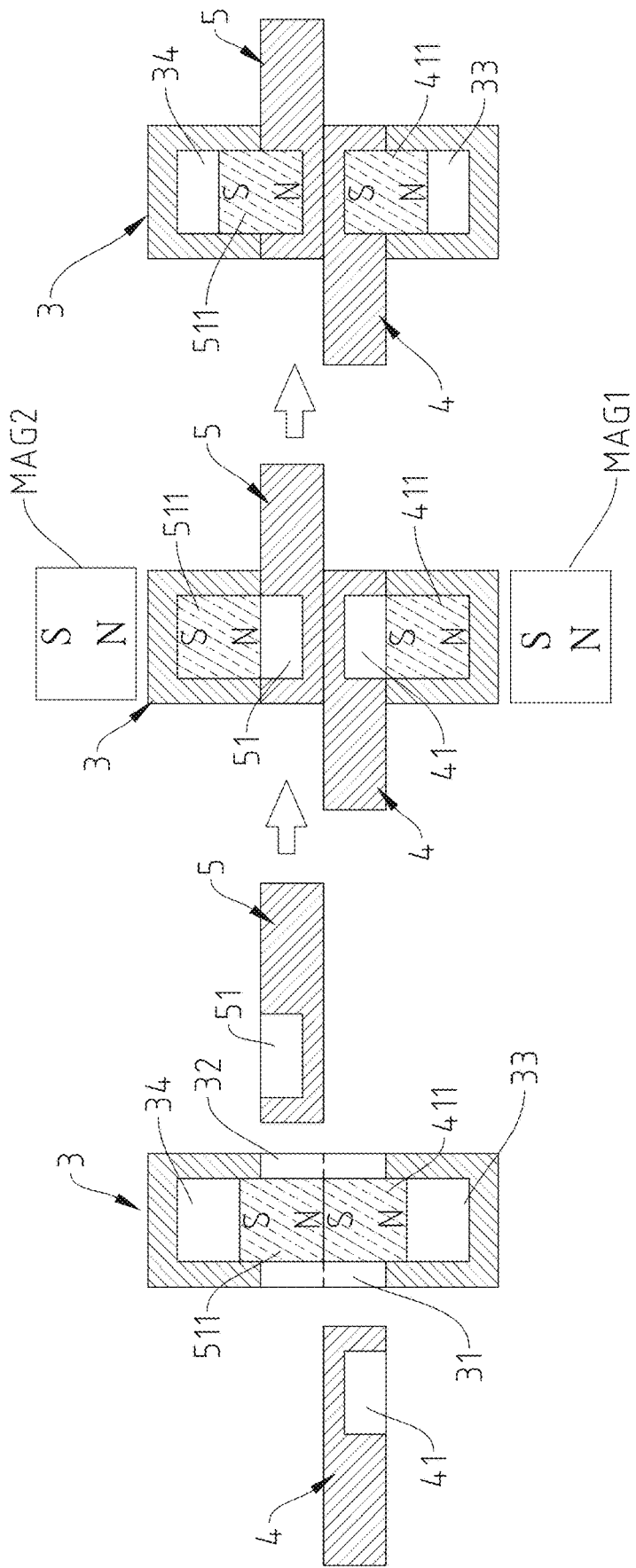
FIG. 12G is a top view of assembling a magnetic assembly structure provided by a fifteenth embodiment of the present disclosure.

Refer to FIG. 12G, and FIG. 12G is a top view of assembling a magnetic assembly structure provided by a fifteenth embodiment of the present disclosure. Being different from the fourteenth embodiment, in the fifteenth embodiment, the first magnetic component 411 and the second magnetic component 511 induce the magnetic attracting force therebetween, therefore, a portion of the first magnetic component 411 locates in the first engagement slot 33, other portion of the first magnetic component 411 locates in the first receiving slot 31, a portion of the second magnetic component 511 locates in the second engagement slot 34, other portion of the second magnetic component 511 locates in the second receiving slot 32. When assembling, the first external magnetic component MAG1 and the second external magnetic component MAG2 are utilized to provide the magnetic attracting force to make the first magnetic component 411 and the second magnetic component 511 move to the first engagement slot 33 and the second engagement slot 34 entirely, the first and second inserting components 4, 5 then respectively insert to the first and second receiving slots 31, 32, and next the first external magnetic component MAG1 and the second external magnetic component MAG2 are removed, such that a portion of the first magnetic component 411 locates in the first engagement slot 33, other portion of the first magnetic component 411 locates in the first magnetic component receiving slot 41 (or the receiving slot 31), a portion of the second magnetic component 511 locates in the second engagement slot 34, other portion of the second magnetic component 511 locates in the second magnetic component receiving slot 51 (or the second receiving slot 32). When disassembling, the first external magnetic component MAG1 and the second external magnetic component MAG2 are utilized to provide the magnetic attracting force to make the first magnetic component 411 and the second magnetic component 511 move to the first engagement slot 33 and the second engagement slot 34 entirely, and next, the first and second inserting components 4, 5 can be removed from the main body 3.

Figure 13A:
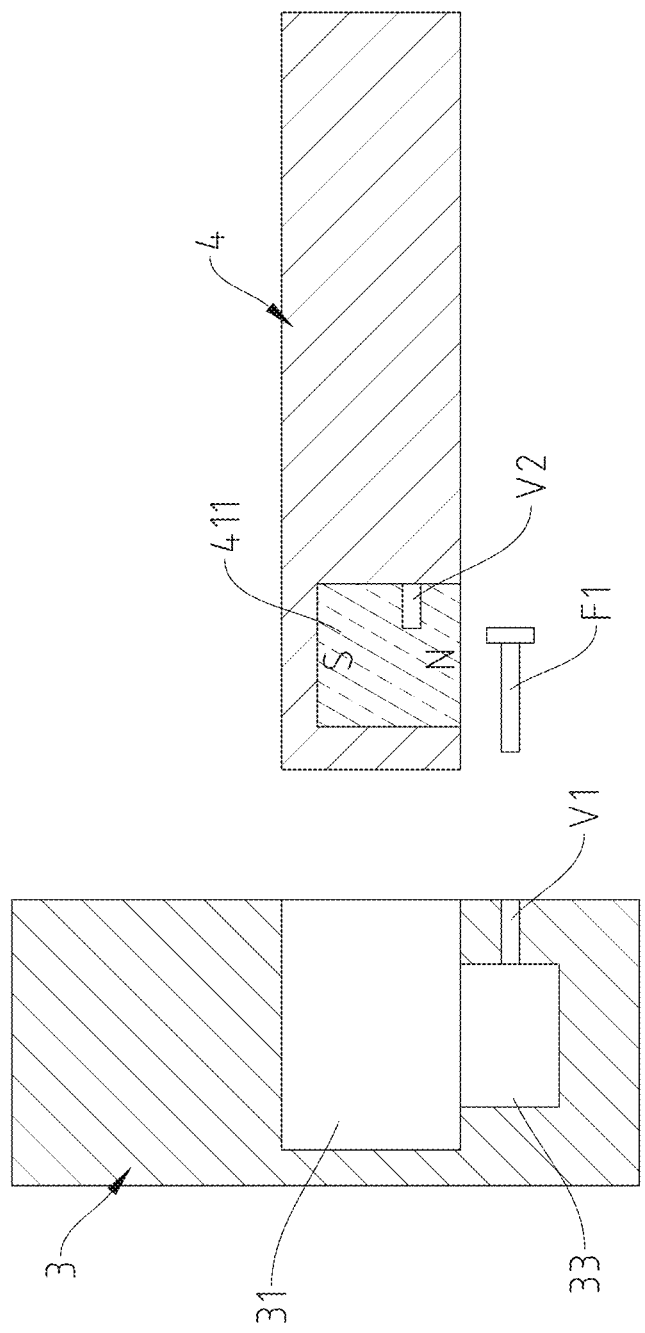
FIG. 13A is a side view of a magnetic assembly structure provided by a sixteenth embodiment of the present disclosure.
Figure 13B:
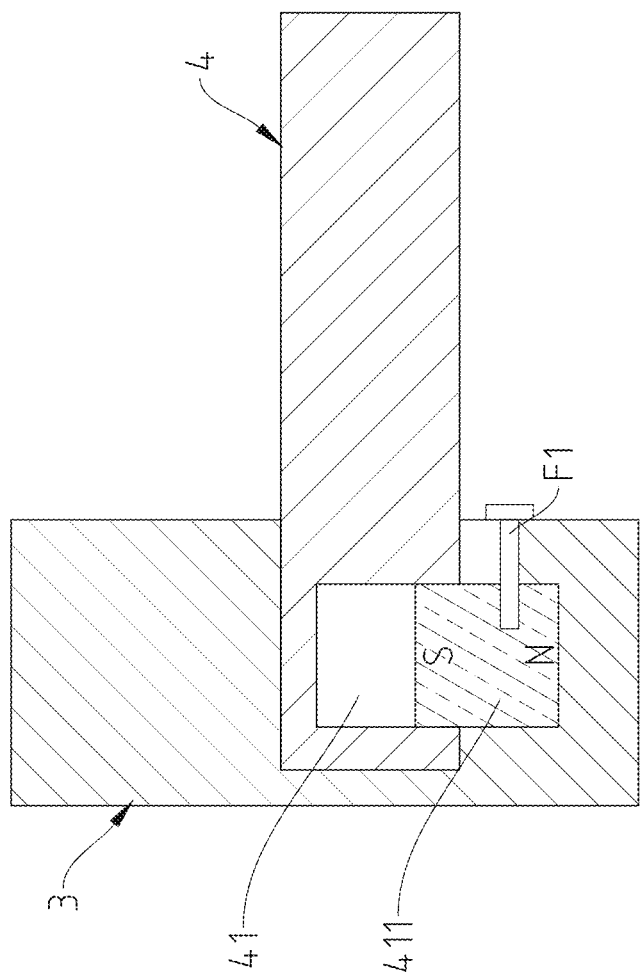
FIG. 13B is a side view of an assembled magnetic assembly structure provided by a sixteenth embodiment of the present disclosure.

Refer to FIG. 13A and FIG. 13B, FIG. 13A is a side view of a magnetic assembly structure provided by a sixteenth embodiment of the present disclosure, and FIG. 13B is a side view of an assembled magnetic assembly structure provided by a sixteenth embodiment of the present disclosure. In the embodiment, the magnetic assembly structure comprises the first inserting component 4, the main body 3 and a clamping structure F1, two vias V1 and V2 are respectively formed on the main body 3 and the first magnetic component 411, and the first magnetic component 411 is received by the first magnetic component receiving slot 41. When assembling, a hand is used to press the first magnetic component 411, the first inserting component 4 then inserts into the first receiving slot 31, one portion of the first magnetic component 411 next falls into the first engagement slot 33 due to gravity, and next, the clamping structure F1 penetrates the vias V1 and V2 to clamp the first magnetic component 411, such that, by such clamping mechanism, the main body 3 and the first inserting component 4 are fixed more tightly. When disassembling, the clamping structure F1 is removed, and the external magnetic component is utilized to provide the magnetic repulsive force to make the first magnetic component 411 move to the first magnetic component receiving slot 41, and next, the first inserting component 4 can be removed from the main body 3. The clamping structure F1 can be a screw, a clamping pin or other clamping part. By the way, the via V2 is not essential, and that is, the first magnetic component 411 does not have the via V2. Moreover, the width of the first magnetic component 411 is less than those of the first magnetic component receiving slot 41 and the first engagement slot 33. Certainly, the clamping structure F1 can be formed by friction of walls of the first magnetic component 411 and the first engagement slot 33.

Figure 14A:
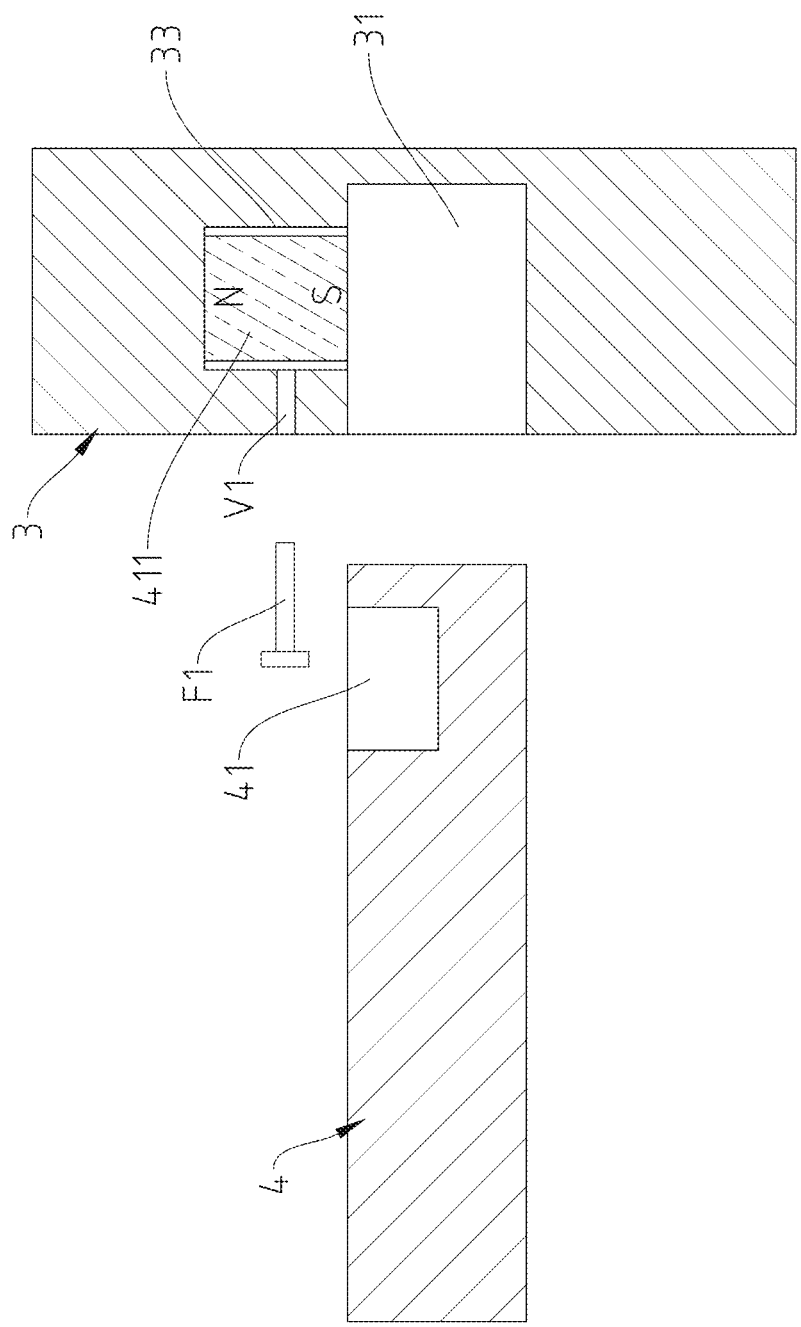
FIG. 14A is a side view of a magnetic assembly structure provided by a seventeenth embodiment of the present disclosure.
Figure 14B:
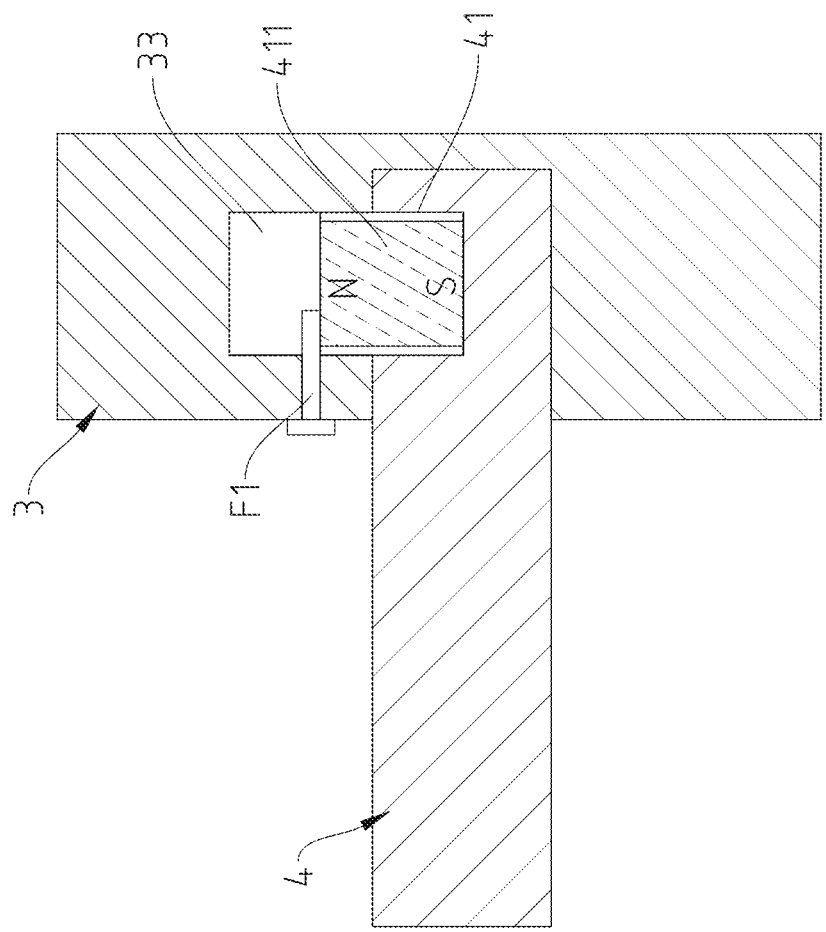
FIG. 14B is a side view of an assembled magnetic assembly structure provided by a seventeenth embodiment of the present disclosure.

Refer to FIG. 14A and FIG. 14B, FIG. 14A is a side view of a magnetic assembly structure provided by a seventeenth embodiment of the present disclosure, and FIG. 14B is a side view of an assembled magnetic assembly structure provided by a seventeenth embodiment of the present disclosure. Being different from the sixth embodiment, in the seventeenth embodiment, the first magnetic component 411 does not have the via V2, and the first magnetic component 411 is received by the first engagement slot 33 of the main body 3. When assembling, an external magnetic component is utilized to provide the magnetic attracting force to make the first magnetic component 411 entirely locate in the first engagement slot 33, the first inserting component 4 then inserts into the first receiving slot 31, the external magnetic component is next removed, one portion of the first magnetic component 411 then falls into the first magnetic component receiving slot 41 due to gravity, and next, the clamping structure F1 penetrates the via V1 to clamp the first magnetic component 411, such that, by such clamping mechanism, the main body 3 and the first inserting component 4 are fixed more tightly. When disassembling, the clamping structure F1 is removed, and the external magnetic component is utilized to provide the magnetic attracting force to make the first magnetic component 411 move to the first engagement slot 33, and next, the first inserting component 4 can be removed from the main body 3. The clamping structure F1 can be a screw, a clamping pin or other clamping part. Moreover, the width of the first magnetic component 411 is less than those of the first magnetic component receiving slot 41 and the first engagement slot 33. Certainly, the clamping structure F1 can be formed by friction of walls of the first magnetic component 411 and the first magnetic component receiving slot 41.

Figure 15A:
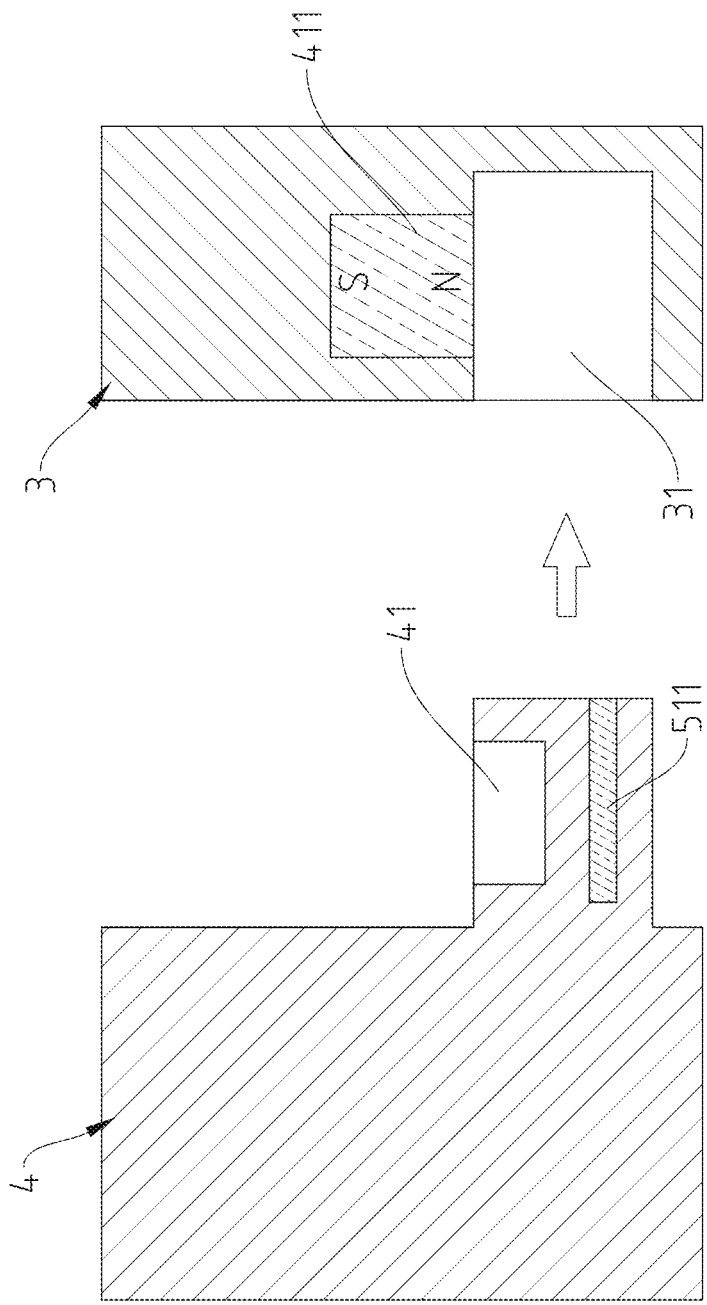
FIG. 15A is a top view of a magnetic assembly structure provided by an eighteenth embodiment of the present disclosure.
Figure 15B:
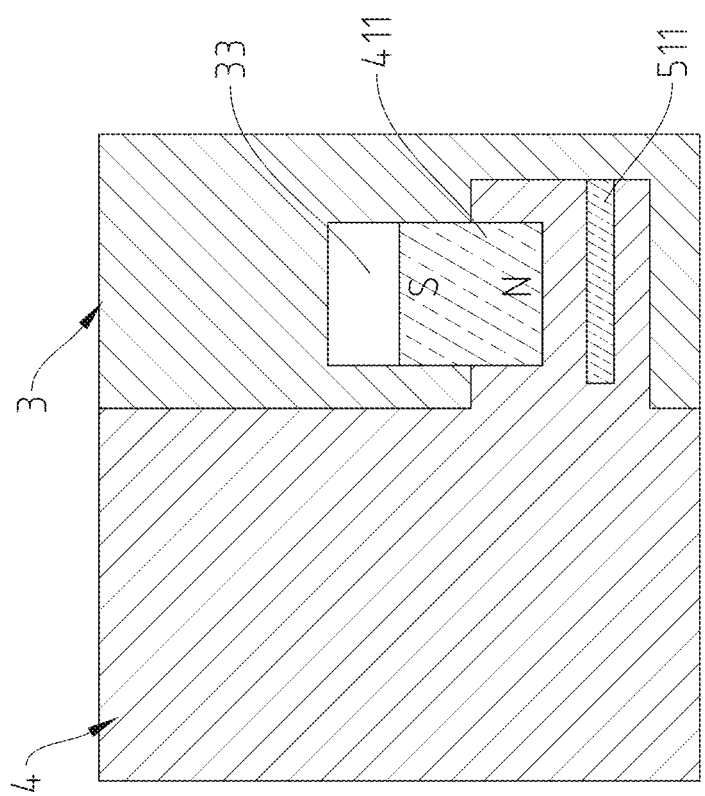
FIG. 15B is a top view of an assembled magnetic assembly structure provided by an eighteenth embodiment of the present disclosure.

Refer to FIG. 15A through FIG. 15C, FIG. 15A is a top view of a magnetic assembly structure provided by an eighteenth embodiment of the present disclosure, FIG. 15B is a top view of an assembled magnetic assembly structure provided by an eighteenth embodiment of the present disclosure, and FIG. 15C is a top view of disassembling an assembled magnetic assembly structure provided by an eighteenth embodiment of the present disclosure. Being different from the twelfth embodiment, the first inserting component 4 can further comprise the second magnetic component 511 fixedly disposed on one side of the first magnetic component receiving slot 41, the second magnetic component 511 can be a magnet or an iron sheet. When assembling, the first inserting component 4 inserts into the first receiving slot 31, a portion of the first magnetic component 411 then move to the first magnetic component receiving slot 41 from the first engagement slot 33 due to the magnetic attracting force induced by the first and second magnetic components 411, 511, as shown in FIG. 15B. When disassembling, the external magnetic component MAG is utilized to provide the magnetic repulsive force to make the first magnetic component 411 move to the first engagement slot 33 entirely, and next, the first inserting component 4 can be removed from the main body 3, as shown in FIG. 15C.

Figure 16A:
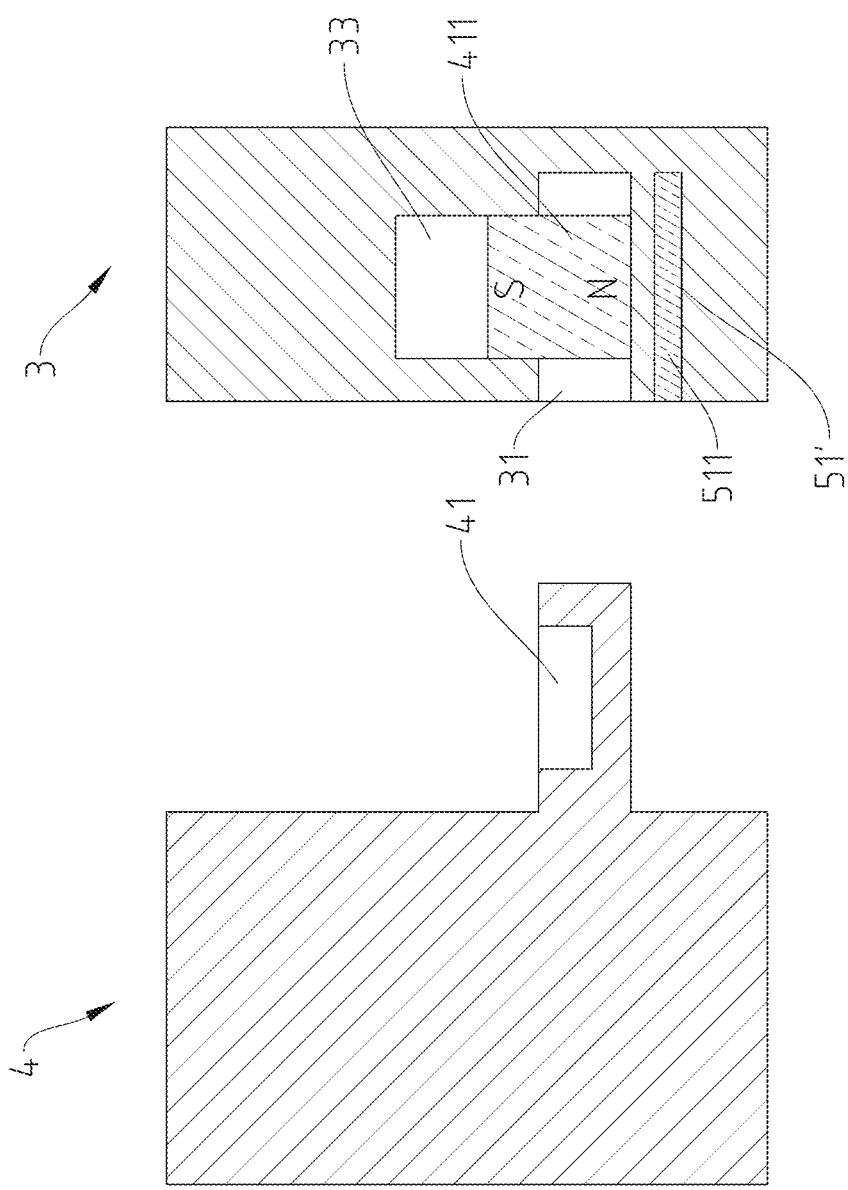
FIG. 16A is a top view of a magnetic assembly structure provided by an nineteenth embodiment of the present disclosure.
Figure 16C:
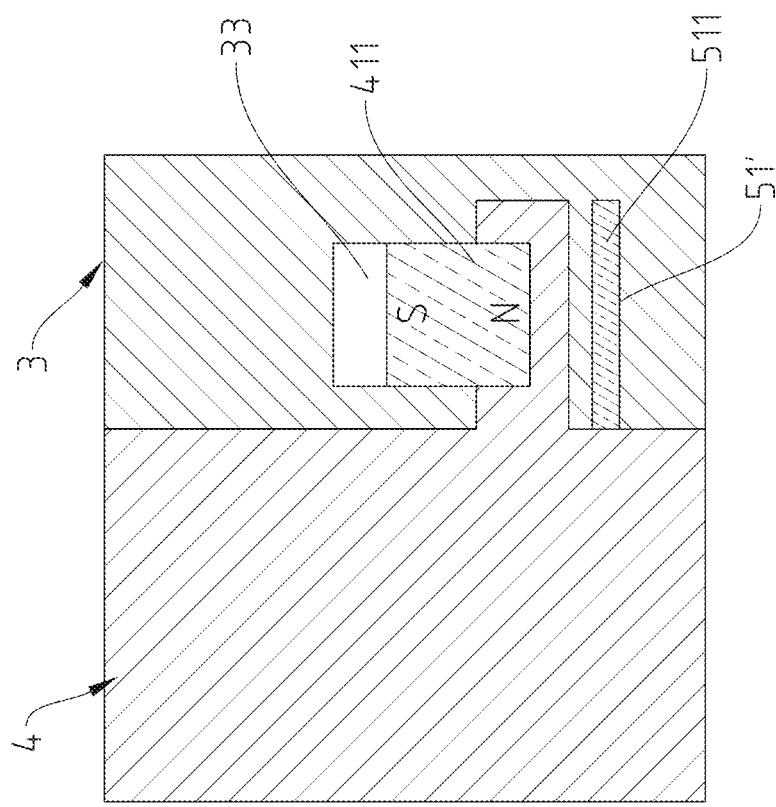
FIG. 16C is a top view of disassembling an assembled magnetic assembly structure provided by a nineteenth embodiment of the present disclosure.

Refer to FIG. 16A through FIG. 16C, FIG. 16A is a top view of a magnetic assembly structure provided by an nineteenth embodiment of the present disclosure, FIG. 16B is a top view of assembling a magnetic assembly structure provided by a nineteenth embodiment of the present disclosure, and FIG. 16C is a top view of disassembling an assembled magnetic assembly structure provided by a nineteenth embodiment of the present disclosure. Being different from the eighteenth embodiment, the second magnetic component 511 is fixedly disposed on the second magnetic component receiving slot 51' which locates on one side of the first receiving slot 31. In an initial state, due to the magnetic attracting force induced by the first and second magnetic components 411, 511, the one portion of the first magnetic component 411 locates in the first engagement slot 33 and other portion of the first magnetic component 411 locates in the first receiving slot 31, as shown in FIG. 16A. When assembling, the first inserting component 4 inserts into the first receiving slot 31, the first magnetic component 411 then entirely move to the first engagement slot 33 due to the magnetic repulsive force provided by the external magnetic component MAG (as shown in FIG. 16B), the external magnetic component MAG is then removed, and next, a portion of the first magnetic component 411 then move to the first magnetic component receiving slot 41 due to the magnetic attracting force induced by the first and second magnetic components 411, 511 (as shown in FIG. 16C). When disassembling, the external magnetic component MAG is utilized to provide the magnetic repulsive force to make the first magnetic component 411 move to the first engagement slot 33 entirely, and next, the first inserting component 4 can be removed from the main body 3.

Figure 16E:
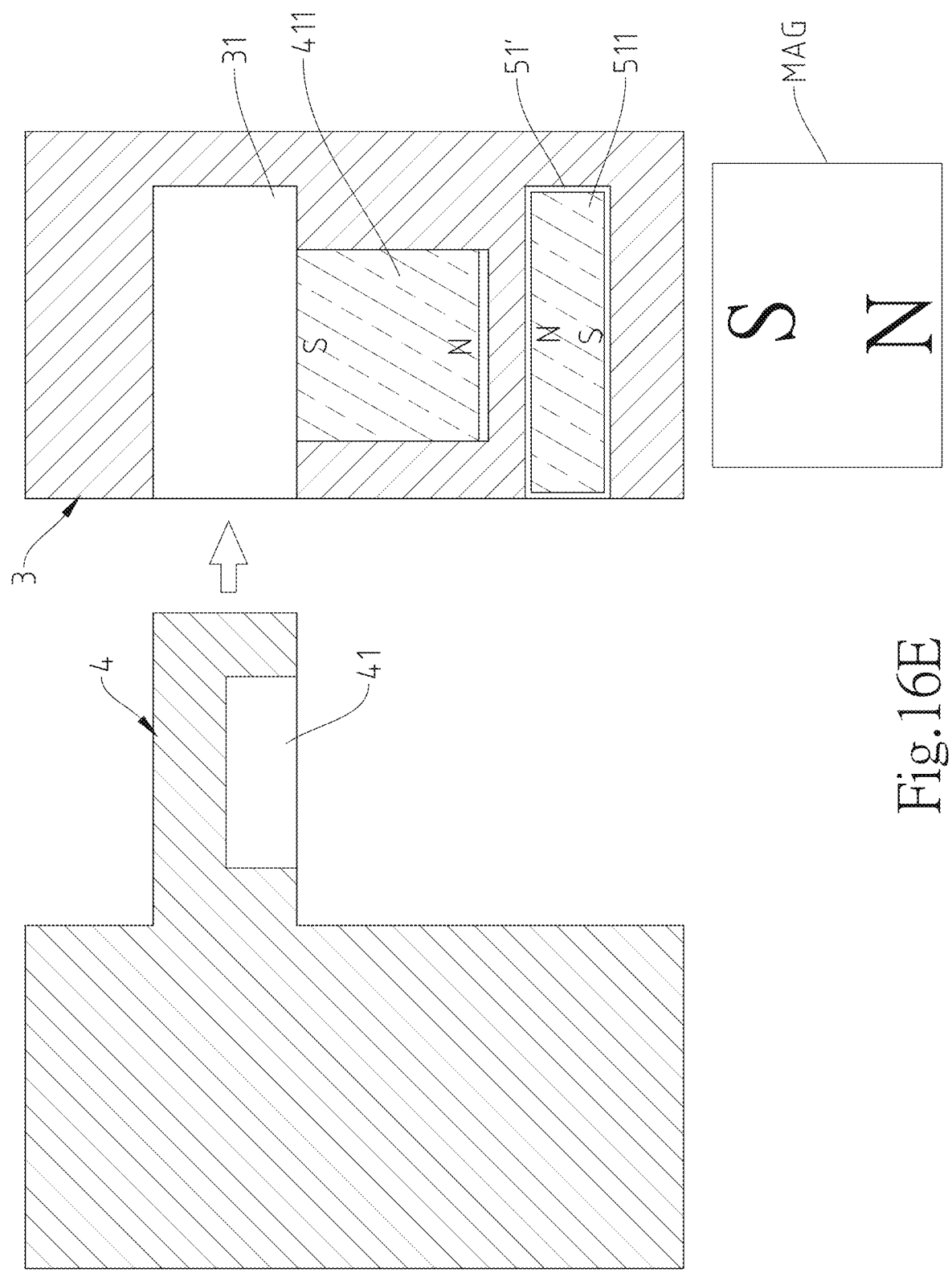
FIG. 16E is a top view of assembling a magnetic assembly structure provided by a twentieth embodiment of the present disclosure.
Figure 16F:
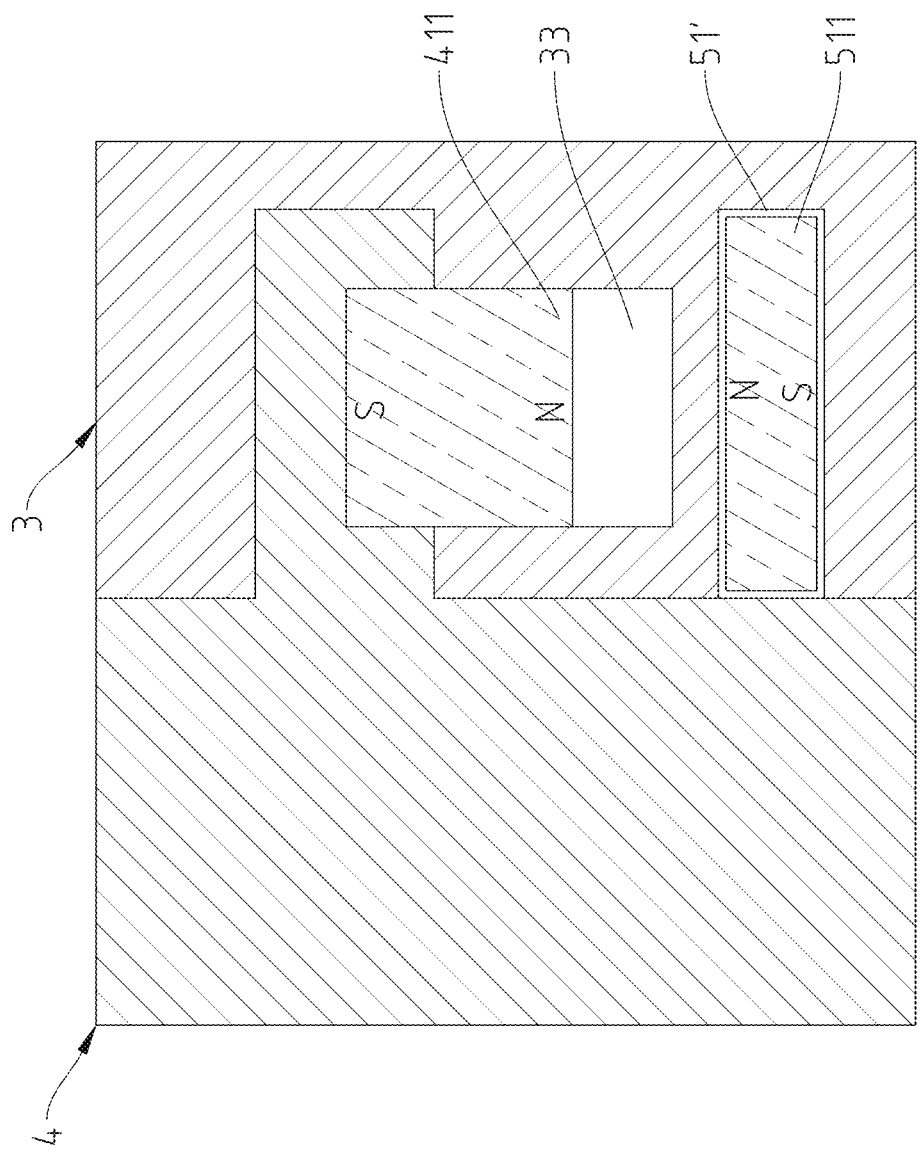
FIG. 16F is a top view of disassembling an assembled magnetic assembly structure provided by a twentieth embodiment of the present disclosure.

Refer to FIG. 16D through FIG. 16F, FIG. 16D is a top view of a main body of a magnetic assembly structure provided by a twentieth embodiment of the present disclosure, FIG. 16E is a top view of assembling a magnetic assembly structure provided by a twentieth embodiment of the present disclosure, and FIG. 16F is a top view of disassembling an assembled magnetic assembly structure provided by a twentieth embodiment of the present disclosure. Being different from the nineteenth embodiment, in the embodiment, the first magnetic component 411 and the second magnetic component 511 induce the magnetic repulsive force, thus in the initial state, one portion of the first magnetic component 411 locates in the first engagement slot 33 and other portion of the first magnetic component 411 locates in the first receiving slot 31, as shown in FIG. 16D. When assembling, he first magnetic component 411 entirely moves to the first engagement slot 33 due to the magnetic attracting force provided by the external magnetic component MAG (as shown in FIG. 16E), the first inserting component 4 then inserts into the first receiving slot 31, the external magnetic component MAG is then removed, and next, a portion of the first magnetic component 411 then move to the first magnetic component receiving slot 41 due to the magnetic repulsive force induced by the first and second magnetic components 411, 511 (as shown in FIG. 16C). When disassembling, the external magnetic component MAG is utilized to provide the magnetic attracting force to make the first magnetic component 411 move to the first engagement slot 33 entirely, and next, the first inserting component 4 can be removed from the main body 3.

Figure 17A:
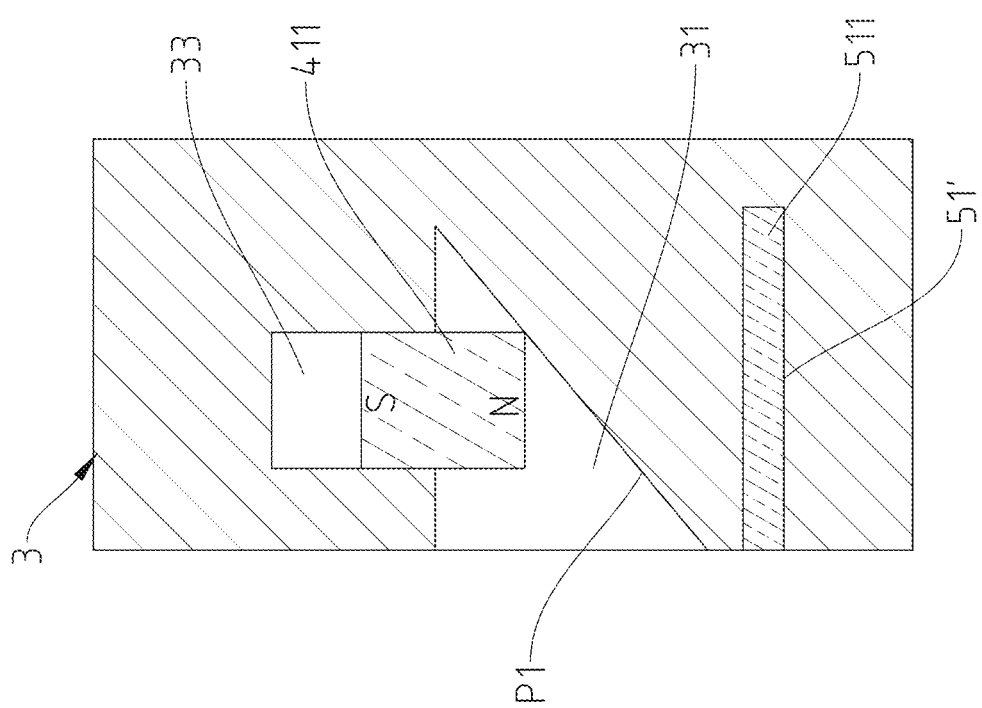
FIG. 17A is a top view of a main body of a magnetic assembly structure provided by a twenty-first embodiment of the present disclosure.
Figure 17B:
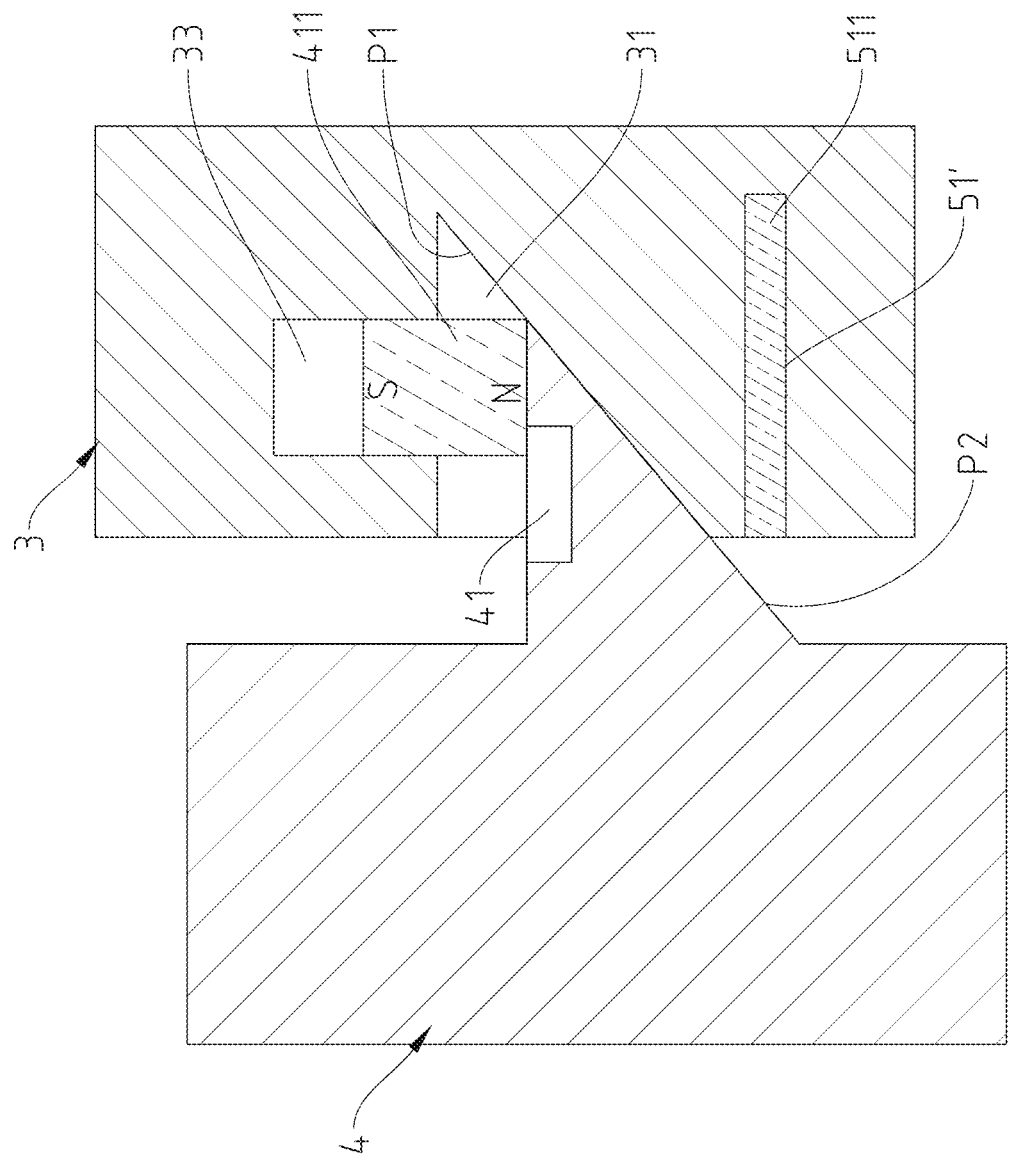
FIG. 17B is a top view of assembling a magnetic assembly structure provided by a twenty-first embodiment of the present disclosure.
Figure 17C:
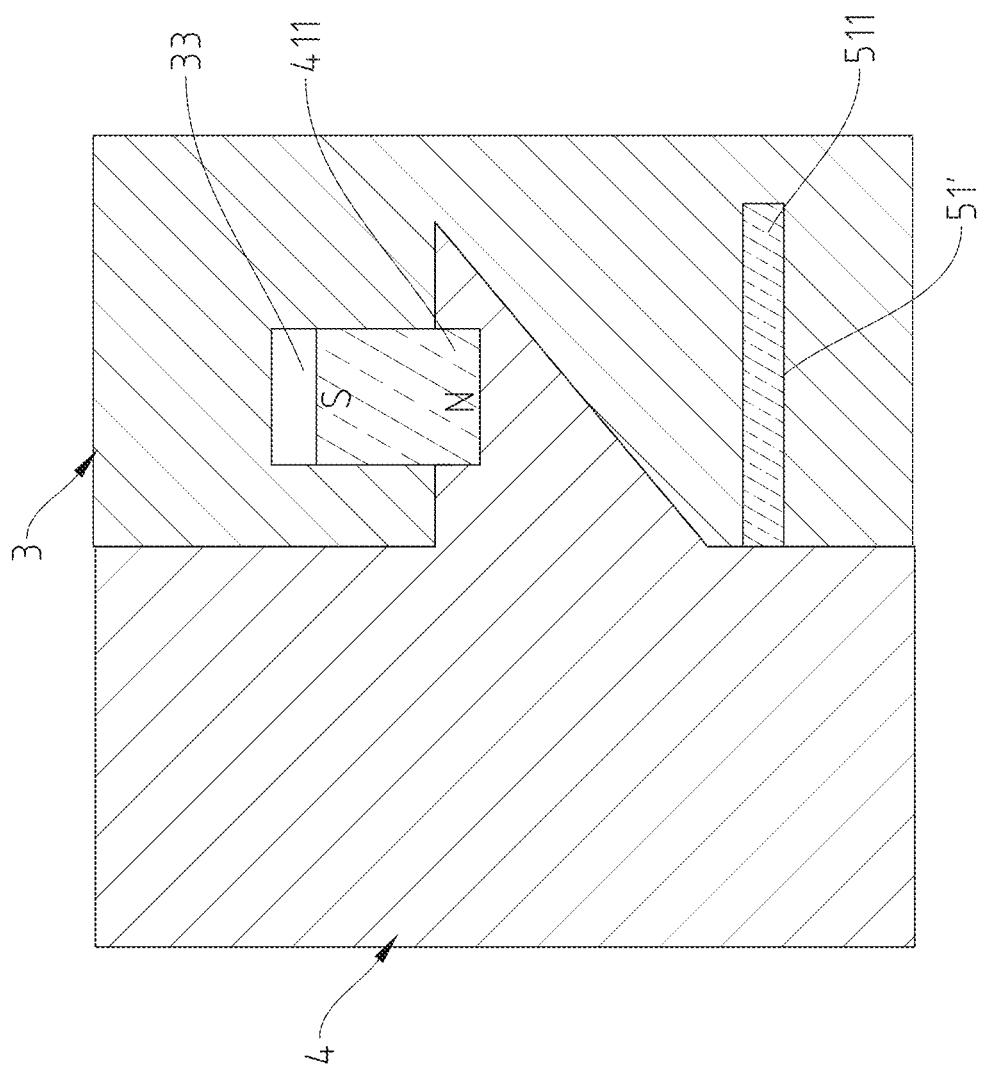
FIG. 17C is a top view of an assembled magnetic assembly structure provided by a twenty-first embodiment of the present disclosure.
Figure 17D:
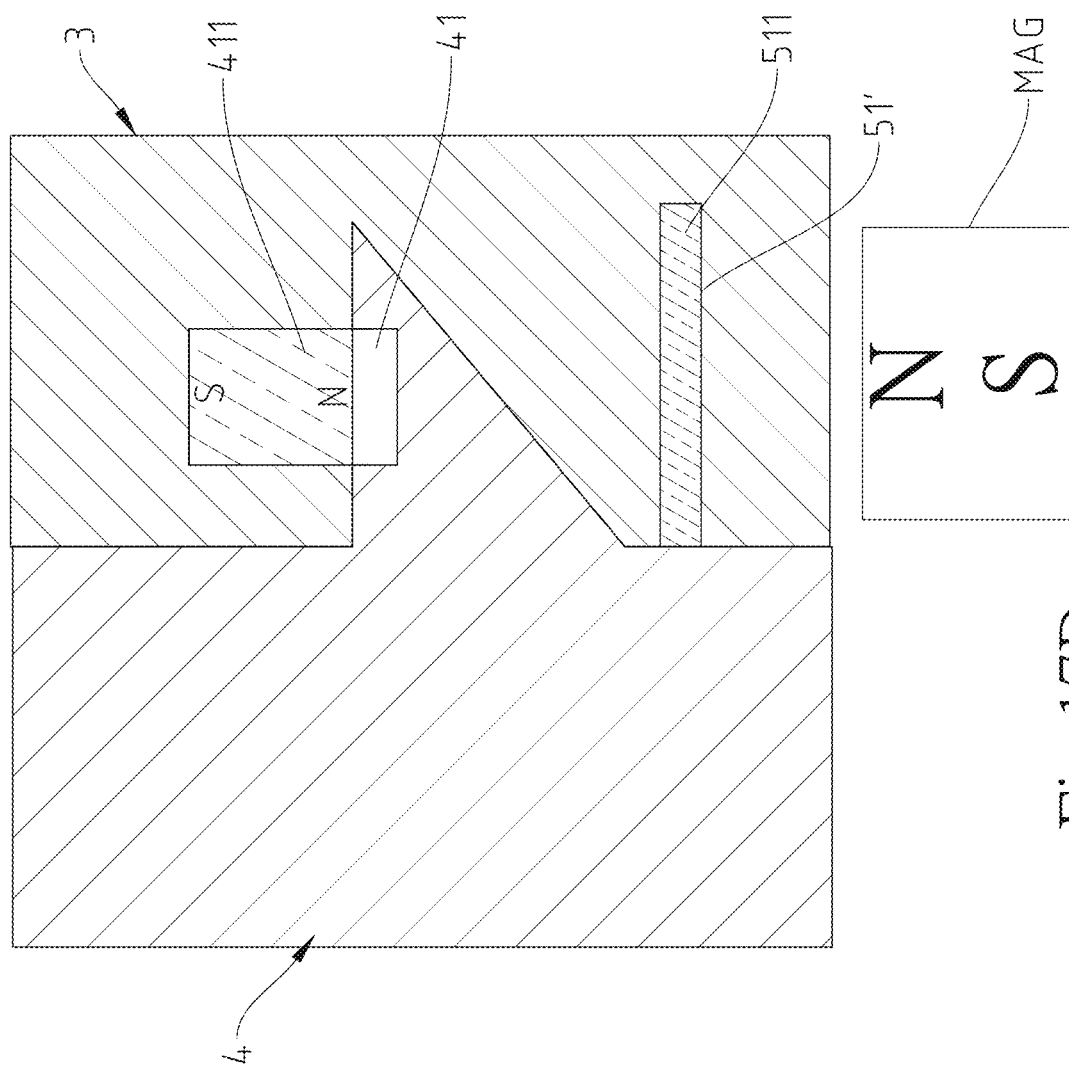
FIG. 17D is a top view of disassembling an assembled magnetic assembly structure provided by a twenty-first embodiment of the present disclosure.

Refer to FIG. 17A through FIG. 17D, FIG. 17A is a top view of a main body of a magnetic assembly structure provided by a twenty-first embodiment of the present disclosure, FIG. 17B is a top view of assembling a magnetic assembly structure provided by a twenty-first embodiment of the present disclosure, FIG. 17C is a top view of an assembled magnetic assembly structure provided by a twenty-first embodiment of the present disclosure, and FIG. 17D is a top view of disassembling an assembled magnetic assembly structure provided by a twenty-first embodiment of the present disclosure. Being different from the nineteenth embodiment, the first receiving slot 31 has a receiving slot bevel surface P1, and the first inserting component 4 has a inserting component bevel surface P2 corresponding to the receiving slot bevel surface P1. The first magnetic component receiving slot 41 locates on the inserting component bevel surface P2. As shown in FIG. 17A, in the initial state, due to the magnetic attracting force induced by the first and second magnetic components 411, 511, the one portion of the first magnetic component 411 locates in the first engagement slot 33 and other portion of the first magnetic component 411 locates in the first receiving slot 31. As shown in FIG. 17B and FIG. 17C, when assembling, the inserting component bevel surface P2 of the first inserting component 4 inserts to the first receiving slot 31, the inserting component bevel surface P2 of the first inserting component 4 then pulls up the first magnetic component 411, the inserting component bevel surface P2 of the first inserting component 4 next entirely contacts the receiving slot bevel surface P1 of the first receiving slot 31, and then, a portion of the first magnetic component 411 locates in the first magnetic component receiving slot 41. As shown in FIG. 17D, when disassembling, the external magnetic component MAG is utilized to provide the magnetic repulsive force to make the first magnetic component 411 move to the first engagement slot 33 entirely, and next, the first inserting component 4 can be removed from the main body 3.

Figure 18:
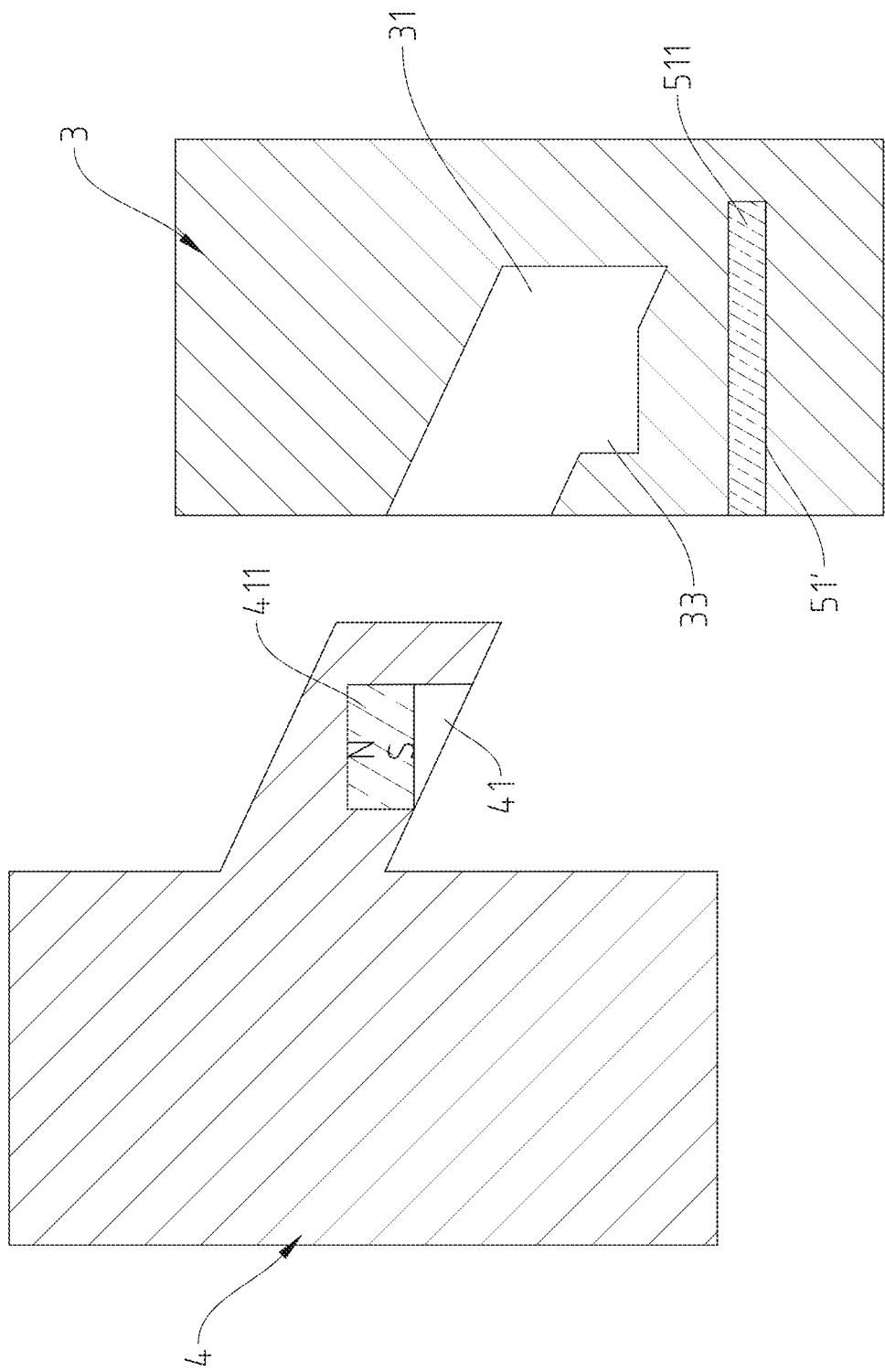
FIG. 18 is a top view of a magnetic assembly structure provided by a twenty-second embodiment of the present disclosure.

Refer to FIG. 18, and FIG. 18 is a top view of a magnetic assembly structure provided by a twenty-second embodiment of the present disclosure. Being different from the twenty-first embodiment, the main body 3 is a beveled main body, and the first magnetic component 411 is received by the first magnetic component receiving slot 41. When assembling, the first magnetic component 411 is pressed by the hand, the first inserting component 4 then inserts to the first receiving slot 31, and next, the portion of the first magnetic component 411 move to the first engagement slot 33 due to the magnetic attracting force induced by the first magnetic component 411 and the second magnetic component 511. When disassembling, the external magnetic component MAG is utilized to provide the magnetic repulsive force to make the first magnetic component 411 move to the first engagement slot 33 (or the first magnetic component receiving slot 41) entirely, and next, the first inserting component 4 can be removed from the main body 3.

According to the descriptions of the embodiments, compared to the prior art, the magnetic assembly structure of the present disclosure utilizes the magnetic force of the magnetic components to assemble the main body and the inserting component, and thus the assembling force is decreased to have the advantage of assembling with a less force. Further, the malicious person cannot see the assembling manner from the appearance of the magnetic assembly structure, and the magnetic assembly structure can simultaneously resist against the vertical and rotational disassembling manners. Therefore, without allowance or explanations, the malicious person cannot disassemble the magnetic assembly structure. Moreover, the joint surface of the magnetic assembly structure is flat, thus it can prevent the user from being hook by the joint surface to avoid damage and danger, and the safety is increased.

To sum up, the magnetic assembly structures in the embodiments are illustrated as the above, and can achieve the predicated technical results. The present disclosure is not anticipated by the prior art known by the inventors, and the inventors believe the present disclosure meets the specifications associated with the provisions of the patent law. Thus, the inventors submit the application of the present disclosure to respectfully request a substantial examination for obtaining the patent right.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A magnetic assembly structure, comprising:
   a main body, having a first receiving slot, a first engagement slot, a first magnetic component and a first main body surface, wherein the first receiving slot penetrates first main body surface to form a first main body opening on the first main body surface, the first engagement slot is communicated with the first receiving slot, and the first engagement slot receives the first magnetic component; and
   a first inserting component, having a first magnetic component receiving slot;
   wherein the first inserting component is inserted into the first receiving slot via the first main body opening, and the first magnetic component moves into the first magnetic component receiving slot,
   wherein the main body further has a second receiving slot, a second engagement slot, a second magnetic component and a second main body surface, wherein the second receiving slot penetrates second main body surface to form a second main body opening on the second main body surface, the second engagement slot is communicated with the second receiving slot, and the second engagement slot receives the second magnetic component; the first engagement slot and the second engagement slot are disposed between the first receiving slot and the second receiving slot, or alternatively, the first receiving slot and the second receiving slot are disposed between the first engagement slot and the second engagement slot; the magnetic assembly structure further comprises a second inserting component which has a second magnetic component receiving slot; the second inserting component is inserted into the second receiving slot via the second main body opening, and the second magnetic component moves into the second magnetic component receiving slot.

2. The magnetic assembly structure according to claim 1, wherein a portion of the first magnetic component moves into the first magnetic component receiving slot, and other portion of the first magnetic component stay in the first engagement slot.

3. The magnetic assembly structure according to claim 1, wherein a portion of the first magnetic component and a portion of the second magnetic component respectively move into the first magnetic component receiving slot and the second magnetic component receiving slot, and other portion of the first magnetic component and other portion of the second magnetic component respectively stay in the first engagement slot and the second engagement slot.

4. The magnetic assembly structure according to claim 3, wherein the first engagement slot and the second engagement slot are disposed between the first receiving slot and the second receiving slot; via a magnetic repulsive force induced by the second magnetic component and first magnetic component, the portion of the first magnetic component and the portion of the second magnetic component respectively locate in the first engagement slot and the second engagement slot, and the other portion of the first magnetic component and the other portion of the second magnetic component respectively locate in the first magnetic component receiving slot and the second magnetic component receiving slot.

5. The magnetic assembly structure according to claim 4, wherein the first magnetic component and the second magnetic component are two magnet components and two opposite magnet poles of the first magnetic component and the second magnetic component are identical.

6. The magnetic assembly structure according to claim 4, wherein the first engagement slot and the second engagement slot are communicated with each other, such that the main body merely has one engagement slot.

7. The magnetic assembly structure according to claim 3, wherein the first receiving slot and the second receiving slot are disposed between the first engagement slot and the second engagement slot; via a magnetic attracting force induced by the second magnetic component and first magnetic component, the portion of the first magnetic component and the portion of the second magnetic component respectively locate in the first engagement slot and the second engagement slot, and the other portion of the first magnetic component and the other portion of the second magnetic component respectively locate in the first magnetic component receiving slot and the second magnetic component receiving slot.

8. The magnetic assembly structure according to claim 7, wherein the first magnetic component and the second magnetic component are two magnet components and two opposite magnet poles of the first magnetic component and the second magnetic component are different.

9. The magnetic assembly structure according to claim 7, wherein the first receiving slot and the second receiving slot are communicated with each other, such that the main body merely has one receiving slot.

10. The magnetic assembly structure according to claim 1, wherein the magnetic assembly structure further comprises a clamping structure, and the main body further has a via disposed corresponding to the first engagement slot, such that the clamping structure penetrates the via to clamp the first magnetic component.

11. The magnetic assembly structure according to claim 1, wherein the first inserting component further comprises a second magnetic component fixedly disposed on a side of the first magnetic component receiving slot, and the first magnetic component and the second magnetic component have a magnetic attracting or repulsive force induced therebetween.

12. The magnetic assembly structure according to claim 1, wherein the main body further comprises a second magnetic component and a second magnetic component receiving slot, the second magnetic component is fixedly disposed in the second magnetic component receiving slot, and the first magnetic component and the second magnetic component have a magnetic attracting or repulsive force induced therebetween.

13. The magnetic assembly structure according to claim 1, wherein the first receiving slot has a receiving slot bevel surface, and the first inserting component has a inserting component bevel surface corresponding to the receiving slot bevel surface.

14. The magnetic assembly structure according to claim 13, wherein when the inserting component bevel surface of the first inserting component entirely contacts the receiving slot bevel surface of the first receiving slot, a portion of the first magnetic component locates in the first magnetic component receiving slot.

* * * * *